(12) United States Patent
Dilsaver et al.

(10) Patent No.: US 6,961,756 B1
(45) Date of Patent: Nov. 1, 2005

(54) INNOVATION MANAGEMENT NETWORK

(75) Inventors: Evelyn Dilsaver, San Leandro, CA (US); Kevin Rogers, San Anselmo, CA (US)

(73) Assignee: Charles Schwab & Co., Inc., San Francisco, CA (US)

( * ) Notice: Subject to any disclaimer, the term of this patent is extended or adjusted under 35 U.S.C. 154(b) by 912 days.

(21) Appl. No.: 09/641,082

(22) Filed: Aug. 16, 2000

(51) Int. Cl.[7] .............................................. G06F 15/16
(52) U.S. Cl. ...................... 709/205; 709/203; 709/206; 709/225; 707/1; 707/2; 707/10; 707/100; 705/1; 705/7; 705/10; 705/37
(58) Field of Search ................................ 709/203, 205, 709/206, 225; 707/1, 2, 10, 7, 37, 14; 379/92.01; 705/1, 7, 10, 37

(56) References Cited

U.S. PATENT DOCUMENTS

| | | | | |
|---|---|---|---|---|
| 5,377,355 A | | 12/1994 | Hager et al. ................. | 395/650 |
| 5,537,618 A | | 7/1996 | Boulton et al. ............. | 395/161 |
| 5,566,291 A | * | 10/1996 | Boulton et al. ............. | 715/709 |
| 5,878,233 A | * | 3/1999 | Schloss ........................ | 709/225 |
| 5,911,043 A | * | 6/1999 | Duffy et al. ................. | 709/203 |
| 6,026,387 A | * | 2/2000 | Kesel ............................ | 706/52 |
| 6,029,192 A | * | 2/2000 | Hill et al. ..................... | 709/206 |
| 6,115,691 A | * | 9/2000 | Ulwick ........................... | 705/7 |
| 6,195,652 B1 | * | 2/2001 | Fish .............................. | 707/2 |
| 6,233,564 B1 | * | 5/2001 | Schulze, Jr. ................. | 705/14 |
| 6,275,811 B1 | * | 8/2001 | Ginn ............................ | 705/10 |
| 6,347,332 B1 | * | 2/2002 | Malet et al. ................. | 709/205 |
| 6,631,184 B1 | * | 10/2003 | Weiner ..................... | 379/92.01 |
| 2002/0065709 A1 | * | 5/2002 | MacKenzie ................... | 705/10 |
| 2002/0065802 A1 | * | 5/2002 | Uchiyama ....................... | 707/1 |
| 2002/0091543 A1 | * | 7/2002 | Thakur .......................... | 705/1 |
| 2002/0107722 A1 | * | 8/2002 | Laurin et al. ................ | 705/10 |
| 2003/0036947 A1 | * | 2/2003 | Smith et al. .................. | 705/10 |
| 2004/0073443 A1 | * | 4/2004 | Gabrick et al. ............... | 705/1 |
| 2004/0181417 A1 | * | 9/2004 | Piller et al. ................... | 705/1 |

OTHER PUBLICATIONS

Laurin et al. (U.S. Appl. No. 60/144,877), filed Jul. 20, 1999.*

Laurin et al. (U.S. Appl. No. 09/375,401), filed Aug. 17, 1999.*

McQual, Len, *Building Electronic Bridges: Strategic Business Applications on the Internet*, 1996, The State of EDI/EC in Canada.

* cited by examiner

*Primary Examiner*—Hosain Alam
*Assistant Examiner*—ThuHa Nguyen
(74) *Attorney, Agent, or Firm*—Stallman & Pollock LLP

(57) ABSTRACT

An application allows employees to submit suggestions and ideas for improving how a company does business. A presently preferred embodiment of the invention supports multiple points of entry, which can include an entry portal, which is a single point of entry to a Web application; a point of entry for employees within a specific business unit in a larger entity for submission of suggestions related to the business unit; a point of entry for motivated submitters with an idea about how to change the company's business; a central point of entry for ideas and suggestions; and a point of entry for ideas on improving a specific aspect of the company, for example the company's use of the Internet.

53 Claims, 75 Drawing Sheets

340

| What's THINK | Dave on Innovation | Learning Center | THINK Stats | Search Ideas | Submit My Idea |

THINK HOME

THE INNOVATION NETWORK
*You can change the way the game is played*

What's THINK?

- Mission
- What's THINK?
- Who can use THINK?
- What types of ideas should be submitted to THINK?
- What types of ideas do not belong in THINK?
- What happens to my idea once I've submitted it to THINK?
- Where do I forward my thoughts about how to improve THINK?

Mission:

The mission of THINK, THe Innovation NetworK is to fuel Schwab's continued growth by:

1. Creating a pipeline of new products, services and process innovations;
2. Equipping all employees with the knowledge, skills and tools they need to innovate;
3. Linking existing and emerging innovation efforts within Schwab;
4. Instituting a streamlined innovation process that stimulates creative input; and, ultimately,
5. Inspiring the next generation of entrepreneurs at Schwab.

Frequently Asked Questions:

What's THINK?

THINK is the nickname of THe Innovation NetworK at Schwab. It's a place that welcomes ideas of all shapes and sizes from employees of any Schwab enterprise.

THINK is comprised of four innovation programs. Each of these programs solicits, sorts and selects great ideas that suit particular purposes within Schwab. For example:

- Th Loop is where you should submit your ideas and suggestions related to Schwab's Electronic Brokerage products, including Schwab's web site and Velocity.
- SMART is designed for Retail Client Services (RCS)

| What's THINK | Dave on Innovation | Learning Center | THINK Stats | Search Ideas | Submit My Idea |

THINK HOME

THE INNOVATION NETWORK
*You can change the way the game is played*

Thoughts on Innovation
Dave Pottruck, Co-CEO, Charles Schwab & Co., Inc.

- Putting customers front and center
- "Just do it" kind of ideas
- THe Innovation NetworK, THINK
- Shaking up the old ways of thinking
- Conclusion

Putting customers front and center

Customers drive innovation. Schwab was born as an innovation, a "discount" broker that only did transactions. We have continued to depend on innovation to drive our growth. It is vital to our success. We have tried to bring new rules to financial services, and it results in products and services that many customers don't even know that they want. We are making a difference in our customer's financial well being.

Innovation is the signal of a human spirit that it wants to contribute to making the world a better place...to make it clear that we were here and made a difference. Whether in business or not, whether motivated strictly by profit or not, it is worthy of our efforts to bring it forth.

"Just do it" kinds of ideas

Innovation comes in many forms. Some are changes to processes and procedures that you see every day and are in your control. Those are the ones where you should "just do it", in order to improve what you do and how you work every day. Some involve your work unit, while others may involve teams of people, your enterprise and in some cases, the company or the industry. Many of the innovations Schwab has been credited with involve changing the rules of the industry. But I know we couldn't have done it without every one of you challenging what you do on a daily basis.

What can you do to get your idea implemented? Well, I believe that many ideas are the kind that don't really need approval. Find others who support your idea and "just do it". If it involves your entire work unit or other teams, you may need to get your manager's approval

| What's THINK | Dave on Innovation | Learning Center | THINK Stats | Search Ideas | Submit My Idea |

THINK HOME

THE INNOVATION NETWORK
*You can change the way the game is played*

Learning Center

Interested in learning more about innovation? Check out these sources:

- Books
- Schwab U Courses
- Web Sites
- MUSE

Books

- *Competing for the Future* by Gary Hamel and C.K. Prahalad
- *The Innovator's Dilemma* by Clayton Christensen
- *Jumping the Curve* by Nick Imperato and Oren Harari
- *Innovation: Leadership Strategies for the Competitive Edge* by Thomas D. Kuczmarski
- *Sacred Cows Make the Best Burgers* (Chapters 1, 5-8, 10, 11, 16, 22) by Robert Kriegel and David Brandt
- *The Circle of Innovation* by Tom Peters
- *Corporate Creativity: How Innovation and Improvement Actually Happen* by Alan Robinson and Sam Stern
- *Blur: The Speed of Change in the Connected Economy* by Stan Davis and Christopher Meyer
- *New Rules for the New Economy* by Kevin Kelly
- *The Art of Discovery: Fueling Innovation for Company Growth* by Wayne Bundy
- *Thinkertoys: A Handbook of Business Creativity for the 90s* by Michael Michalko
- *Orbiting the Giant Hairball* by Gordon MacKenzie
- *Only the Paranoid Survive: How to Exploit the Crisis Points that Challenge Every Company and Career* by Andrew S. Grove

Schwab U Courses

The following are courses that r late to project management and innovation. Visit Schwab U for more information, including scheduling.

- How Schwab Mak s Money
- Introduction to MUSE

*FIG. 10*

| | What's THINK | Dave on Innovation | Learning Center | THINK Stats | Search Ideas | Submit My Idea |

THINK HOME

THE INNOVATION NETWORK
*You can change the way the game is played*

| Innovation Zone | Ideas Submitted | | | |
|---|---|---|---|---|
| | Today | This Month | This Year | Overall |
| Idea Central | 0 | 5 | 25 | 113 |
| The Loop | 0 | 8 | 17 | 90 |
| SMART | 0 | 2 | 6 | 15 |
| VentureQuest | 0 | 1 | 3 | 8 |
| Totals: | 0 | 16 | 51 | 226 |

— 1110

| Status | Innovation Zone | | | |
|---|---|---|---|---|
| | IC | Loop | SMART | VQ |
| Submitted, not yet reviewed | 3 | 7 | 12 | 4 |
| Under review | 53 | 37 | 0 | 1 |
| Will be implemented | 5 | 13 | 0 | 0 |
| Implemented | 0 | 11 | 0 | 0 |
| Needs implementation | 3 | 1 | 0 | 0 |
| Idea already implemented or in progress | 3 | 1 | 0 | 0 |
| Saved | 6 | 4 | 3 | 1 |
| No Action Taken Because: | | | | |
| Cost | 1 | 0 | 0 | 0 |
| Legal/Compliance | 1 | 1 | 0 | 0 |
| Technical/Systems limitations | 4 | 0 | 0 | 0 |
| Resources not available | 3 | 0 | 0 | 0 |
| Not a priority | 4 | 2 | 0 | 1 |
| Other | 18 | 12 | 0 | 0 |
| Totals: | 113 | 90 | 15 | 8 |

— 1120

| Ideas By Category | Idea Central |
|---|---|
| Category | Ideas Submitted |
| Service Idea | 39 |
| Product Idea | 16 |
| Work Process Idea | 34 |
| Employee-Related Idea | 10 |
| Other Idea | 14 |

| What's THINK | Dave on Innovation | Learning Center | THINK Stats | Search Ideas | Submit My Idea |

🏠 THINK HOME

THE INNOVATION NETWORK
*You can change the way the game is played*

Idea Search
Finding ideas you're interested in couldn't be easier with Idea Search.

To Search for an idea in our database, you can customize your search results using criteria listed below. When you are done, submit the form, and you will be presented with a list of selected ideas. With the search results, you can add comments to existing ideas, or if you'd like, you can submit your own idea. If you know the idea number, skip to that field, enter the number and submit.

Search Criteria — 1210
Enter as many or as few criteria as you'd like. Separate multiple key words with spaces.

Show me all ideas I submitted.

| | |
|---|---|
| Innovation Zone | All ▽ |
| Submitted in last | All ▽ |
| Status | All ▽ |
| Category | All ▽ |
| Enterprise | All ▽ |
| Key Words | |
| Idea Number | |

} 1220

[ Submit ] 1230   [ Clear ] 1240

| What's THINK | Dave on Innovation | Learning Center | THINK Stats | Search Ideas | Submit My Idea |

THINK HOME

THE INNOVATION NETWORK
*You can change the way the game is played*

Idea Search Results

Your search criteria returned the following ideas:
Click on any idea listed below for more detail.

| ID | Posted on | Idea Description | Author |
|---|---|---|---|
| 242 | 2/10/00 | Add streamer capacity to the website | Ian Slavin |
| 241 | 2/10/00 | Automatic stock investment | Ian Slavin |
| 240 | 2/10/00 | Alliances with small banks | Scott Sargent |
| 239 | 2/8/00 | AUTOMATED SALES OF FUND SHARES. | Eric Huck |
| 238 | 2/8/00 | Allow customers to choose to receive statements on the Internet | Patricia Gulliford |
| 237 | 2/7/00 | Helping customers to not oversell their positions | Chad Douwstra |
| 236 | 2/7/00 | Automatically push McAfee Virus Scan DAT file updates to all desktops | Tom Hughes |
| 235 | 2/6/00 | "iwin" for help in www.schwab.com | Grant Mayer |
| 234 | 2/5/00 | A one page portfolio of all accounts | Charles Mathews |
| 232 | 2/4/00 | Maintenance requirements and auto-ex limits | Lance Beck |

| What's THINK | Dave on Innovation | Learning Center | THINK Stats | Search Ideas | Submit My Idea |

THINK HOME

THE INNOVATION NETWORK
*You can change the way the game is played*

Free Internet Access

| | |
|---|---|
| Idea No: | 46 |
| Posted By: | Barry Gutknecht   *1410* |
| Submitted: | Friday, November 12, 1999 |
| Program: | VentureQuest |
| Brief Description: | Provide Free Internet Access for Customers with Min Assets of $1000 |
| Keywords: | free, internet, access |
| Status: | Idea already implemented or in progress |

Comment From VentureQuest

Your peer is right in that we do have an ISP offer. Currently the branches have an AT&T free internet access for 6 months offer to be used at their discretion. What we have found both in our customer research and in experience with the existing offer is that it is not effective in gathering assets with the majority of customers. Opportunistically, for those who were planning to get on-line or switch providers anyway, it can have value. Where there may be value and what we continue to explore is bundling an internet access offer with other packages of services. The ISP landscape is changing quickly. There is a school of thought that says ISP access is becoming commodity-like and may become free for the vast majority of users over time. We continue to closely monitor the technology environment and will make a move when the time is right. In the meantime, our current offer is effective for the branch rep and will be continued.

*1420*

Idea Description

--Free Internet Access for Customers With Min $ Assets at Schwab --Revenue Drivers for Schwab are Transactions --Increase Transactions --Increase AUM --Portray Schwab as Internet Innovator --Free Eye-Balls from cust@freeschwab.com on e-mail addresses --Increased Eye-Balls for Existing Customers --Control Internet Access Points --2/3 of American Homes are NOT connected now --Vastly Fewer Foreign Homes are connected --Small Competitor JB Oxford is trying it--

View more information about this idea   *1430*

*1440*

Comments Submitted

| Submitted | Author | Comment |
|---|---|---|
| 11/19/99 | Jacob Sanders | We already do this. We offer internet access through AT&T for all account holders, who have the minimum to open an account ($2500). They get 6 months access for free. |
| 11/19/99 | Andrew W Ich | I agree with Vadim. Network operations are not Schwab's core competency. What would we say to customers if the dialup network is down, but the trading website is up? But would be a very interesting prospect internationally where Internet access is not as widespread. |

*FIG. 14* response time, maximum up time (99.9%), and no advertising banners.

All ideas are greatly appreciated by Schwab. Your input is equally valued. If you would like to comment on this idea, please do so here. —1510

Submit Comment

Take Me Back to My Idea Search Results

| What's THINK | Dave on Innovation | Learning Center | THINK Stats | Search Ideas | Submit My Idea |

🏠 THINK HOME

THE INNOVATION NETWORK
*You can change the way the game is played*

Route your Idea to the Correct Innovation Zone
Please carefully read the descriptions of the innovation zones and then select the zone that best describes you or your idea.

⊙ My idea relates to Electronic Brokerage (EB) products ─ 1710
- Your idea will be routed to the Loop where all EB product ideas are directly handled.

○ My idea is primarily related to Retail Client Services.
- Your idea will be routed to SMART, which has a dedicated support network of your peers who will review and help implement ideas that impact RCS.

○ My idea improves upon our current business process regardless of what Enterprise is impacted.
- Your idea will be routed to Idea Central, an innovation zone for all Schwab employees outside of RCS.

○ My idea transforms the way we do business and I am passionate enough about it to take part in the official approval and implementation process. I understand this may require a significant amount of my time.
- Your idea will be routed to VentureQuest, the innovation zone for ideas that change the fundamental nature of our business. Ideas require a minimum of three peer comments prior to official review. Please discuss your idea with your peers before submitting it to VentureQuest.

— 260

| Continue with Submission |

*FIG. 17*

| About EB | Monthly Update | Testimonials | The Loop Stats | Search Ideas | Submit My Idea |

⌂ THINK HOME

THE LOOP

The Loop Home

EB Priorities
   Latest Web Updates
   Velocity Releases

Quick Links
   www.schwab.com
   e.World
   Schweb
   IWIN

Enter Your Idea

Please note that all ideas submitted will be the sole property of Schwab.

You must enter values into all the fields. After submitting your idea, THINK will automatically search for similar ideas.

Idea Name: [this is a test]

Brief Idea Description: [testing for the patent application]

Categorize your idea: [Service Idea ▼]

Your Idea (limited to 2,000 characters)

```
I think we should consider every bright idea that's
ever been thought of seriously.
```

Please associate three key words with your idea
for future database searches.

[idea]     [test]     [Schwab]

[ Continue with idea submission ]

| About EB | Monthly Update | Testimonials | The Loop Stats | Search Ideas | Submit My Idea |

THINK HOME

RELATED IDEA(S) FOUND

In order to reduce duplicate ideas and introduce you to people with related ideas, we searched the database and found the following ideas.

If any of the ideas are similar to yours, please tell us why your idea is different. If none of the ideas are similar, you can continue with the idea submission process.

The Loop Home

*1920*

EB Priorities
Latest Web Updates
Velocity Releases

Quick Links
www.schwab.com
e.World
Schweb
IWIN

*1930*

*1910*

Carolyn Spitz                                                                 1
TEST
☑ Check if this idea is similar to yours.

Program: VentureQuest
Status:   Submitted, not yet reviewed
Posted:   12/9/99

TEST

What makes your idea unique or different?
```
This idea is similar because it is also a test idea
```

Carolyn Spitz                                                                 2
test
☐ Check if this idea is similar to yours.

Program: VentureQuest
Status:   Submitted, not yet reviewed
Posted:   12/22/99 that's true isn't it!

What makes your idea unique or different?

Carolyn Spitz                                                                 3
new idea
☐ Check if this idea is similar to yours.

Program: Idea Central
Status:   Idea already implemented or in progress

| About EB | Monthly Update | Testimonials | The Loop Stats | Search Ideas | Submit My Idea |

THINK HOME

The Loop Home

EB Priorities
  Latest Web Updates
  Velocity Releases

Quick Links
  www.schwab.com
  e.World
  Schweb
  IWIN

2110

Please review the details of your idea before submission. If you'd like to submit it, press the Submit my Idea button at the bottom of the screen.

| The Loop |||
|---|---|---|
| Author | Date | Category |
| Carolyn Spitz | 2/15/00 | Service Idea |

Innovation Zone: LOOP
Keywords: IDEA, TEST, SCHWAB
Idea Name: this is a test
Idea Title: testing for the patent application
Idea: I think we should consider every bright idea that's ever been thought of seriously.

| Related Ideas |
|---|
| TEST |

Question Details
Customer Name : N/A
Account : N/A
Group : N/A
Product Area : other
Product: Content
Reason: Prevents Negative Experience
Opinion: Urgent

| Make Changes |

I understand and agree that all submissions to Charles Schwab & Co, Inc. ("Schwab") shall be the sole and exclusive property of Schwab, and I hereby irrevocably assign, transfer, and convey to Schwab, exclusively and perpetually, all right, title and interest which I may have or acquire in and to such submissions throughout the world, including without limitation any copyrights and patents.

I agree with these terms and want to | Submit My Idea |

| About EB | Monthly Update | Testimonials | The Loop Stats | Search Ideas | Submit My Idea |

THINK HOME

THE LOOP

Thank you for your valued ideas!

Thank you for using THINK, THe Innovation NetworK. Your idea (idea #1166) has been submitted to The Loop. You will receive an e-mail confirming receipt of your idea, as well as next steps. If you wish, you may periodically check your idea's status on this site. Please use the links above if you wish to continue exploring the THINK site and/or the innovation zones.

— 2210

The Loop Home

EB Priorities
Latest Web Updates
Velocity Releases

Quick Links
www.schwab.com
e.World
Schweb
IWIN

*FIG. 22*

Spitz, Carolyn

| | |
|---|---|
| From: | WFService on behalf of Loop |
| Sent: | Tuesday, February 15, 2000 10:40 AM |
| To: | Spitz, Carolyn |
| Subject: | Thank you for posting your idea to The Loop |

Your submission (Idea #1166) was processed successfully into the Loop database. This channel provides a process for the field to communicate with our many developers. Our objective is to incorporate your ideas into the product development process. We've captured your feedback and will "loop" back to you with answers as timely as possible. Just check back at the THINK site at http://webfarm/think to search for your idea. With so many submissions, please expect a response no later than 30 days.

| What's THINK | Dave on Innovation | Learning Center | THINK Stats | Search Ideas | Submit My Idea |

🏠 THINK HOME

THE INNOVATION NETWORK
*You can change the way the game is played*

Route your Idea to the Correct Innovation Zone
Please carefully read the descriptions of the innovation zones and then select the zone that best describes you or your idea.

○ My Idea relates to Electronic Brokerage (EB) products
 • Your idea will be routed to the Loop where all EB product ideas are directly handled.

⟋— 2410

◉ My idea is primarily related to Retail Client Services.
 • Your idea will be routed to SMART, which has a dedicated support network of your peers who will review and help implement ideas that impact RCS.

○ My idea improves upon our current business process regardless of what Enterprise is impacted.
 • Your idea will be routed to Idea Central, an innovation zone for all Schwab employees outside of RCS.

○ My idea transforms the way we do business and I am passionate enough about it to take part in the official approval and implementation process. I understand this may require a significant amount of my time.
 • Your idea will be routed to VentureQuest, the innovation zone for ideas that change the fundamental nature of our business. Ideas require a minimum of three peer comments prior to official review. Please discuss your idea with your peers before submitting it to VentureQuest.

[ Continue with Submission ]   ⟍— 260

*FIG. 24*

Enter Your Idea

Please note that all ideas submitted will be the sole property of Schwab.

You must enter values into all the fields. After submitting your idea, THINK will automatically search for similar ideas.

Idea Name: test idea #2
Brief Idea Description: testing for the patent application #2
Categorize your idea: Service Idea

Your Idea (limited to 2,000 characters)
I am now testing the SMART site

Please associate three key words with your idea for future database searches.

idea | test | Schwab

Continue with idea submission

- SMART Home
- What's SMART
- SMART Incentives
- Adopt an Idea
- Who to Contact
- Award Winners
- Website Feedback
- Add a Peer Comment
- SMART Process Flow
- Who is the SMART Steering Committee?

Help me understand the submission process

If you are a Torchbearer, login here

Fields with an asterisk (*) next to them are optional.

Here is your idea:
I am now testing the SMART site.

If you would like to expand on your idea and why it is important, please do so here. *

```
Testing the site is a critical part of the developmen
process
```

SMART Home
What's SMART
SMART Incentives
Adopt an Idea
Who to Contact
Award Winners
Website Feedback
Add a Peer Comment
SMART Process Flow
Who is the SMART Steering Committee?

Help me understand the submission process

If you are a Torchbearer, login here

234

Please answer these additional questions that will help the SMART Torchbearers evaluate your idea:

— 2710

How much ownership would you like?

- ◉ Complete — I'd like to own it *all the way through the presentation and implementation stages*, getting help from a SMART torchbearer and other experts as needed.
- ○ Partial — I'd like to own this idea *only to the presentation stage*, getting help from a SMART torchbearer and other experts as needed.
- ○ None — I don't want to own it at all

What areas of our business will this idea affect?
Choose any that apply:

External:* [New Segment ▽]

Internal:
　　　　　　　　　Yes　　No
　Team Specific:　○　　◉

Segment/department:* [          ]
　Location Affected: [San Francisco ▽]
　Enterprise affected most:* [Electronic Brokerage ▽]
　　　　　　　　　Yes　　No
　Corporate Wide:　◉　　○

What are the benefits?
Choose any that apply:*

*FIG. 27A*

☑ Benefit to customer
☑ Customer/company relationship benefit
☐ Company Benefit

If you choose Company Benefit, please select all that apply

☐ Market Entry
☐ Revenue Enhancer
☐ Cost Saver
☐ Teamwork
☐ Morale
☐ Risk Reduction Other: [_____]

Which one of Schwab's strategic priorities does your idea support most?

[Expand into New Lines of Business ▼]

Have you talked to any of your peers about this idea?  ⦿ Yes  ○ No
Tell me why peer comments are important.

[ Continue with idea submission process ]

| Learning Center | Dave on Innovation | THINK Stats | SMART Stats | Search Ideas | Submit My Idea |

THINK HOME

Please review the details of your idea before submission. If you'd like to submit it, press the Submit my Idea button at the bottom of the screen.

SMART Home
What's SMART
SMART Incentives
Adopt an Idea
Who to Contact
Award Winners
Website Feedback
Add a Peer Comment
SMART Process Flow
Who is the SMART Steering Committee?

Help me understand the submission process

If you are a Torchbearer, login here

2810

| SMART | | |
|---|---|---|
| Author | Date | Category |
| Carolyn Spitz | 2/15/00 | Service Idea |

Innovation Zone: SMART
Keywords: IDEA , TEST, SCHWAB
Idea Name: test idea #2
Idea Title: testing for the patent application #2
Idea: I am now testing the SMART site.

| Related Ideas |
|---|
| TEST |

Idea Details

Expand on Your Idea: Testing the site is a critical part of the development process
How Much Ownership: Complete

Areas of the business affected:
External: New Segment
Team Specific: NO
Segment/Department:
Location: San Francisco
Enterprise: Electronic Brokerage
Corporate Wide: YES

What are the Benefits?
Benefit to Customer: Yes
Cust/Company Rel: Yes
Benefit to Company: N/A Strategic Priorities: Expand into New Lines of Business
Spoken with Peers: Yes Make Changes — 2820

I understand and agree that all submissions to Charles Schwab & Co, Inc. ("Schwab") shall be the sole and exclusive property of Schwab, and I hereby irrevocably assign, transfer, and convey to Schwab.

*FIG. 28*

Spitz, Carolyn

From: WFService on behalf of SMART Ideas
Sent: Tuesday, February 15, 2000 10:50 AM
To: Spitz, Carolyn
Subject: Thank you for submitting your idea to SMART Thank you for submitting your idea (Idea #1167) to the RCS SMART Program!

Schwab's ability to innovate, and our willingness to challenge the conventional way of doing things has allowed us to redefine full-service brokerage. But we can't rest on our past successes. For us to continue our leadership role, everyone at Schwab needs to think of ways to make us even better. By submitting your idea to SMART, you have shown your ability to take part in creating the vision for Schwab's future.

Now that you've submitted your idea, the SMART Torchbearers in your location will review your idea if you aren't sure who they are, check the SMART site on the SchWEB).

Within a month after your submission, the Torchbearers will come back to you with one of three responses:

*NO-GO: The Torchbearers believe your idea should not be pursued at this time.

*GO LOCAL: The Torchbearers think that your idea should be implemented in your location.

*STEERING COMMITTEE: The Torchbearers believe your idea should be presented to the SMART Steering Committee for evaluation.

If you have any questions about the web site or program in general, email the SMARTFeedback@Exchange.Schwab.com mailbox. If you would like to check on the status of your idea, please check the SMART web site or contact your local torchbearers directly.

Good Luck!

Susanne Lyons

THE INNOVATION NETWORK
*You can change the way the game is played*

Route your Idea to the Correct Innovation Zone
Please carefully read the descriptions of the innovation zones and then select the zone that best describes you or your idea.

○ My idea relates to Electronic Brokerage (EB) products
  - Your idea will be routed to the Loop where all EB product ideas are directly handled.

○ My idea is primarily related to Retail Client Services.
  - Your idea will be routed to SMART, which has a dedicated support network of your peers who will review and help implement ideas that impact RCS.

/— 3110

◉ My idea improves upon our current business process regardless of what Enterprise is impacted.
  - Your idea will be routed to Idea Central, an innovation zone for all Schwab employees outside of RCS.

○ My idea transforms the way we do business and I am passionate enough about it to take part in the official approval and implementation process. I understand this may require a significant amount of my time.
  - Your idea will be routed to VentureQuest, the innovation zone for ideas that change the fundamental nature of our business. Ideas require a minimum of three peer comments prior to official review. Please discuss your idea with your peers before submitting it to VentureQuest.

[ Continue with Submission ]
\— 260

*FIG. 31*

Spitz, Car lyn

| | |
|---|---|
| From: | WFService on behalf of Idea Central |
| Sent: | Tuesday, February 15, 2000 11:10 AM |
| To: | Spitz, Carolyn |
| Subject: | Thank you for posting your idea to Idea Central |

Thank you for using Idea Central!

We have received your idea (Idea # 1168) and we will be researching it shortly.

As you know, innovation is the key to Schwab's future success, and very often the most innovative ideas come from Schwab employees themselves. We are pleased to be able to provide you with a mechanism of sharing your thoughts and ideas.

Our goal is to provide timely feedback and follow up on all ideas submitted. We will get back to you at the earliest possible time to inform you of the status of your idea. As outlined on the Idea Central site, it will take a number of weeks for us to do the necessary research on your idea and to obtain proper feedback. We appreciate your patience during this time. Please be assured that your idea will receive careful handling and be given serious consideration during this process.

Thanks again for your submission,

—The Idea Central Group

| What's THINK | Dave on Innovation | Learning Center | THINK Stats | Search Ideas | Submit My Idea |

THINK HOME

THE INNOVATION NETWORK
*You can change the way the game is played*

Route your Idea to the Correct Innovation Zone

Please carefully read the descriptions of the innovation zones and then select the zone that best describes you or your idea.

○ My idea relates to Electronic Brokerage (EB) products
- Your idea will be routed to the Loop where all EB product ideas are directly handled.

○ My idea is primarily related to Retail Client Services.
- Your idea will be routed to SMART, which has a dedicated support network of your peers who will review and help implement ideas that impact RCS.

○ My idea improves upon our current business process regardless of what Enterprise is impacted.
- Your idea will be routed to Idea Central, an innovation zone for all Schwab employees outside of RCS.

/—3810

◉ My idea transforms the way we do business and I am passionate enough about it to take part in the official approval and implementation process. I understand this may require a significant amount of my time.
- Your idea will be routed to VentureQuest, the innovation zone for ideas that change the fundamental nature of our business. Ideas require a minimum of three peer comments prior to official review. Please discuss your idea with your peers before submitting it to VentureQuest.

| Continue with Submission |

Enter Your Idea

Please note that all ideas submitted will be the sole property of Schwab.

You must enter values into all the fields. After submitting your idea, THINK will automatically search for similar ideas.

Idea Name: test idea #4

Brief Idea Description: testing for the patent application #4

Categorize your Idea: Product Idea

Your Idea (limited to 2,000 characters)

This is a test idea to demonstrate VentureQuest

Please associate three key words with your idea for future database searches.

ATM    branch    advice

Continue with idea submission

*FIG. 39*

| What's VQ? | Innovation Defined | Add a Peer Comment | VQ Stats | Search Ideas | Submit My Idea |

THINK HOME

All of the following fields must be completed for idea submission.

Which one of Schwab's strategic priorities does your idea support most?

Offer Schwab-Style Help and Advice ▼

Who would benefit the most?
⦿ Customers?  ◯ Employees?
Describe the employee/customer segment:
```
All customers with money
```
Click for example

What specific need or opportunity would this idea tackle?
```
Giving them help and advice is the only way to go
```
Click for example

What signifies success for this idea?
```
Having every customer invested properly
```
Click for example

What (stated or unstated) rules would this idea break?
Industry rules broken:
```
Brokers want to earn commissions, not do what's right
for the customer
```

[ What's VQ? ] [ Innovation Defined ] [ Add a Peer Comment ] [ VQ Stats ] [ Search Ideas ] [ Submit My Idea ]

THINK HOME

VentureQuest

Please review the details of your idea before submission. If you'd like to submit it, press the Submit my Idea button at the bottom of the screen.

VentureQuest

| Author | Date | Category |
|---|---|---|
| Carolyn Spitz | 2/15/00 | Product Idea |

Innovation Zone: VentureQuest
Keywords: ATM, BRANCH, ADVICE
Idea Name: test idea #4
Idea Title: testing for the patent application #4
Idea: This is a test idea to demonstrate VentureQuest

Question Details

Strategic Priority: Offer Schwab-Style Help and Advice — 4210
Who benefits most: Customers
Emp/Cust Segment: All customers with money
Need Tackled: Giving them help and advice is the only way to go
Industry Rules Broken: Brokers want to earn commissions, not do what's right for the customer
Schwab Rules Broken: Customers self-direct
Signifies Success: Having every customer invested properly
Competitors Upset: Merrill Lynch and other full commission brokers
How disruptive: Extremely
Enterprise Affected: My idea affects more than one enterprise
Who supports idea: All employees
Pros: This is a new way to differentiate ourselves
Cons: It is expensive to implement

[ Make Changes ] — 4220

I understand and agree that all submissions to Charles Schwab & Co, Inc. ("Schwab") shall be the sole and exclusive property of Schwab, and I hereby irrevocably assign, transfer, and convey to Schwab, exclusively and perpetually, all right, title and interest which I may have or acquire in and to such submissions throughout the world, including without limitation any copyrights and patents.

*FIG. 42*

Spitz, Carolyn

| | |
|---|---|
| From: | WFService on behalf of VentureQuest |
| Sent: | Tuesday, February 15, 2000 11:20 AM |
| To: | Spitz, Carolyn |
| Subject: | Thank you for submitting your idea to VentureQuest |

Thank you for submitting your idea (Idea #1169) to VentureQuest!

VentureQuest is a place for revolutionary ideas that will change the way we do business in fundamental ways. The idea submitter (that's you!) must passionately own the idea, and peers must support it and provide their input.

Ideas are not reviewed until three of your peers add comments. The purpose of this requirement is to ensure that ideas are fully thought through and have the support they need for implementation.

Now that you have submitted your idea, please ask the peers you have discussed your idea with to add their comments. Have them enter the VentureQuest site, go to the black tab titled "Add a Peer Comment" and follow the instructions from there. After three peer comments are received, you will be contacted within two weeks to discuss next steps.

Thank you for the time and thought you have given to your idea submission. Innovation is the source of Schwab's success, and you play a key role in our future by making innovation part of your job.

— The VentureQuest team

| What's Idea Central | How's IC Work? | Linnet on Ideas | IC Stats | Search Ideas | Submit My Idea |

⌂ THINK HOME

IDEA CENTRAL — Idea Central, a member of THINK, is the place for creative ideas to enhance the way we do business.

"...our fast-paced, change-filled business environment is not going away. To ensure that we remain ahead of our competitors, we will continue to foster innovation and ideas among all employees."
- Linnet

Dear Colleagues:

Underlying the success of our company is a culture where change is adopted not rejected, and I'm proud that this culture is alive and well within Retail. Every time I visit a branch or a call center, or meet with Retail teams here in San Francisco, I am energized by your innovative spirit and wish that I could capture every idea that you put forth. Idea Central, a new Retail-wide program for sharing ideas, answers that call.

Idea Central got its start as a tool for Retail employees but we decided to open it up to all employees, knowing that the process would work equally well across all enterprises.

You probably have many suggestions for improving how we do business, or even changing some of the ways we do business. I encourage you to use Idea Central to share your ideas; each and every idea that comes to us through Idea Central will be reviewed by the appropriate business units. This is another step towards positive change for us and for our customers.

We all recognize that our fast-paced, change-filled business environment is not going away. To ensure that we remain ahead of our competitors, we will continue to foster innovation and ideas among all employees. Thank you for your contributions and I look forward to seeing how we can make a difference together!

Best,
Linnet
Linnet Deily
Vice Chairman and
President, Schwab Retail Group

[Tabs: About EB | Monthly Update | Testimonials | The Loop Stats | Search Ideas | Submit My Idea]

THINK HOME

THE LOOP

The Loop Home

EB Priorities
Latest Web Updates
Velocity Releases

Quick Links
www.schwab.com
e.World
Schweb
IWIN

221

The Electronic Brokerage Enterprise is headed up by Gideon Sasson, and as of October 1999 has about 370 people (which includes about 240 EBT/SITE staff!). The groups that comprise EB include:

- Product Development
- Marketing Development
- EB Technology (part of SITE)
- Consumer Experience and Usability
- Finance
- E-Mail
- EB Service Integration EB develops a variety of electronic products, including

- The 'Public' website (web content that anyone can surf, including the homepage at www.schwab.com)
- The Customer Center website (web content and functionality that Customers must log on to access)
- eMail products (Alerts, as seen under the Alerts tab in the Customer Center website)
- The "Velocity" Signature Service Desktop product
- Mobile/Wireless trading.

Emerging Technologies, such as EB, works closely with other Enterprises to plan and select new projects for development through an annual Planning process which includes representatives from around Schwab. We will share EB's project plans and strategies for 2000 when they are finalized - check back for updates here, or on the eWorld intranet site (jumpword "eworld" from the Schweb - EB's intrenet site that includes the latest web and product changes, and in depth product information).

EB also focuses on maintaining the products once they have been launched. There are a number of staff dedicated to this neverending task. Feedback - like what we get through The Loop - helps to keep us up to date on bugs and enhancements that are unavoidable given the ever changing internet environment! So thank you for taking the time to use The Loop - your input does not go unheard!

We also want to capture Customer Testimonials. These are comments we forward onto EB Marketing from our Schwab customers who have said nice things about our Electronic Brokerage products, which may be featured in upcoming marketing campaigns.

*FIG. 50*

| About EB | Monthly Update | Testimonials | The Loop Stats | Search Ideas | Submit My Idea |

THINK HOME

Loop Update - January 2000

The Loop Home

Confidentiality!
Please remember that any information about products being developed is for internal Schwab use only. The information should not be shared with customers or other people outside of Schwab.

EB Priorities
Latest Web Updates
Velocity Releases

Product and Service Suggestions:

For those of you not familiar with the Loop, this report is the most efficient way of letting you know the status of your Product and Service suggestions. The Loop continues to be a great way to capture your ideas and enhancement suggestions for our electronic products. Please keep the following criteria in mind when sending in your submissions:

- Implemented
- In Progress

Quick Links
www.schwab.com
e.World
Schweb
IWIN

- The Loop focuses on the Web, e-mail products, Velocity and other EB products. Refer to your desktop tools for issues with Call routing, Telebroker, and Legacy and other non-Electronic Brokerage systems, which are outside the scope of the Loop.

5110

- The Loop isn't the place to go for urgent matters, such as reporting the Web is down. Use your normal urgent process for such time sensitive issues!

Take a look below to see the results of your recent feedback. Let others know how the Loop works. Refer to the Past Newsletters to see the previous Monthly Updates. You can also refer Web Updates on e.World for recent launches.

As always, thank you for taking the time to submit your ideas!

| Implemented | | |
|---|---|---|
| Change/Addition | Description | Contributing Employees |

*FIG. 51*

| About EB | Monthly Update | Testimonials | The Loop Stats | Search Ideas | Submit My Idea |

THINK HOME

THE LOOP

THE LOOP

Past Newsletters

The Loop Home

Check out our archive of Loop updates:

EB Priorities
Latest Web Updates
Velocity Releases

- December 1999
- November 1999
- October 1999
- September 1999

Quick Links
www.schwab.com
e.World
Schweb
IWIN

- March 1999
- December 1998
- October 1998
- September 1998
- July 1998
- June 1998

| | | | | | |
|---|---|---|---|---|---|
| About EB | Monthly Update | Testimonials | The Loop Stats | Search Ideas | Submit My Idea |

THINK HOME

THE LOOP

◉.World | February 15, 2000          [Select a New "e.Category"]

>> SEND US E-MAIL IF SOMETHING YOU'RE LOOKING FOR ISN'T ON L.WORLD

WEB UPDATES

The Loop Home

2000 QUARTER 1

EB Priorities
► Latest Web Updates
  Velocity Releases

| Date | Item |
|---|---|
| 02-10 | Stock Analyzer |
| 02-02 | SNAP print at home |
| 01-31 | Velocity Release |
| 01-26 | Market Analysis reports via email |
| 01-20 | IRA Distribution Online Form |
| 01-20 | Automatic Investment Plan (AIP) |
| 01-13 | E Confirms |
| 01-11 | MySchwab (Enhanced) |

Quick Links
www.schwab.com
e.World
Schweb
IWIN

'99 QUARTER 4

| Date | Item |
|---|---|
| 12-27 | Learning Center |
| 12-15 | Online Password Reset |
| 12-06 | Velocity Release 2.5 |
| 11-19 | Updated "Intro to the Web" Brochure |
| 11-19 | Advanced Mutual Fund Screening |
| 11-19 | Retirement Planner - Public Site |
| 11-19 | Analyst Center- Insider Activity for GI |
| 11-18 | Advanced Options - Signature Services |
| 11-18 | Online IRA Distribution Form |
| 11-01 | Signature Services/Velocity Trial Offer |

5510

<< To jump to a specific update, please select a h[ead]
from the menu to your left.

2000 Quarter 1

02-10 Stock Analyzer

Stock Analyzer is an online tool that walks you thr[ough]
the process of
researching a stock. This Phase II is the Schwab-
branded, improved version for customers only.

See Spotlighted Product

02-08 Portfolio Checkup Enhancements

The following features were added:

- ability to enter non-Schwab holdings.
- ability for customers to classify assets themselves.

See Spotlighted Product

02-02 SNAP print at home

Customers who choose the new Print and Mail fea[ture]
and complete their applications online, will receive
Pending Account Number and granted Web acce[ss]
after they complete their online submission.

See Spotlighted Product

01-31 Velocity Release

Print capability and a software password were add[ed]

See Spotlighted Product

*FIG. 55*

Welcome to...

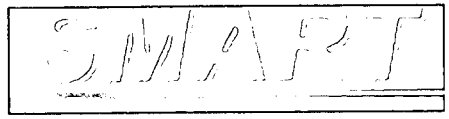

... where YOU can make the difference!!

Many of the best ideas for improving the way Schwab does business have come directly from our employees -- Online Greenbar, the Charitable Giving Account, and the Select Account feature on our website are just a few examples. The RCS SMART program not only provides you with a place to submit your ideas, but helps support you in making them a reality. Help lead Schwab into the future, submit your innovative ideas today!

- Susanne Lyons - RCS Enterprise President

What's SMART

SMART Incentives

Adopt an idea

Who to contact

Award Winners

Add a peer comment

Website Feedback

Help me understand the submission process

[Tabs: Learning Center | Dave on Innovation | THINK Stats | SMART Stats | Search Ideas | Submit My Idea]

THINK HOME

SMART Home
What's SMART
SMART Incentives
Adopt an Idea
Who to Contact
Award Winners
Website Feedback
Add a Peer Comment
SMART Process Flow
Who is the SMART
Steering Committee?

Help me understand
the submission
process

If you are a
Torchbearer,
login here

231

What's SMART?

- Mission
- Who can use SMART?
- What types of ideas should be submitted to SMART?
- What types of ideas do not belong in SMART?
- What help is available?
- What is a Torchbearer?
- What happens to my idea once I have submitted it to SMART?
- When will I hear back from SMART?

Mission:

SMART

1. Foster an environment conducive to innovation within Schwab's Retail Client Services (RCS) enterprise
2. Create and sustain an official mechanism that empowers RCS employees to bring new, productive ideas to senior management
3. Produce results that benefit clients, employees, the enterprise, and the company as a whole.

Frequently Asked Questions:

Who can use SMART?

All RCS Employees can use SMART

What types of ideas should be submitted to SMART?

SMART seeks ideas from RCS employees that will help us improve our products, our services, our processes and our experiences at Schwab.

One way to think about what makes a good SMART idea is to look at the acronym S-M-A-R-T. A SMART idea is: Specific, Measurable, Achievable, Results-centered and Time-bound.

It also helps to know the additional factors that the SMART Torchbearers take into consideration before they'll bring a submitted idea to the SMART Steering Committee for review. Essentially, three factors weigh in: feasibility, owner passion and level of impact.

*FIG. 58*

| Learning Center | Dave on Innovation | THINK Stats | SMART Stats | Search Ideas | Submit My Idea |

THINK HOME

SMART Home
What's SMART
SMART Incentives
▷ Adopt an Idea
Who to Contact
Award Winners
Website Feedback
Add a Peer Comment
SMART Process Flow
Who is the SMART
Steering Committee?

Help me understand
the submission
process

If you are a
Torchbearer,
login here

6010

Adopt an Idea

Sometimes people have great ideas but don't have the time or desire to present them and take them all the way through implementation. These ideas are listed below, and if one excites you, adopt it as your own.

Here's how it works
Review the details of the idea and decide if you want to pick it up and run with it. Simply contact a SMART torchbearer, and you'll be on your way!

Ideas available for adoption:

| ID | Posted on | Idea Description | Author |
|---|---|---|---|
| 1095 | 5/1/96 | Using a focus run, identify non-electronic users, have teams call top 20% and of | Barb Francis |
| 956 | 5/1/96 | Provide an incentive to non-TeleBroker but heavy team users in the form of: for | Betty Cataffo |
| 1007 | 5/1/96 | Provide customers option to listen to tape about the market & econ. information | Betty Cataffo |
| 1062 | 5/1/96 | Empower all brokers with margin adjustment functions. | Brad Cravens |
| 910 | 5/1/96 | Purchase cordless headsets to cut down on time away from the phone, by keeping i | Brian Moon |
| 1061 | 5/1/96 | Transfer margin duties to each S500 Team. | David Burch |
| 1016 | 5/1/96 | Include Select List in quarterly Performance Guide. | David Burch |
| 1034 | 5/1/96 | Have 1 WSJ per 3 teams. | David Ligan |
| 902 | 5/1/96 | Centralize Bloomberg machines to allow easier access; less hold time for custome | Deborah Jones |
| 1003 | 5/1/96 | Have IBES installed on each MAMS pc to save time and money. | Diane Smith |

|<  <  >  >|

Spot Awards/1000Watt

1999
1998
Past Spot Award Winners
Past 1000 Watt Winners

SMART Home
What's SMART
SMART Incentives
Adopt an Idea
Who to Contact
► Award Winners
Website Feedback
Add a Peer Comment
SMART Process Flow
Who is the SMART
Steering Committee?

Help me understand
the submission
process

If you are a
Torchbearer,
login here

6210

1999 Spot Award Winners

| Denver | Indy | Phoenix | Orlando | San Francisco |
|--------|------|---------|---------|---------------|
| TBD    | TBD  | TBD     | TBD     | TBD           |

1998 Spot Award Winners

| Denver | Indy | Phoenix | Orlando | San Francisco |
|--------|------|---------|---------|---------------|
| • Bonnie Giese<br>• Norman Liu<br>• Nathaniel Wilkinson<br>• Tom Bjorklund<br>• Pat Smith<br>• Steve Kovach<br>• Terry Campbell | • Todd Kelly<br>• Mike Rasmussen<br>• Randy Frederick<br>• Steve Erwin | • Doug Calcaterra<br>• Stuart Bates<br>• Charlie Pascu<br>• Dyanne O'Connell<br>• Galo Tapia<br>• Shani Buss<br>• Norman Rischard | • TBD | • Liz Dahlgren<br>• Patrick Bentivegna<br>• Ron Slaughter<br>• Marty Weissman<br>• David Hamasaki<br>• Gill Cyester<br>• Don Kolley<br>• Jim Skidmore | top

1998 1000 Watt and Long Life Winners

- Patrick Bentivegna
- Steve Erwin
- Bill Harshman
- Bob Kunkle
- Tom McKay
- Todd McWhirter
- Hal Swanson top

Past Spot Award Winners

*FIG. 62*

| Learning Center | Dave on Innovation | THINK Stats | SMART Stats | Search Ideas | Submit My Idea |

THINK HOME

SMART Home
What's SMART
SMART Incentives
Adopt an Idea
Who to Contact
Award Winners
Website Feedback
► Add a Peer Comment
SMART Process Flow
Who is the SMART
Steering Committee?

Help me understand
the submission
process

If you are a
Torchbearer,
login here

Idea Search
Finding Ideas you're Interested in couldn't be easier with Idea Search.

To Search for an idea in our database, you can customize your search results using criteria listed below. When you are done, submit the form, and you will be presented with a list of selected ideas. With the search results, you can add comments to existing ideas, or if you'd like, you can submit your own idea. If you know the idea number, skip to that field, enter the number and submit.

Search Criteria
Enter as many or as few criteria as you'd like. Separate multiple key words with spaces.

Show me all ideas I submitted.

| Innovation Zone | All |
| Submitted in last | All |
| Status | All |
| Category | All |
| Enterprise | All |
| Key Words | |
| Idea Number | |

[Submit] [Clear]

Idea Search Results

Your search criteria returned the following ideas:
Click on any idea listed below for more detail.

| ID | Posted on | Idea Description | Author |
|---|---|---|---|
| 1169 | 2/15/00 | testing for the patent application #4 | Carolyn Spitz |
| 1168 | 2/15/00 | testing for the patent application #3 | Carolyn Spitz |
| 1167 | 2/15/00 | testing for the patent application #2 | Carolyn Spitz |
| 1166 | 2/15/00 | testing for the patent application | Carolyn Spitz |
| 1165 | 2/8/00 | creat great tasting smooth cheap butter | Carolyn Spitz |
| 1162 | 1/27/00 | hi, I am testing this again - and again | Stacy Orff |
| 1160 | 1/25/00 | new idea | Carolyn Spitz |
| 1158 | 1/13/00 | test | Carolyn Spitz |
| 1156 | 1/13/00 | test | Carolyn Spitz |
| 1155 | 1/13/00 | test | Stacy Orff |

1 to 10 of 819

Sidebar:
- SMART Home
- What's SMART
- SMART Incentives
- Adopt an Idea
- Who to Contact
- Award Winners
- Website Feedback
- ► Add a Peer Comment
- SMART Process Flow
- Who is the SMART Steering Committee?

Help me understand the submission process

If you are a Torchbearer, login here

| | test Idea #3 | |
|---|---|---|
| Idea No: | 1168 | |
| Posted By: | Carolyn Spitz | |
| Submitted: | Tuesday, February 15, 2000 | |
| Program: | Idea Central | |
| Brief Description: | testing for the patent application #3 | |
| Keywords: | schwab , ideas, test | |
| Status: | Submitted, not yet reviewed | |

Idea Description

I am entering test ideas to demonstrate the system

View more information about this idea

Related Ideas

| Idea No. | Idea |
|---|---|
| 1145 | TEST |

All ideas are greatly appreciated by Schwab. Your input is equally valued. If you would like to comment on this idea, please do so here.

```
I AM ADDING A PEER COMMENT
```

[Submit Comment]

[Take Me Back to My Idea Search Results]

Sidebar:
SMART Home
What's SMART
SMART Incentives
Adopt an Idea
Who to Contact
Award Winners
Website Feedback
► Add a Peer Comment
SMART Process Flow
Who is the SMART Steering Committee?

Help me understand the submission process

If you are a Torchbearer, login here

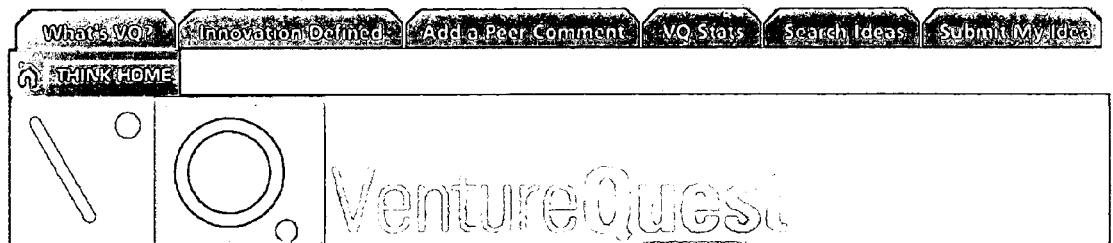
VentureQuest mission: Develop new businesses for Schwab using a venture capital approach
How to get your
idea funded
Business plan
templates and
resources
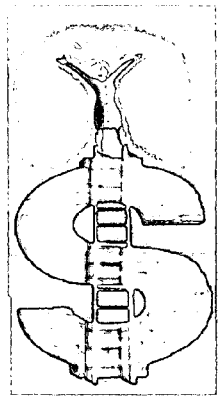
Incentives for
funded ideas
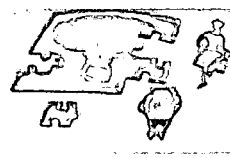
Strategy: Context
for Innovation,
By Dan Leemon
VentureQuest
feedback
Tell us what you
think!
250
*FIG. 69*

INNOVATION MANAGEMENT NETWORK

BACKGROUND OF THE INVENTION

1. Technical Field

The invention relates to the submission and acceptance of suggestions. More particularly, the invention relates to an innovation network.

2. Description of the Prior Art

In the past, employee who were interested in making suggestions for innovation and improvement to a company faced a difficult task of trying to figure out where to direct their suggestions. The company was also faced with a difficult task of trying to organize and evaluate suggestions relating to a myriad of different issues. At the same time, the company may receive numerous solicitations from third parties for investment into or alliance with their business. Companies currently have no system for tracking receipt and internal comment and categorization to any of these corporate development activities.

D. Hager, C. Rose, Method and Apparatus for Automated Procedure Initiations In A Data Processing System Including Soliciting An Evaluation Vote From Users Automatically Determined In Response To Identification of a Functional Area Associated with a Document, U.S. Pat. No. 5,377,355 (27 Dec. 1994) disclose a method and apparatus in which a selected document is identified and evaluates of the selected document are automatically solicited from a selected group of evaluators. In one embodiment, the evaluators are automatically selected in response to the technical or functional subject matter of the document.

R. Schloss, System, Method and Computer Program Product For Reviewing and Creating Advisories For Data Located On a Content Serverx, U.S. Pat. No. 5,878,233 (2 Mar. 1999) discloses a system and method which develops new and revised advisories on content loaded (or available to be loaded) by a client from a content server via a protocol between the client and any number of advisory servers that maintain "ratings" knowledge bases.

D. Boulton, W. Vucenic, J. Stallings, Method and Apparatus For Implementing User Feedback, U.S. Pat. No. 5,537, 618 (16 Jul. 1996) and U.S. Pat. No. 5,566,291 (15 Oct. 1996) disclose a method and apparatus for implementing user feedback in which a user may activate an enter feedback mode command in a computer environment to provide feedback in a feedback interface.

Among other shortcomings, the prior art fails to recognize, let alone address, the need to accommodate unsolicited and/or unclassified ideas, suggestions, propositions, or innovations. It would be advantageous to provide an innovation network for receiving classifying such ideas, suggestions, propositions, and innovations.

SUMMARY OF THE INVENTION

The invention provides a central, portal through which employees can make suggestions to a company and through which the company can enter all corporate development solicitations. The portal receives innovative suggestions that are then incorporated into one or more central databases, e.g. one database is provided for internal ideas and a separate database is provided for external solicitations. The databases allow suggestions to be categorized based upon key words, and allows peer review and comment. By providing a central database where all suggestions and solicitations and related information are stored, a company can effectively evaluate new innovations.

Features of the preferred embodiment of the invention include a Web page where users can input suggestions for innovations; solicitation of key words related to suggestions for innovation; related suggestions are cross-referenced to minimize entry of duplicate suggestions; broad categories are provided for general classification of different types of ideas and more specific ideas; automatic emailing of specific types of suggestions to specific areas of responsibility within the company; a status field is provided that indicates whether plans are in place to implement an innovation; peer comments are recorded; and ability is provided such that employees who sign up for areas of interest are automatically notified by email when relevant, new ideas are entered.

BRIEF DESCRIPTION OF THE DRAWINGS

FIG. 8 is a screen display showing an introduction and frequently asked questions (FAQ) dialogue for a multi-portal home page according to the invention;

FIG. 9 is a screen display showing an executive introduction to a multi-portal home page according to the invention;

FIG. 10 is a screen display showing a learning center page for a multi-portal home page according to the invention;

FIG. 11 is a screen display showing a statistics page for a multi-portal home page according to the invention;

FIG. 12 is a screen display showing a search page for a multi-portal home page according to the invention;

FIG. 13 is a screen display showing a search results page for a multi-portal home page according to the invention;

FIG. 14 is a screen display showing a detailed search result for a multi-portal home page according to the invention;

FIG. 15 is a screen display showing a comment field for an idea located during a search in a multi-portal home page according to the invention;

FIG. 17 is a screen display showing an idea routing dialog that is associated with an idea located during a search in a multi-portal home page according to the invention;

FIG. 18 is a screen display showing an idea entry dialog in a multi-portal home page according to the invention;

FIG. 19 is a screen display showing a related idea located during idea submission in a multi-portal home page according to the invention;

FIG. 20 is a screen display showing an idea submission dialog in a multi-portal home page according to the invention;

FIG. 21 is a screen display showing an idea submission review dialog in a multi-portal home page according to the invention;

FIG. 22 is a screen display showing an acknowledgement page for an idea submission in a multi-portal home page according to the invention;

FIG. 23 is an email acknowledgement for an idea submission in a multi-portal home page according to the invention;

FIG. 24 is a screen display showing an idea routing dialog in a multi-portal home page according to the invention;

FIG. 25 is a screen display showing an initial idea submission dialog for a business unit specific portal home page according to the invention;

FIG. 26 is a screen display showing a related idea located during an idea submission for a business unit specific portal home page according to the invention;

FIG. 27a is a screen display showing a first portion of a further idea submission dialog for a business unit specific portal home page according to the invention;

FIG. 27b is a screen display showing a second portion of the further idea submission dialog for a business unit specific portal home page according to the invention;

FIG. 28 is a screen display showing an idea submission review dialog for a business unit specific portal home page according to the invention;

FIG. 30 is a email acknowledgement for an idea submission for a business unit specific portal home page according to the invention;

FIG. 31 is a screen display showing an idea routing dialog in a multi-portal home page according to the invention;

FIG. 37 is an email acknowledgment for an idea submission for a central idea submission portal home page according to the invention;

FIG. 38 is a screen display showing an idea routing dialog in a multi-portal home page according to the invention;

FIG. 39 is a screen display showing an initial idea submission dialog for a business improvement idea submission portal home page according to the invention;

FIG. 41 is a screen display showing an idea submission dialog for a business improvement idea submission portal home page according to the invention;

FIG. 42 is a screen display showing an idea submission review dialog for a business improvement idea submission portal home page according to the invention;

FIG. 44 is an email acknowledgment for an idea submission for a business improvement idea submission portal home page according to the invention;

FIG. 48 is a screen display showing an introductory message page for the IdeaCentral portal according to the invention;

FIG. 50 is a screen display showing an introductory page for the LOOP portal according to the invention;

FIG. 51 is a screen display showing a monthly update page for the LOOP portal according to the invention;

FIG. 52 is a screen display showing a list of past newsletters for the LOOP portal according to the invention;

FIG. 55 is a screen display showing Web updates for the LOOP portal according to the invention;

FIG. 57 is a screen display showing a home page for the SMART portal according to the invention;

FIG. 58 is a screen display showing an introductory page for the SMART portal according to the invention;

FIG. 60 is a screen display showing an idea adoption page for the SMART portal according to the invention;

FIG. 62 is a screen display showing employee awards for the SMART portal according to the invention;

FIG. 64 is a screen display showing an idea search for the SMART portal according to the invention;

FIG. 65 is a screen display showing idea search results for the SMART portal according to the invention;

FIG. 66 is a screen display showing a peer comment dialog for the SMART portal according to the invention;

FIG. 69 is a screen display showing a home page for the VentureQuest portal according to the invention;

DETAILED DESCRIPTION OF THE INVENTION

The preferred embodiment of the invention provides a Web-based application that allows employees to submit suggestions and ideas for improving how a company does business. A presently preferred embodiment of the invention supports multiple points of entry, which can include:

- An entry portal, which is a single point of entry to the Web application (THINK);
- A point of entry for employees within a specific business unit in a larger entity for submission of suggestions related to the business unit (SMART);
- A point of entry for motivated submitters with an idea about how to change the company's business (VentureQuest);
- A central point of entry for ideas and suggestions (IdeaCentral); and
- A point of entry for ideas on improving a specific aspect of a company, for example the company's use of the Internet (the LOOP).

The presently preferred embodiment of the invention is described in connection with a full service brokerage company. However, this embodiment of the invention is provided as an example only and is in no way intended as limiting the scope and applicability of the invention. It will be appreciated by those skilled in the art that the invention is readily applicable to any other enterprises including, for example, commercial, not for profit, and governmental enterprises. Further, while the invention is described in connection with an employee suggestion submission application, it will be appreciated by those skilled in the art that the invention is readily applicable to other suggestion submission applications, including, for example, customer and other third party submissions.

PREFERRED EMBODIMENT OF THE INVENTION—FUNCTIONALITY

The following discussion describes various generic components of an innovation network in accordance with the presently preferred embodiment of the invention. The invention is first discussed below in connection with these generic components and thereafter in connection with a specific implementation of a preferred embodiment of the invention.

Content Management

Content management functionality is provided for the following areas:
- Frequently Asked Questions (FAQ); and
- Site Contact Information.

Site Data Elements

The preferred embodiment of the invention implements database with tables for:
- Submission data elements;
- Qualification questions; and
- Database lookup tables.

Idea Details

For each submitted idea, the preferred embodiment of the invention allows the following types of information to be attached to a suggestion:
- Add review comment;
- Add peer review comment;
- Add link to document or presentation on the Web; and
- Add related idea.

Torchbearer

The torchbearer is an executive participant and advocate in the suggestion entry mechanism who has privileges that allow him to:
- Search all fields;
- Add torchbearer comments;
- Delete submissions; and
- Edit all fields in a submission.

Reports

The preferred embodiment of the invention provides basic reports.

User Validation—In General

Figure 1:
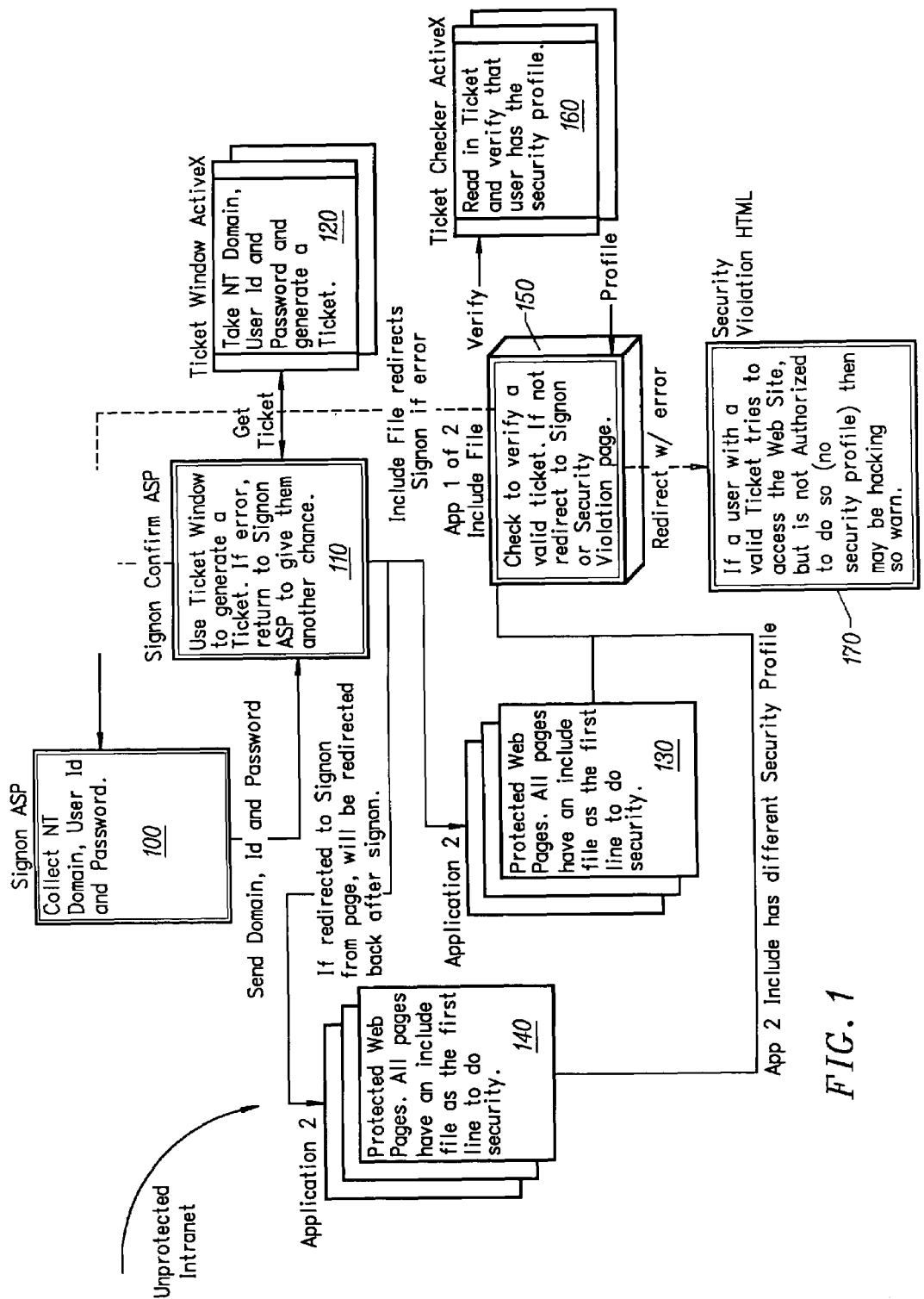
FIG. 1 is a block schematic diagram of an authorization process flow according to the invention.

FIG. 1 is a block schematic diagram of an authorization process flow according to the invention. At signon (100) user ID and password information are sent to a signon confirmation function (110). In the preferred embodiment of the invention, a ticket window uses this information to generate a ticket (120). The user then has access to various applications within the system (130, 140). The applications incorporate an include file that validates the user ticket (150) in connection with a ticket checker function (160). A security module is also provided that identifies security violations, e.g. user not granted access level commensurate with access level required for application accessed, and reports same for investigation (170).

System Requirements

Table 1 below sets forth portal access levels and participants in the suggestion submission process.

TABLE 1

| Portal Access Levels | | | |
|---|---|---|---|
| Employees | Submitter | Torchbearers | Administration |
| View site content | Submit new ideas | Change all fields in a submission | Change lookup values in the database |
| Search submission database | | Delete an idea | |
| Add peer comments after login | | | Update FAQ and Mission Statements View reports |

Note: Submitters are not able to make changes to an idea after it has been submitted.

User Validation—Suggestion Submission

1. To enter a submission, enter a user ID, domain, password, and enterprise to access the site. The user selects the company enterprise from a drop down list that includes, for example:
   - Branch Operations & Business Development
   - Brokerage Operations
   - Business Strategy
   - Capital Markets & Trading
   - Consumer Products
   - Corporate Administration Corporate Communications
Electronic Brokerage
Finance
Information Technology
International
Mutual Funds
Retail Client Services
Retail Finance
Retail Marketing & Management
Retirement Plan Services
Institutional
Other 2. To add a comment to an existing idea, enter domain user id, domain, password, and enterprise to access the site (select enterprise from a drop down list).

3. Capture first name and last name.

4. Use system objects to retrieve first name, last name, and email. The objects use the domain user id, domain, and password to retrieve this information.

5. Provide direction to system white pages to update first name, last name or email address as appropriate.

An alternative embodiment of the invention provides a mechanism for linking to a company database for enterprise information.

Employee/User Search

Link to view a list of the latest submissions. For the entry portal, return the list of submissions to all innovation groups. For innovation groups, return list of submissions to the appropriate innovation group (e.g. system access via an entry point for a specific business unit should return latest submissions for that business unit).

Enter search criteria to return a list of matching submissions.

Provide quick searches:

Search for submissions user has submitted.

Search for submissions user has saved but not submitted.

Search Implementation zone (ideas that have been approved, but for which there are no current resources to Implement.)

Torchbearer Search

Search all fields including innovation group qualification questions.

Submit Submissions

Enter data elements specified In the data model shown in Table 2 below.

TABLE 2

Data Model

| Table Name | Purpose |
| --- | --- |
| SC_IDEA | Contains all information associated with an idea. It is the master table which has several foreign keys to the rest of the tables in this schema. |
| SC_LOOKUP | A general purpose table used to populate drop down menus, and list boxes. |
| SC_TEXT | A general purpose table used to hold extended and descriptive text. It is currently used only to hold the text of peer comments. |
| SC_KEYWORD | Contains the keywords for each ides. Every idea is currently limited to 3 keywords, and these keywords are required, so there will be 3 entries in this table for every idea. This limitation is not a database constraint, but an application (programmed) limitation. |
| SC_PROGRAM | Contains the Program Names. As more programs are added to this application, this list will grow. Currently, this table contains only Idea Central, The Loop, SMART and VentureQuest. |
| SC_REL_IDEA | This table tracks all ideas that the user stated were similar enough to be related to their own idea. Currently, there is a limit of 10 related ideas to each idea, along with descriptive text as to why the user's idea is unique from the related idea. This limitation is not a database constraint, but an application (programmed) limitation. |
| SC_LINK | Currently not used. |

SC_IDEA

| Column | Datatype | Size | Description |
| --- | --- | --- | --- |
| ID_ID* | Int | | Unique identifier for every idea. Used to relate ideas and keywords in other tables. |
| PGM_ID | Int | | Foreign Key to SC_PROGRAM. Identifies which program this idea belongs to. |
| ID_IDEA | Varchar2 | 2000 | Contains the text of the idea the user wishes to submit |
| ID_SHORT_NAME | Varchar2 | 20 | Title of Idea |
| ID_LONG_NAME | Varchar2 | 80 | More descriptive name/title of idea |
| ID_CATEGORY | Varchar2 | 20 | Category to which this idea belongs -> fkey to sc_lookup |
| ID_ENTERPRISE | Varchar2 | 20 | Enterprise this idea belongs->fkey to sc_lookup |
| ID_SUBMIT_DT | Date | | |
| ID_STATUS_DT | Date | | Date status was set |
| ID_APPROVED_DT | Date | | |
| ID_LAST_UPDATE | Date | | Date idea was last updated |
| ID_SUBMITTER | Varchar2 | 15 | Fkey to SC_PERSON ->who submitted the idea |

TABLE 2-continued

Data Model

| ColName | Type | Size | Description |
| --- | --- | --- | --- |
| ID_SPONSOR | Varchar2 | 15 | Fkey to SC_PERSON ->who sponsored idea |
| ID_OWNER | Varchar2 | 15 | Fkey to SC_PERSON ->adopted |
| ID_TB_INCENTIVE | | | |
| ID_TB_COMMENT | Varchar2 | 2000 | Torchbearer field |
| TB_NOTES | Varchar2 | 2000 | Torchbearer field |
| TB_COMMENT_EXPANDED | Text | | Huge field to hold comments exceeding 5000 chars. |
| ID_DOMAIN | Varchar2 | 30 | Fkey->sc_lookup |
| ID_IDEA_EXPAND | Varchar2 | 2000 | If user wishes to expand on idea, it is kept here (Idea Central & SMART |
| ID_STAT_INIT | Varchar2 | 2000 | Strategic Initiative: (Idea, Smart, Venture, LOOP) |
| ID_TG_AUD | Varchar2 | 2000 | SMART: Target Audience |
| ID_WHO_BENEF | Varchar2 | 2000 | VentureQuest: |
| ID_NEED_OPPOR | Varchar2 | 2000 | VentureQuest: |
| ID_SUCCESS | Varchar2 | 2000 | VentureQuest: |
| ID_RULES_BRK_S | Varchar2 | 2000 | VentureQuest: |
| ID_RULES_BRK_I | Varchar2 | 2000 | VentureQuest: |
| ID_COMPETITORS | Varchar2 | 2000 | VentureQuest: |
| ID_DISRUPTIVE | Varchar | | VentureQuest: |
| ID_SUPPORTS | Varchar | | VentureQuest: |
| ID_PROS | | | VentureQuest |
| ID_CONS | | | VentureQuest |
| ID_TEAM | | | SMART |
| ID_SEGMENT | | | SMART |
| ID_LOCATION | Varchar | | SMART |
| ID_SCOPE | | | SMART |
| ID_BENEF_TEXT | | | VentureQuest,SMART |
| ID_TIMESPENT | | | Not Used |
| ID_IMPORTANCE | | | Not Used |
| ID_HURDLES | | | SMART |
| ID_BUSMODEL | | | SMART |
| ID_CUSTNAME | | | LOOP |
| ID_CUSTEMAIL | | | LOOP |
| ID_ACCOUNT | | | LOOP |
| ID_PRODAREA | | | LOOP |
| ID_PRODUCT | | | LOOP |
| ID_GROUP | | | LOOP |
| ID_REASON | | | LOOP |
| ID_OPINION | | | LOOP |
| ID_HURDLES_OTHER | | | SMART |
| ID_PEERS_TALKED | | | SMART |
| ID_BENEF_CUST | | | SMART |
| ID_BENEF_BOTH | | | SMART |
| ID_BENEF_COMP | | | SMART |
| ID_BENEF_OTHER | | | SMART |
| ID_ENTERPRISE_AFFECTED | | | SMART, IDEA, VENTUREQUEST |
| ID_READ_AGREEMENT | | | Not Used Yet |
| ID_BENEF_MKT | | | SMART |
| ID_BENEF_REV | | | SMART |
| ID_BENEF_COST | | | SMART |
| ID_BENEF_TEAM | | | SMART |
| ID_BENEF_MORALE | | | SMART |
| ID_SUB_OWNERSHIP | | | SMART |

| ColName | Type | Size | Description |
| --- | --- | --- | --- |
| SC_LOOKUP | | | |
| ID * | Int | | Unique identifier for a row |
| PGM_ID | Varchar2 | 10 | Fkey-> SC_PROGRAM, or used to filter program specific values to populate drop down/select boxes with. |
| LU_TYPE | Varchar2 | 20 | Status, Enterprise, . . . etc, or another filter. |
| LU_VALUE | | 20 | Value of select box |
| LU_DESC | | 75 | What is displayed by select box |
| LU_SEQNO | In | | Used to set the sort order displayed in form fields. |
| SC_KEYWORD | | | |
| ID_ID * | Int | | Which Idea this keyword belongs to. There will be three of these per idea. |
| KW_ID * | Int | | The Keyword's Identifier. |
| KW_KEYWORD | Varchar2 | 30 | The Keyword's Text in Uppercase |

TABLE 2-continued

Data Model

SC_PERSON

| Column | Type | Size | Description |
|---|---|---|---|
| PER_KEY | Varchar2 | 15 | Unique identifier for a person |
| PER_NAME | Varchar2 | 50 | First and last name separated by a space |
| PER_ENTERPRISE | Varchar2 | 20 | Enterprise person is associated with. Determined at logon. |
| PER_PHONE | | 15 | Currently Not Used: User's phone number. |
| PER_EMAIL | | 30 | Obtained by Com Object. Contact Kevin Rogers for Details. |

SC_PROGRAM

| Column | Type | Size | Description |
|---|---|---|---|
| PGM_ID * | Varchar2 | 10 | Unique identifier for Program |
| PGM_SYS_ADMIN | Varchar2 | 15 | Currently Not Used |
| PGM_INITIAL_URL | Varchar2 | 255 | Currently Not Used |
| PGM_NAME | Varchar2 | 30 | Program name used when displaying. Contains full proper name of zone or program. |

SC_REL_IDEA

| Column | Type | Size | Description |
|---|---|---|---|
| ID_ID | Int | | This Idea . . . the idea that will have ideas related to it. |
| RI_ID * | Int | | The Number of the Idea that is related to this idea: ID_ID |
| RI_UNIQUE | Varchar2 | 1000 | User's explanation of why the ID_ID is different or unique from the RI_ID. |

SC_TEXT

| Column | Type | Size | Description |
|---|---|---|---|
| ID_ID * | Int | | Idea that this text belongs to. |
| TXT_ID | Int | | Unique Identifier for this Row |
| TXT_DATE | Date | | Date this text was introduced. |
| TXT_TYPE | Varchar2 | 20 | What kind of information this text field represents . . . (Comment, peer-review, other). |
| TXT_BY | | 20 | Not currently used: Author of Text |
| TXT_TEXT | Varchar2 | 2000 | Content of the textual description. |

IDEA_CENTRAL

| Questions | Column Name |
|---|---|
| Which Schwab enterprise does your idea affect the most? | ID_ENTERPRISE_AFFECTED |
| Which of Schwab's key strategic initiatives does your idea support most? | ID_STRAT_INIT |
| If you would like to expand on your idea and why it is important, please do so here. | ID_IDEA_EXPAND |

LOOP

| Questions | Column Name |
|---|---|
| Customer Name | ID_CUSTNAME |
| Account | ID_ACCOUNT |
| Group | ID_GROUP |
| Product Area (Website, Email, Velocity, Mobile/Wireless, Other) | ID_PRODAREA |
| Product Select Boxes (LU_TYPE = Website, E-Mail, Velocity . . . etc) | ID_PRODUCT |
| Reason | ID_REASON |
| Opinion | ID_OPINION |

SMART

| Questions | Column Name |
|---|---|
| If you would like to expand on your idea and why it is important, please do so here . . . | ID_IDEA_EXPAND |
| How much ownership would you like ? | ID_SUB_OWNERSHIP |
| What areas of our business will this idea affect? Choose any that apply: External: | ID_TGT_AUD |
| Internal: Team Specific (y/n) | ID_TEAM |
| Segment/department | ID_SEGMENT |
| Location: | ID_LOCATION |
| Enterprise Affected Most | ID_ENTERPRISE_AFFECTED |
| Corporate Wide (y/n) | ID_SCOPE |
| What are the Benefits? Choose any that apply: | |
| Benefit to Customer | ID_BENEF_CUST |
| Customer/company relationship benefit | ID_BENEF_BOTH |
| Company Benefit | ID_BENEF_GUST |
| If you choose Company Benefit, please select all that apply | |
| Market | ID_BENEF_MKT |
| Revenue Enhancer | ID_BENEF_REV |
| Cost Saver | ID_BENEF_COST |

TABLE 2-continued

Data Model

| | |
|---|---|
| Teamwork | ID_BENEF_TEAM |
| Morale | ID_BENEF_MORALE |
| Risk Reduction | ID_HURDLES |
| Other: | ID_BENEF_OTHER |
| Which one of Schwab's strategic priorities does your idea support most? | ID_STRAT_INIT |

VENTUREQUEST

| | |
|---|---|
| Which one of Schwab's strategic priorities does your idea support most? | ID_STRAT_INIT |
| Who would benefit the most? (customer/Employees?) | ID_WHO_BENEF |
| Describe the employee/customer segment: | ID_BENEF_TEXT |
| What specific need or opportunity would this idea tackle? | ID_NEED_OPPOR |
| What signifies success for this idea? | ID_SUCCESS |
| What (stated or unstated) rules would this idea break? | |
| Industry rules broken | ID_RULES_BRK_I |
| Schwab rules broken | ID_RULES_BRK_S |
| What competitors would this idea upset? | ID_COMPETITORS |
| How disruptive would this idea be? | ID_DISRUPTIVE |
| Which Schwab enterprises would be affected? | ID_ENTERPRISE_AFFECTED |
| Who supports this idea internally | ID_SUPPORTS |
| What are the pros of this idea, from supporters perspectives? | ID_PROS |
| What do supporters say are the cons of this idea? | ID_CONS |

* Primary Keys

Ideas can be submitted through the entry portal or innovation group portals.

Routing questions to determine to which group the submission goes.

Automatically return a list of related ideas that can be appended to the idea submission. There is a uniqueness field that allows users to explain why their idea is different from other related ideas.

Related Idea Search

Create database search, e.g. SQL, statements based on keywords.

Search options include a cascade search: first keyword matches, long description matches, and then text matches. The preferred embodiment of the invention stops the search after a predetermined reasonable number of, e.g. ten, hits and returns the results.

In the preferred embodiment of the invention, the search is not case sensitive.

An alternative embodiment of the invention comprises a search engine.

Idea Submission

Users can edit text of a submission they own. However, they cannot change the status of an idea.
  Save an idea without submitting it to torchbearers.
  Users can append the following to submissions they own:
  Append a comment.
  Append a link to supporting documentation.
  Append a link to a related idea.

TorchBearer User Functionality
  Security
  System objects handle levels of access according to distribution lists. There is a distribution list for each group of torchbearers.
  TorchBearer Review
  Cannot change text of submission.
  Can change status, category, affected department, sponsor, and owner.
  Can change innovation group (idea is re-submitted).
  Can append idea review comments.
  Can add a field to track any rewards. Rewards are viewable only by torchbearers.
  Update Content
  Update mission statement and FAQ.
  Reports
  Ability to view innovation group statistic reports.
  Ability to print information about idea(s).
  Security and Verification
  Uses system objects to validate the login and return first name, last name, and email address of the user based on:
  Domain;
  ID; and
  Password.

Alternative embodiments of the invention provide an interface to lookup a user based on name.

Access levels are determined by distribution lists.

Alternative Embodiments of the Invention—Functionality

The following discussion describes alternative/additional features of the invention.

Content Management
  System additionally includes any of:
  Mission statement;
  Letter from a company executive or submission program sponsor;
  Success stories; and
  Others as identified, Qualification Questions
  Change text of question.
  Build subsets of questions.
  Add/Edit/Delete questions.

Administration
  Add/Edit/Delete departments.
  Add/Edit/Delete innovation groups.
  Add/Edit/Delete categories.

Add/Edit/Delete status options.

Database Archiving
Archive submissions.

Reports
Create additional reports, including:
Statistical reports by group;
Statistical reports across groups; and
Content reports.

Security Objects
Support lookups.

Export Data to Tabbed Separated Files
Reports.

Entry Portal Links and Content

Figure 2:
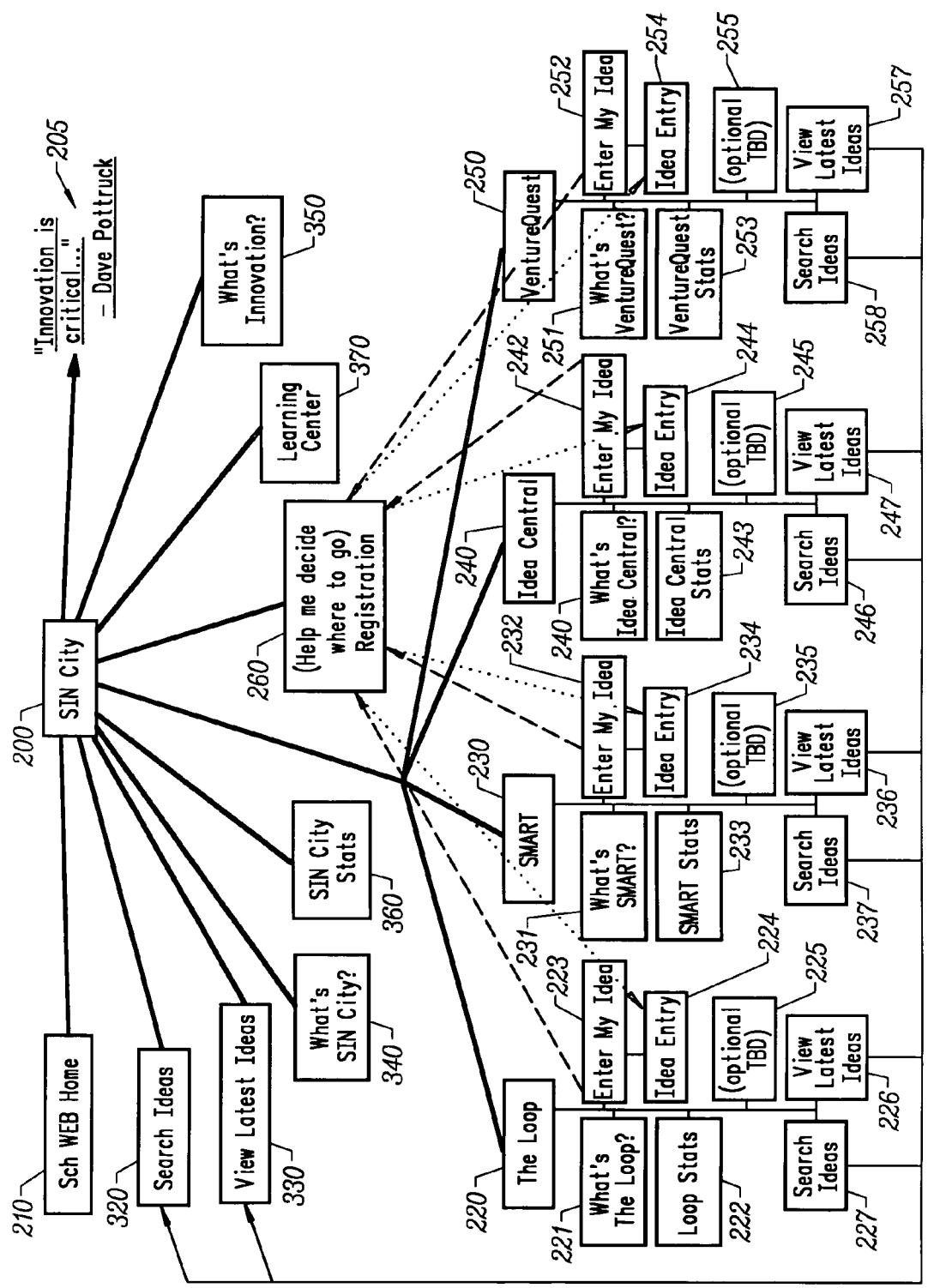
FIG. 2 is a block schematic diagram of a static content map for an idea submission system according to the invention.

FIG. 2 is a block schematic diagram of a static content map for an innovation network according to the invention.

The system comprises a portal page with links to each innovation group (IG) portal. In general, the types of links at the entry portal level are duplicated to links at the IG level on the IG portal pages.

In FIG. 2, a first level entry portal (200) to the innovation network allows access to a company home page (210), a message from management concerning innovation and its value to the company (205), information concerning innovation (350), various user resources (370), a description of the innovation network (340), various statistics (360), a search facility (320), a facility for viewing submissions (330), and a mechanism for routing a user to a most appropriate point of entry to the innovations network (260).

If the user knows which portal he desires to enter, the user may enter the portal from the first entry level portal. In this embodiment of the invention, the portals are identified as the LOOP (220), SMART (230), IdeaCentral (240), and VentureQuest (250). As discussed above, if the user is uncertain as to the portal through which he should enter the innovation network, the invention provides a dialog that directs the user to the most appropriate portal (260).

For each portal, there is a set of dialogs that allow the user to submit ideas, search for ideas, and view ideas. The various portal also include additional features that are specific to the portal (discussed below). Features that the various portal have in common include an information page (221, 231, 241, 251), a statistics page (222, 233, 243, 253), an idea entry page (223, 232, 242, 252), an idea submission function that provides a user with the opportunity to review his submission before it is entered into the system (224, 234, 244, 254), a search feature that allows a user to search through ideas, either for inspiration or to locate related ideas (227, 237, 246, 256), a view function that allows a user to browse through the ideas within the portal and view same (226, 236, 247, 257), and various other functions (225, 235, 245, 255) which are discussed below.

Static Content MapPage Requirements and Functionality

Figure 3:
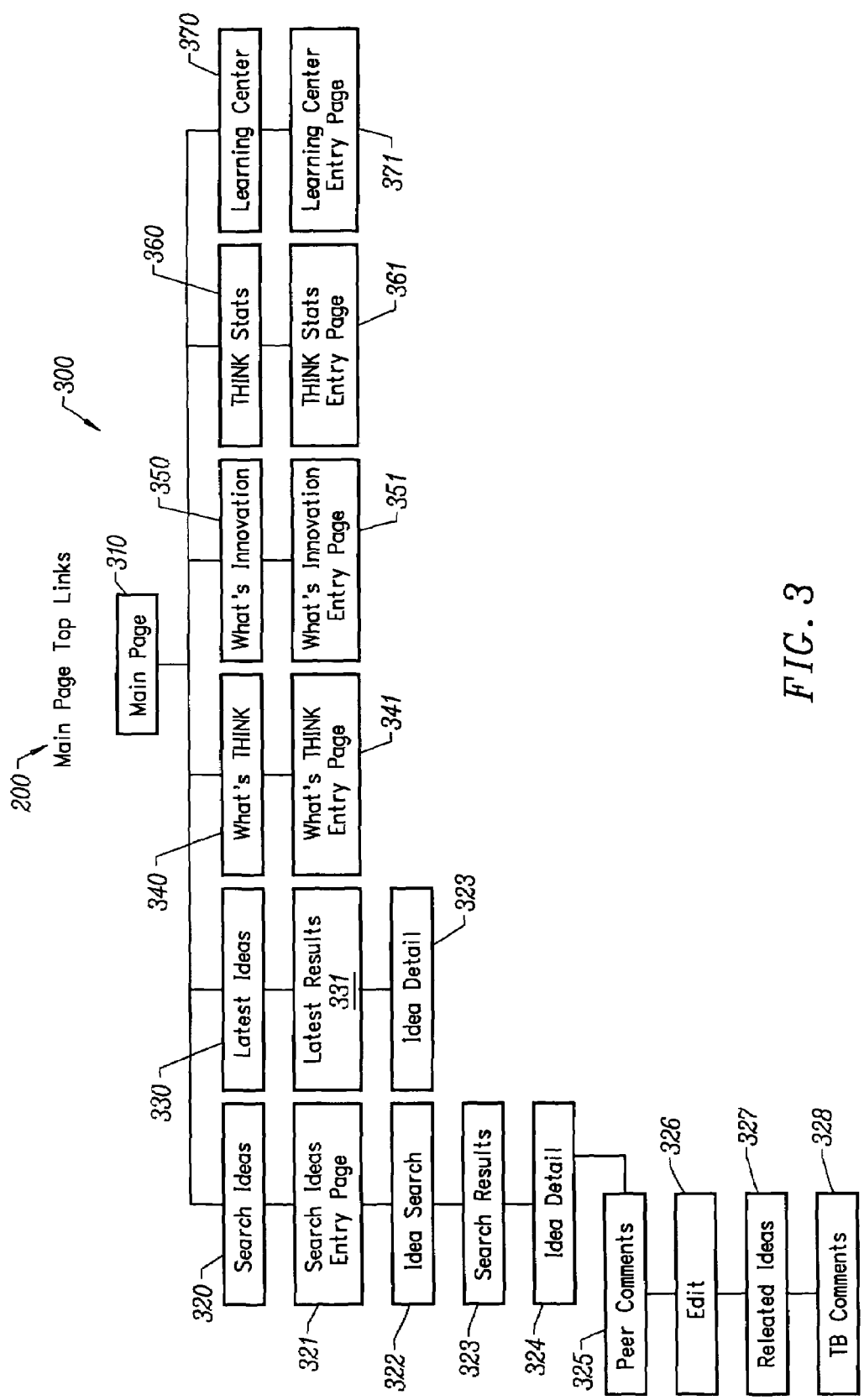
FIG. 3 is a block schematic diagram of an idea submission main page showing top links according to the invention.

FIG. 3 is a block schematic diagram of an idea submission main page (300) showing top links according to the invention. In FIG. 3, the main entry portal (310) is reached from a company home page (200) via a link provided in the home page. From the innovation network main page (310), the user may search ideas (320), view ideas (330), read information about the innovation network (340), read a discussion on the subject of innovation (350), view statistics on the innovation network (360), and be advised of various resources for further information (370).

Each of these functions is supported at additional levels. Thus, an idea search (320) includes a idea search entry page (321) from which a search may be performed (322), by which search results are returned to the user (323), and from which the user may view the details of any idea so located (324).

The user may also add peer comments to an idea (325), the idea may be edited by appropriate persons (326), related ideas may be linked to the idea (327), and the torchbearer may add comments concerning the idea (328). While these features are described in connection with a search function, it will be appreciated that they are readily accessed through other innovation network functions.

The user may view submissions (as discussed above), including the latest results (331) and the details of any submissions (332).

Information concerning the innovation network may also include a entry page (341). Likewise, information describing innovation may include an entry page (351), the statistics functions may include an entry page (361), and the user resources function may include an entry page (371).

Figure 4:
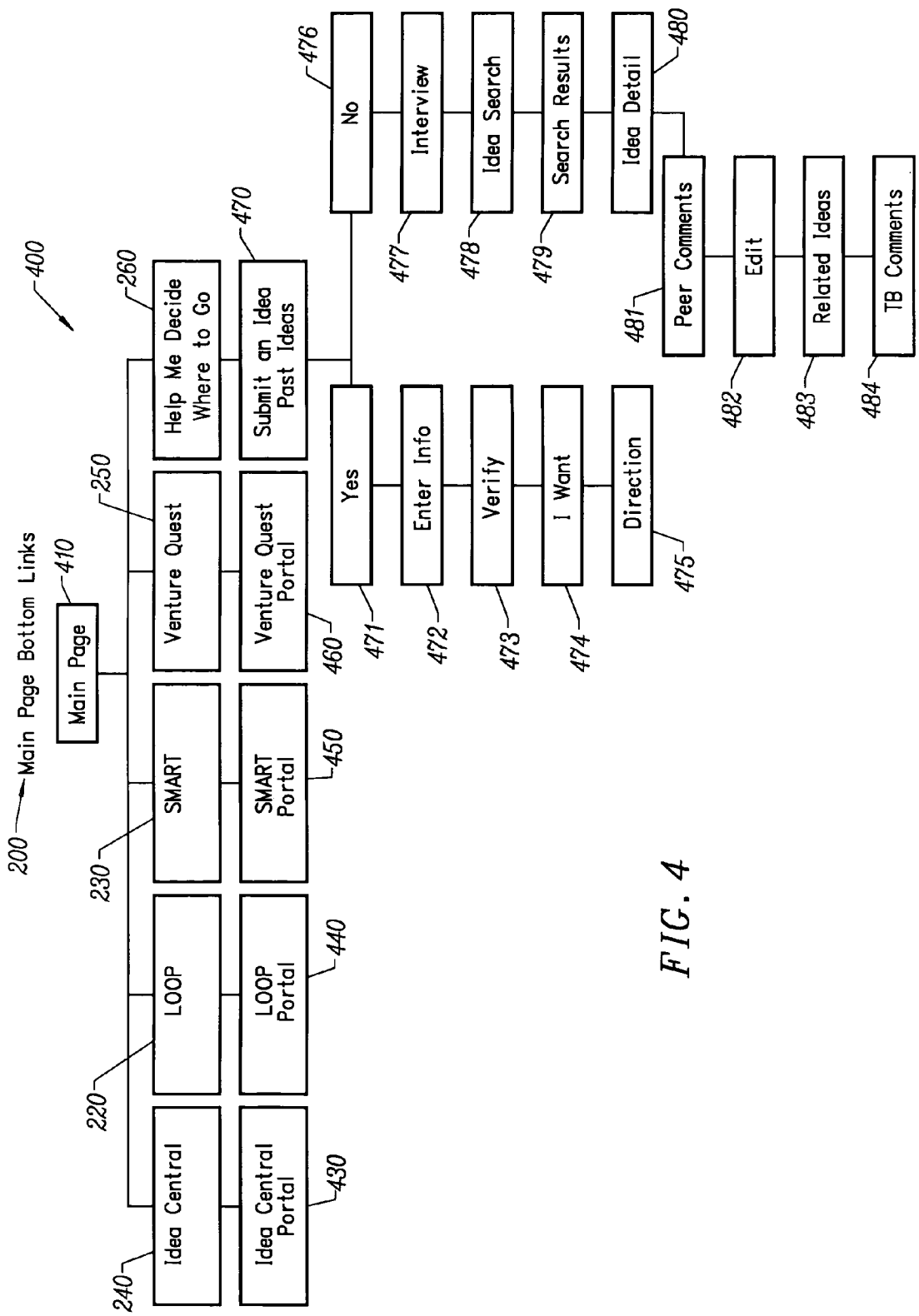
FIG. 4 is a block schematic diagram of an idea submission main page showing bottom links according to the invention.

FIG. 4 is a block schematic diagram of an idea submission main page showing bottom links according to the invention. From a link or dialog (410) on the main page, the user may enter any of the various portals provided in the innovation network. Thus, if the user selects IdeaCentral (240), he is directed to the IdeaCentral portal (430); if the user selects the LOOP (220), he is directed to the LOOP portal (440); if the user selects SMART (230), he is directed to the SMART portal (450); and if the user selects VentureQuest (250), he is directed to the VentureQuest portal (460).

An important feature of the invention is the ability to support multiple portals that serve to direct submissions to a most appropriate location within the company, such that they are considered by the most appropriate persons. This feature is enhanced by the provision of a facility for assisting a user in directing their submission to the most correct and appropriate portal (260). Such feature guides the user through a dialog such that the suggestion is automatically routed to the most appropriate portal as a result of the user's responses. In such facility, the user may have previously submitted an idea (470, 471). In this case, the user may already know the most appropriate portal to which his submission is to be directed. The user enters the submission (472), verifies that the submission is correctly entered (473), indicates a level of commitment to the submission (474), and the submission is directed for viewing and consideration (475).

If the user has not submitted an idea previously, or is not certain which is the most appropriate portal (470, 476), the invention provides an interview dialog (477). As part of this process, the user may search the idea (478), for example to locate related ideas, view the search results (479), and view individual submission from the listed results (480). The user may also add peer comments to an idea (481), the idea may be edited by appropriate persons (482), related ideas may be linked to the idea (483), and the torchbearer may add comments concerning the idea (484).

Figure 5:
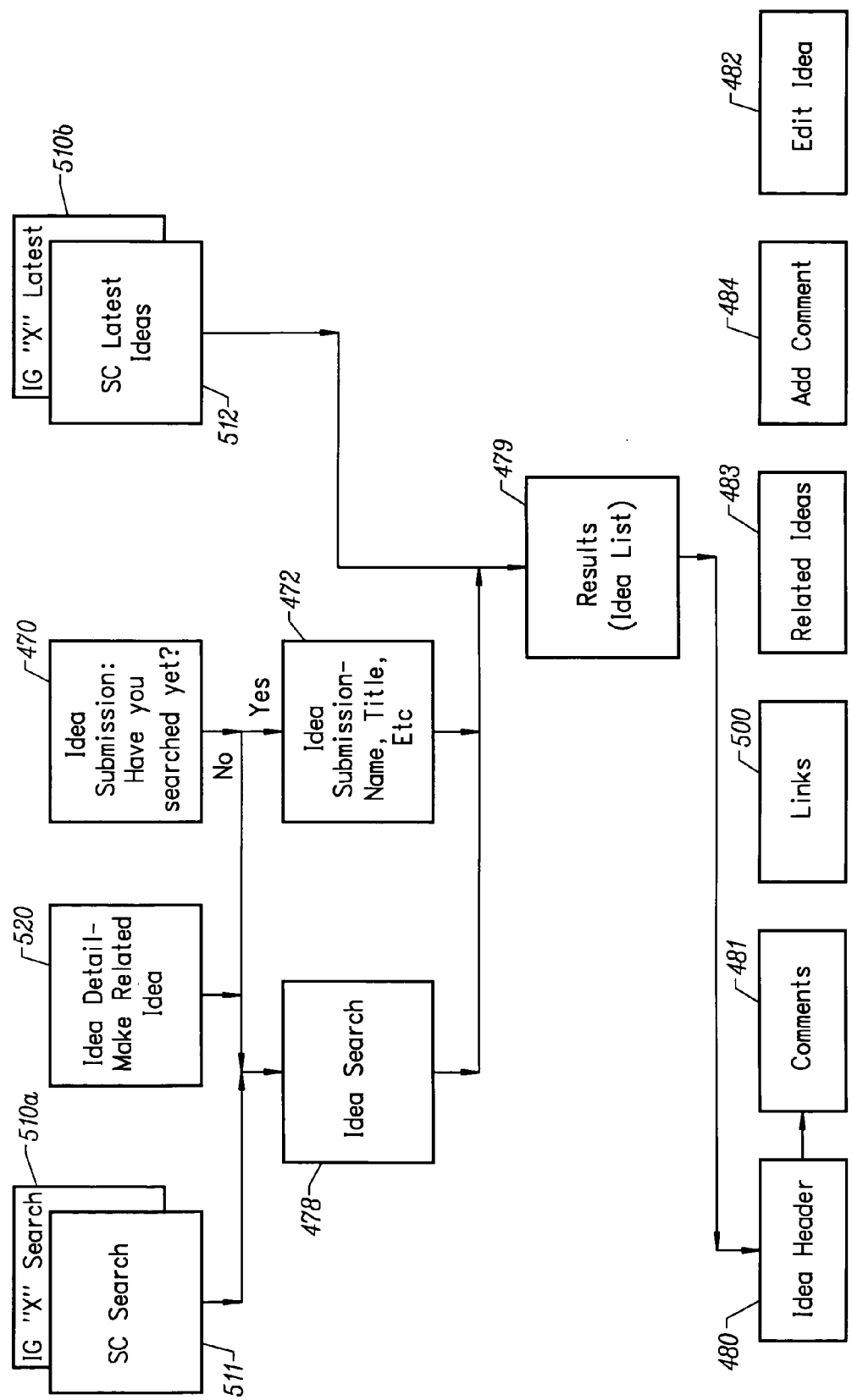
FIG. 5 is a block schematic diagram of a search page site map according to the invention.

FIG. 5 is a block schematic diagram of a search page site map according to the invention. In FIG. 5, two initial types of searches are offered, a general search (510a) and a latest submissions search (510b). Each of these searches proceeds through a corresponding search dialog (511, 512). The user may also use the search mechanism to locate ideas and link them to other ideas (520). Finally, the user typically incorporates an idea search into the idea submission process (470) to avoid duplication of ideas and to provide links to related ideas. In the later case, if the idea submission search has already been performed the idea may be submitted without additional searching (472). In all other cases an idea search is undertaken by the system (478).

An idea list (479) is generated as a result of an idea search, an idea submission search, or a latest ideas search. The list is used to access various ideas via an idea header (480). Once the idea is selected for viewing, the user may add comments (481). The idea submission mechanism also provides for the creation of links to other information (500), the incorporation of related submission (483), the addition of comments (484), and editing of the submission (482).

The following discussion describes the search mechanism in greater detail.

Search Ideas

A set of fields for entering search criteria, plus one or more check boxes, e.g. "ideas submitted by me".

Search Results

A list of ideas matching search criteria from one or more search Ideas pages, or other processes. At least three parts of the application go to this page and display a list of ideas.

Latest Ideas

A list of ideas matching various criteria; e.g. the last ten ideas submitted across all of the innovation groups, or the last three submitted for each. This page is the same as the search results page, but with a different title/message.

Enter My Idea (Where to Go)

An idea is entered via a series of pages. An idea is entered from either the entry portal or one of the IG portals. Depending on how a user arrives at the idea submission point in the system, the graphic treatment may be different, but the layout is preferably identical.

Once past the initial pages, the rest of the pages vary depending on the IG to which the idea is submitted.

The following illustrates the pages associated with a user dialog during idea submission:

Page 1
 Checked for Similar Ideas?
 Have you checked the Idea database for similar ideas?
 Yes
 No
 If yes, proceed to Login; if no send to Search Ideas.

Page 2
 Login
 User enters following:
 Domain
 ID
 Password
 Enterprise—(drop down list of enterprise groups within company)
 If login successful, go to Verification; if not, message and reprompt.

Page 3
 Verification
 Show
 ID
 Name
 Email
 An informative message at the bottom of the page, e.g. "If name or email information is incorrect, do XXX to fix it. You may still submit your idea if the information is incorrect."

Page 4
 Routing Questions
 Two questions, implemented as radio buttons in the preferred embodiment of the invention:
 My idea is focused on the company external Web site;
 My idea improves upon our current business process; or
 My idea is revolutionary and will change the way we do business.
 And:
 I want to own my idea through presentation and approval; or
 I want to submit my idea and watch from the sidelines.
 Where a user goes depends on his answers to above and his enterprise (from page 2). The user sees a page, e.g. "The best place for your idea is <Innovation Group>.
 Which IG the user's idea is routed to is based upon:
 If Web focused, then to the Web related portal.
 If my idea improves business process, then to the company related portal.
 If not Web, and the enterprise is a specific business unit within the company, then to that business unit.
 If my idea is revolutionary and I want to own idea, then to the portal for ideas that challenge the company's current business ideas.
 If my idea is revolutionary, but I don't want to own idea, then to a central suggestion repository.

Page 5
 After displaying message about the IG to which the idea is to be submitted, the system proceeds to a page that, aside from graphics, is the same for all IGs (page 5).
 Idea Submission Form
 Form asking the following:
 Idea Name (20 characters)
 Idea Title (80 characters)
 Keywords (3 to 5)
 Idea Category (from dropdown)
  Product
  Service
  Work Process
  Employee-Related
  Other
 When the user clicks the "Continue" button, the application performs a search on the idea database and sends the user to the Search Results page. There is a title/message making it clear that the system found ideas that may be similar to the idea that the user is about to enter.
 From the Search Results page there is a button for continuing the idea submission process. This button is only there if the user got to the Search Results page through the idea submission process. This button takes user to Interview 5.

Idea Detail Pages
 Page shows idea information. Depending on privileges of user, different buttons are enabled:
 Buttons:
  View Comments (shows all comments of all types)
  View Links (e.g. links to files, URLs in support of idea)
  View Related Ideas (Idea List of related ideas)
  Add Peer Comments (data entry screen to add a Peer Comment)
  Edit Idea (Form to update fields per security/authority)
  Add Related Idea
  Add TorchBearer/Other Comment

Entry Portal Statistics Page

The statistics page provides core statistics that appear for each statistic page. The entry portal shows statistics for all innovation zones. While statistics for each innovation zone show only statistics for that zone.

Table 3 below shows statistics for the various entry points of the system

TABLE 3

Statistics Kept, By Entry Point

| Business Unit Specific | Central Idea Repository | Web | Revolutionary Ideas |
|---|---|---|---|
| Site hits by month | | | |
| Submissions (last quarter, quarter to date) | Ideas submitted this week (or month) | | |
| Approved submissions from last quarter | Number of ideas submitted by category (product ideas, service ideas, work process ideas, employee-related ideas, other ideas) | | |
| Submissions approved for local "go" (last quarter, plus this quarter to date) | Ideas submitted to date | | |
| Ideas implemented (year to date) | | | |
| All of the above by team, segment, enterprise and idea category | | | |
| | User sessions to the portal home page Number of ideas submitted by category (product ideas, service ideas, work process ideas, employee-related ideas, other ideas) Top keywords (pulled from keywords entered by idea owners not what's searched) Which enterprise is receiving most ideas - by month (this only works if all enterprises have the same question, e.g. "which enterprise is most affected by your idea) | | |

Qualification Questions

There are one or more IG specific pages on which a person making a submission is asked for idea information. After all of the idea entry pages are completed, the user goes to the Submit/Save page. The user may submit the idea, or save it and perhaps submit at later time:

Submit my idea.

Save my idea so I can work on it later.

If an idea is submitted, the application generates a confirmation email.

Qualification Questions—Submission of Ideas the Change Company's Way of Doing Business
  There should be only one answer to each question.
  How well does the idea fit with company's strategic priorities?
    Select the main priority this idea addresses:
    Provide Spectacular Customer Service
    Invest in World-Class Talent
    Offer Company-Style Help and Advice
    Extend the Reach and Meaning of Company Brand
    Expand into New Lines of Business
    Broaden Company's Electronic Services
    Target Different Customer Segments
    Foster Innovation
    Continuously Improve our Processes
    Maintain Superior Technology
    None of the above, but still a great idea
    Who Would Benefit the Most?
    Customers?
    Describe the customer segment:
  (click here for examples)
  [EXAMPLES: 401 (k) plans smaller than $20 million; prospects with under $5,000 to invest; people who own small countries]
    Employees?
    Describe the employee segment:
  (click here for examples)
  [EXAMPLES: employees with more than five years at Company; new employees; employees named Gilbert or Sullivan who work in that new musicals enterprise]
    What specific need or opportunity would this idea tackle?
  (click here for examples)
  [EXAMPLES: we don't offer corporate trustee services yet and it's a $47 billion dollar business; no one in the industry is printing their own currency and we could be first]
    What signifies success for this idea?
  (click here for examples)
  [EXAMPLES: revenues of $32 trillion; cost savings of $16 gazillion; customer relationships having cement-like consistency; market share of 99.44 percent; bragging rights for being first; employee retention rates so high everyone has caller ID to screen out those bothersome headhunter calls]
    What (stated or unstated) rules would this idea break?
    Company rule(s):
  (click here for examples)
  [EXAMPLES: prospects with less than $5,000 to invest are unprofitable; we're in the financial services business; the Web is the platform for the future]
    Industry rule(s):
  (click here for examples)
  [EXAMPLES: the stock market isn't a safe short-term play for individual investors; by 2005, there will be only five global financial powerhouses; the experts know better than a bunch of darts randomly thrown]
    Which competitors would this idea upset the most?
  [EXAMPLES: Full commission brokers; Discount brokers; Mutual fund companies; Banks Wells Fargo; Insurance]
    How disruptive would this idea be?
    Extremely disruptive
    (It would really shake things up in a revolutionary way.)
    Disruptive
    (Things would have to change significantly. If your idea is not disruptive, your idea belongs in the central idea repository.)

Which company enterprises would be affected?
All
Branch Operations & Business Development
Brokerage Operations
Business Strategy
Capital Markets & Trading
Consumer Products
Corporate Administration
Corporate Communications
Electronic Brokerage
Finance
Information Technology
International
Mutual Funds
Retail Client Services
Retail Finance
Retail Marketing & Management
Retirement Plan Services
Institutional
Who supports this idea internally (at the time of submission)?
What are the pros of this idea, from supporters' perspectives?
What do supporters say are the cons of this idea?

Business Unit Qualification Questions
How well does the idea fit with Company's strategic priorities?
　Select the main priority this idea addresses:
　Provide Spectacular Customer Service
　Invest in World-Class Talent
　Offer Company-Style Help and Advice
　Extend the Reach and Meaning of Our Brand
　Expand into New Lines of Business
　Broaden our Electronic Financial Services
　Target Different Customer Segments Foster Innovation
　Continuously Improve our Processes
　Maintain Superior Technology
　None of the above, but still a great idea
　How much ownership would you like?
　Complete—I'd like to own it all the way through the presentation and implementation stages, getting help from a torchbearer and other experts as needed.
　Partial—I'd like to own this idea only to the presentation stage, getting help from a torchbearer and other experts as needed.
　None—I don't want to own it at all.
If the idea gets approved, how much time would you personally be able to provide to assist in implementation?
If you would like to expand on your idea and why it is important, please do so here?
　Who is the target audience (what areas will this affect)?
　Check and fill in blanks as appropriate to your idea:
　External
　(drop down list)
　Existing customers
　New segment
　Prospects
　All of the above
　Internal
　Team: text field
　Segment/department: text field
　Location: drop down list
　　Denver
　　Phoenix
　　Indianapolis
　　Orlando
　　San Francisco
　　More than one
　Enterprise: drop down list Defining Measurements of Success
　What are the benefits?
　Customer benefit: drop down list
　　Revenue Enhancer
　　Cost Saver
　　Teamwork
　　Moral
　　Market Entry
　　Risk Reduction
　　Other
　　Other: text box
　Customer/company relationship benefit: text field
　What are the potential hurdles to implementation?
　Time
　Resources (people, money)
　Access to corporate
　Availability of information
　Other:
　Other: text box
　How does this change the current business model? (optional)
　Have you done a peer review?
　(Y/N)
　If no, display text suggesting they have peer reviews.

Qualification Questions for Central Entry Portal
　Which Company enterprise does your idea affect the most?
　　All
　　Branch Operations & Business Development
　　Brokerage Operations
　　Business Strategy
　　Capital Markets & Trading
　　Consumer Products
　　Corporate Administration
　　Corporate Communications
　　Electronic Brokerage
　　Finance
　　Information Technology
　　International
　　Mutual Funds
　　Retail Client Services
　　Retail Finance
　　Retail Marketing & Management
　　Retirement Plan Services
　　Institutional Which of Company's key strategic initiatives does your idea support most?

(matches entry portal for ideas that change the company's way of doing business)
　Provide Spectacular Customer Service
　Invest in World Class Talent
　Offer Company-Style Help and Advice
　Extend the Reach and Meaning of Company Brand
　Expand into New Lines of Business
　Broaden our Electronic Financial Services
　Target Different Customer Segments
　Foster Innovation
　Continuously improve our Processes
　Maintain Superior Technology
　None of the above but I think the idea is worth considering If you would like to expand on your idea and why it is important, please do so here.

Functional Requirements—Business Unit Specific Entry Portal
  Home Page
  Similar look and feel to main entry portal
  What is the business unit specific entry portal (Update Content)
  mission statement
  FAQ
  Incentives
  Search Ideas
  Statistics
  Learning Center
  View Latest Ideas
  Contact List I "if you have further questions, please see your local . . ."

Routing Questions
  Same as the application entry portal.
  Owner/Implementer Field
  There are two ownership "names," i.e. "implementer," and "owner" (who is always listed as the idea originator no matter what the status).
  Torchbearer Incentive Field
  There is an incentives memo field that allows torchbearers to add an incentive which is then provided to the employee.

Search capability
  Recognizes repeat ideas as they are entered;
  Asks the representative to identify why this idea is different;
  When a "past idea" is recognized, allows new owner to combine forces with past owner if idea has not yet been implemented;
  When recognizing duplicate ideas, adds text to not scare people away—"if old idea, environment may be different now."

Implementation Zone
  Separate area for ideas that have already been submitted and approved, but need implementation due to lack of available resources;
  There is a "needs implementation" status;
  Adopter with resources can pick up and implement/project manage;
  Allows ideas to be sent only at the option of the idea owner—unless it is determined that the owner is not attempting to work on the idea. In the latter case, the ideas can be placed here after consulting with owner.
  What are the idea status options?—"Status" list
  Not submitted—for adoption zone needing an owner;
  Submitted, not reviewed;
  Under review;
  No go;
  Go;
  Further study;
  Needs implementation–approved, but needs implementation support;
  Completed.

Local Flag
  On "simple" or "local" fixes, an idea is flagged to route the idea efficiently to local resources.

Email Notification
  An "Acceptance of idea" email auto-reply is provided on all submissions to set expectations on the process. Email tells the idea's owner to which portal that idea was sent.

Peer Rating
  Make "peer rating" optional, but offer some incentive (i.e. "your idea will be given more weight,"). Also, guarantee that original idea owner name stays with idea while peer review is being obtained.
  Leave it open ended as an additional idea descriptor, and also ask for comments from other employees, or "what sparked this idea?"

Email Notification Pick List
  Auto response on "no go," with "ten common reasons" that can be checked off.

Content Management
  Contact management system.

DB Export
  Can export data from database to spreadsheet.

Online Guidance
  Presentation guidelines;
  Project management guidelines and steps;
  "idea owner handbook."

Back-End Query Functionality
  Reporting;
  Tracking.

EXAMPLE

Figure 6:
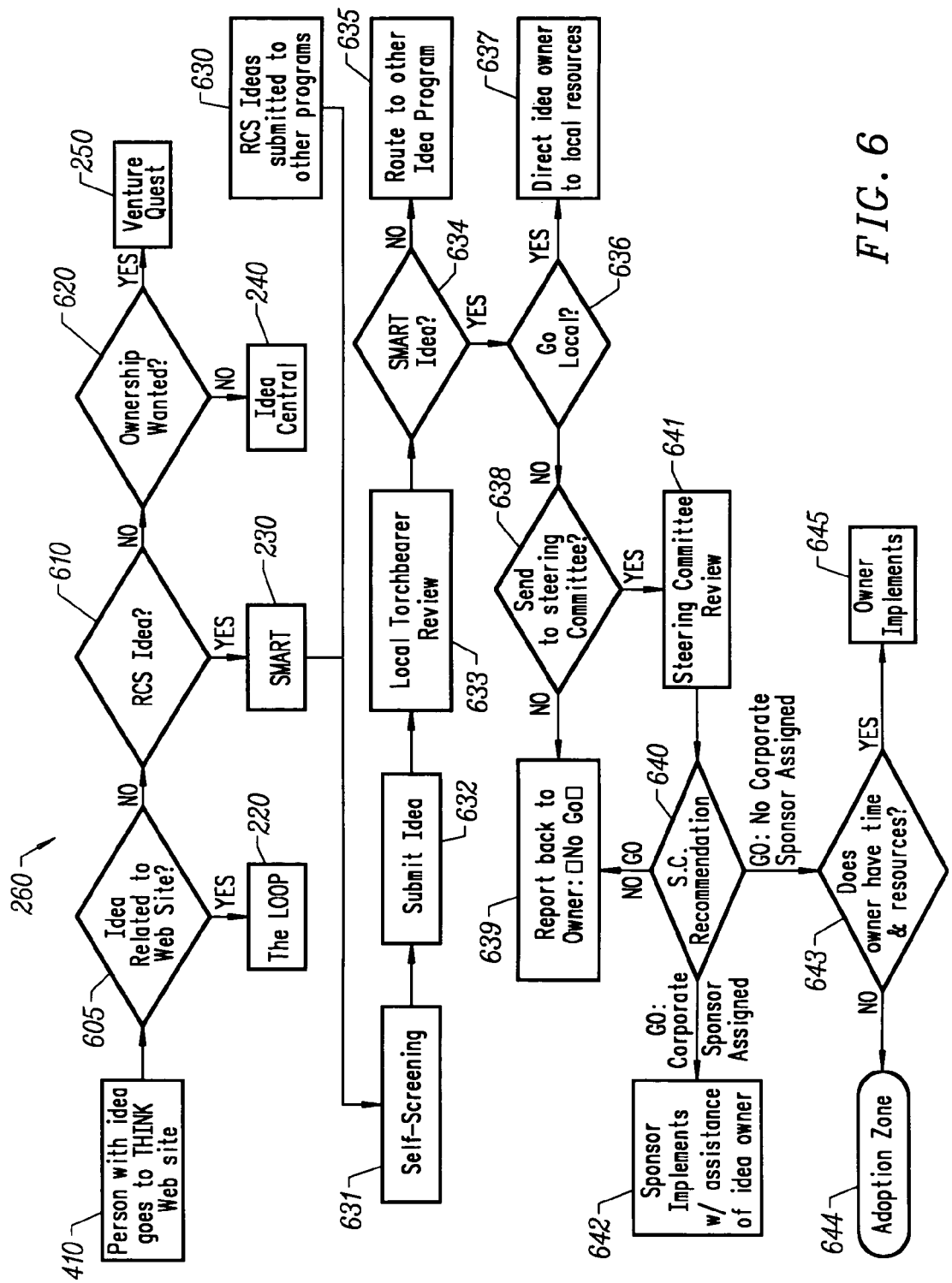
FIG. 6 is a flow diagram showing a SMART process according to the invention.

FIG. 6 is a flow diagram showing process for a business unit specific entry portal (SMART) according to the invention. In this example, a person having an idea that they wish to submit to the company enters the innovation network at the innovation network Web site (410). The point of entry could also be via a company intranet, or through a dedicated facility, such as a kiosk in the company cafeteria.

The user is directed to a most appropriate submission portal via a dialog (260) that automatically directs the submission as a result of a user interview. The interview comprises various questions that resolve a destination for the user submission.

In this example, the user is asked if the idea relates to the company Web site (605), in which case the user is directed to a portal which is referred to as the LOOP (220); and the user is asked if the idea is related to a specific business unit (610), in this example retail customer services (RCS), in which case the user is directed to a portal which is referred to as SMART (230). If the first two portals are not the most appropriate, then the user is asked if he wants ownership of the idea (620). Ownership, for purposes of this discussion, refers to the degree of commitment the user has to seeing the idea through to fruition. If a requisite degree of ownership is not desired, then the idea is directed to a portal which is referred to as IdeaCentral (240); if the requisite degree of ownership is desired, then the idea is directed to a portal which is referred to as VentureQuest (250).

While this example concerns the presently preferred implementation of the SMART portal, it will be appreciated by those skilled in the art that the invention may be implemented using similar features on any number of portals, and that the portals themselves may be created and operated to collect and evaluate submissions for any number of areas of concern to the company. For example, if the innovation network is used by a government entity, rather than a for-profit company, there may be portals for customer service, infrastructure, and the like.

In this example, the user is directed to the SMART portal (230). Ideas submitted to this portal may also be routed to other portals (630), such that the submission is directed to all appropriate locations and thus achieves maximum exposure within the company.

The submission process is initially self screening (631) in that the user may determine that the submission is not necessary as a result of a search or by viewing other submission. If the user submits an idea (632), it is subjected to a local torchbearer review (633) as a first level of evaluation thereof. The review process is used to determine if the idea is appropriately placed at this portal (634) and, if not, it is routed to another, more appropriate, portal (635).

If the idea is corrected placed, a determination is made whether the idea is to be considered locally (636), in which case the user is directed to a local resource (637). If the idea is has company-wide application, then a determination is made whether the idea is to be sent to a steering committee for review (638). If the idea does not merit such review, then a report is provided to the owner of the idea (who may be the submitter of the idea or may be another individual having ownership of the idea) indicating that the idea is "no go" (639). If the idea has merit, it is routed to the steering committee for review (641). The steering committee evaluates the idea and makes a recommendation (640). If the recommendation is "no go" ((639) the owner of the idea is so advised. If the steering committee recommends GO, the idea may either be routed to a corporate sponsor who implements the idea with the assistance of the idea's owner (642); or a determination may be made whether the owner has the time and resources necessary to implement the idea (643, 645) or whether the idea should be placed in an adoption zone (644) until a sponsor is found or volunteers to implement the idea.

System Navigation—Graphical User Interface

The following discussion and related figures provide a practical implementation of the preferred embodiment of the invention discussed above. In particular, the graphical user interface is described in detail, where the same numeric reference designators that correspond to previously discussed features of the invention are used to identify such features in connection with the graphical user interface. To the extent that these features are already discussed herein, a discussion thereof is not provided below.

Figure 7:
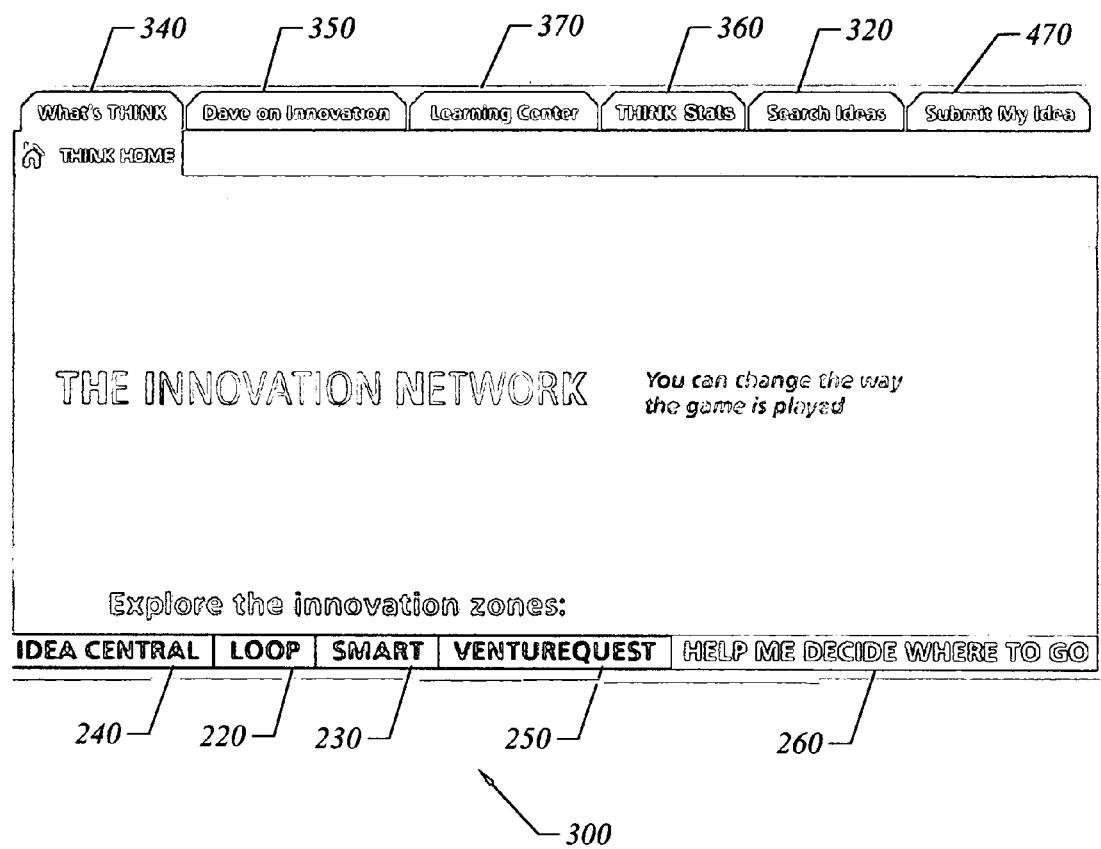
FIG. 7 is a screen display showing a multi-portal home page according to the invention.

FIG. 7 is a screen display showing a multi-portal home page according to the invention.

FIG. 8 is a screen display showing an introduction and frequently asked questions (FAQ) dialogue for a multi-portal home page according to the invention.

FIG. 9 is a screen display showing an executive introduction to a multi-portal home page according to the invention.

FIG. 10 is a screen display showing a learning center page for a multi-portal home page according to the invention.

FIG. 11 is a screen display showing a statistics page for a multi-portal home page according to the invention. In this example, statistics are provided based upon ideas submitted over various time intervals and by portal of entry (1110); a status table is provided, based upon actions taken or to be taken, and based upon portal of entry (1120), and ideas are sorted by category and portal of entry (1130).

FIG. 12 is a screen display showing a search page for a multi-portal home page according to the invention. In this example, various search criteria may be entered (1210), e.g. by means of various pull down menus or data entry fields (1220). The user may complete the search dialog and either submit the search (1230) or clear the form (1240) to reenter search criteria.

FIG. 13 is a screen display showing a search results page for a multi-portal home page according to the invention.

FIG. 14 is a screen display showing a detailed search result for a multi-portal home page according to the invention. In this example, a submission is shown including summary details (1410), such as submitter's name and the like, a description of the idea (1430), a comment (1420), and a list of comments submitted, along with identifying information (1440).

FIG. 15 is a screen display showing a comment field for an idea located during a search in a multi-portal home page according to the invention. In this example, the comment field (151) is a text box. However, a pull down menu or other mechanism may also or alternatively be provided for the entry of comments.

Figure 16:
FIG. 16 is a screen display showing an idea submission dialog that is associated with an idea located during a search in a multi-portal home page according to the invention.

FIG. 16 is a screen display showing an idea submission dialog that is associated with an idea located during a search in a multi-portal home page according to the invention.

FIG. 17 is a screen display showing an idea routing dialog that is associated with an idea located during a search in a multi-portal home page according to the invention. In this example, the user has selected "My idea relates to Electronic Brokerage (EB) products (1710). Thus, the system routes the submission to the LOOP.

FIG. 18 is a screen display showing an idea entry dialog in a multi-portal home page according to the invention.

FIG. 19 is a screen display showing a related idea located during idea submission in a multi-portal home page according to the invention. In this example, the related idea (1910) is presented and the user may link the idea to (1920) and/or differentiate the idea from (1930) the related idea.

Figure 20:
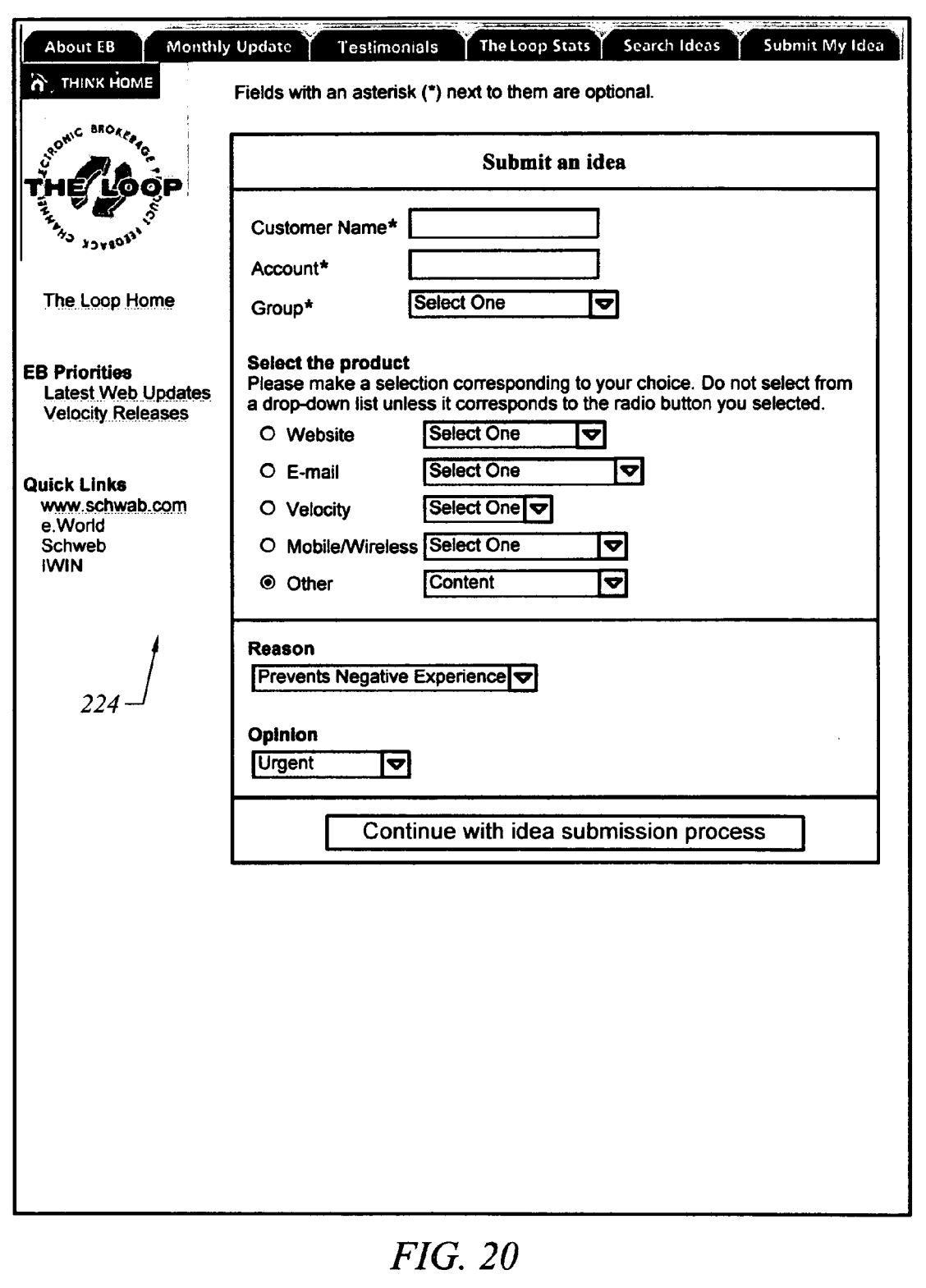

FIG. 20 is a screen display showing an idea submission dialog in a multi-portal home page according to the invention.

FIG. 21 is a screen display showing an idea submission review dialog in a multi-portal home page according to the invention. In this example, the user is presented with an opportunity to review their submission (2110). By submitting the idea, the user assigns all rights in the idea to the company (2120), thereby allowing the company freedom of action with regard to implementation thereof.

FIG. 22 is a screen display showing an acknowledgement page for an idea submission in a multi-portal home page according to the invention. In this example, the idea number is merged with the acknowledgement (2210). In other embodiments of the invention, different degrees of personalization may be provided, for example using well known text merge functions.

FIG. 23 is an email acknowledgement for an idea submission in a multi-portal home page according to the invention. In this example, the idea number is merged with the acknowledgement (2310). In other embodiments of the invention, different degrees of personalization may be provided, for example using well known text merge functions.

FIG. 24 is a screen display showing an idea routing dialog in a multi-portal home page according to the invention. In this example, the user has selected "My idea is primarily related to Retail Client Services" (2410). Thus, the submission is routed to the SMART portal.

FIG. 25 is a screen display showing an initial idea submission dialog for a business unit specific portal home page according to the invention.

Figure 26:
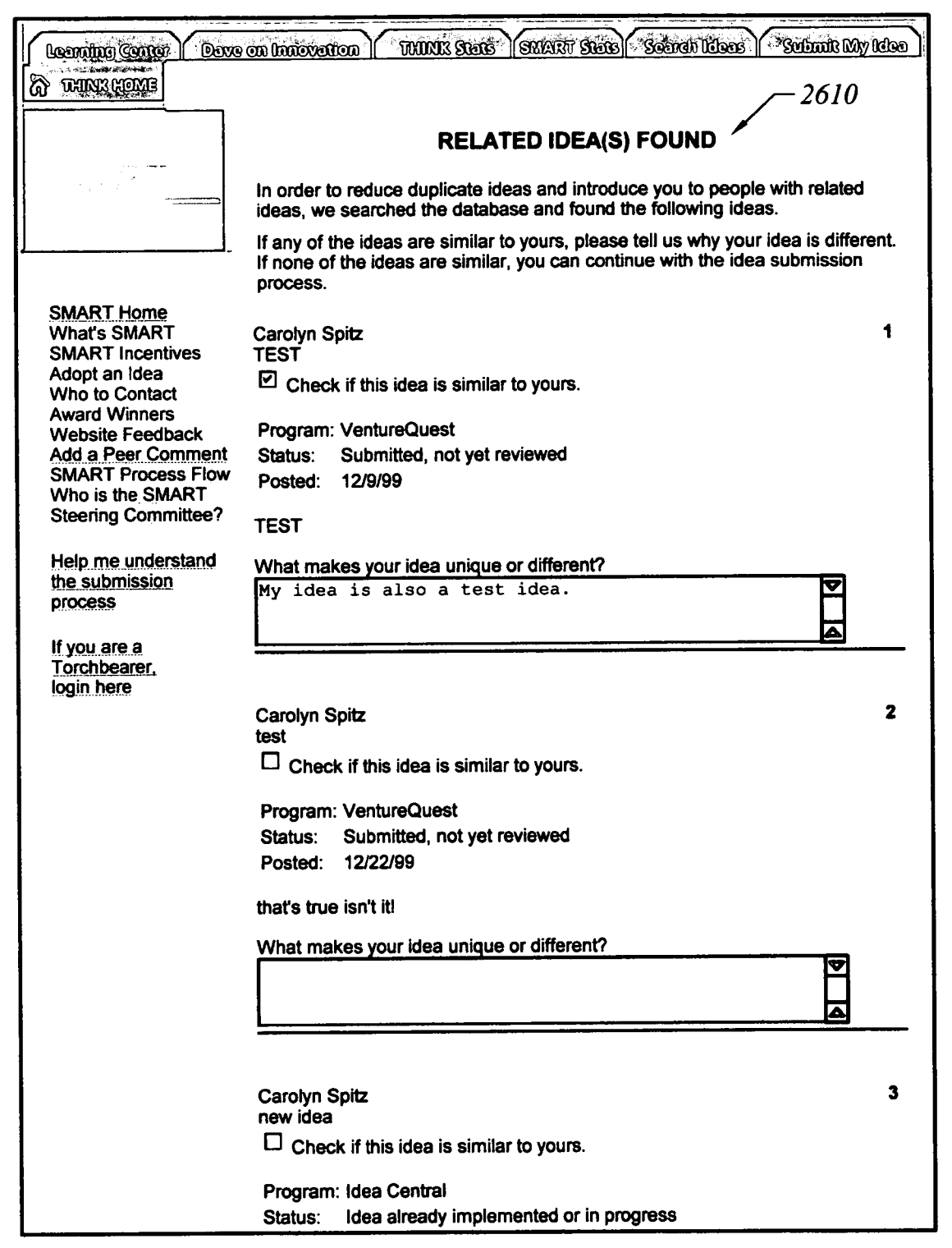

FIG. 26 is a screen display showing a related idea located during an idea submission for a business unit specific portal home page according to the invention. In this example, a related idea is located (2610) and the user is asked to confirm if the idea is similar or not and, if not, to indicate why.

FIG. 27a is a screen display showing a first portion of a further idea submission dialog for a business unit specific portal home page according to the invention. In this example, a dialog is provided to the user by which the user indicates the degree of ownership desired (2710) in bearing the idea forward within the company.

FIG. 27b is a screen display showing a second portion of the further idea submission dialog for a business unit specific portal home page according to the invention.

FIG. 28 is a screen display showing an idea submission review dialog for a business unit specific portal home page according to the invention. In this example, all information relating to the submission is summarized (2810) for the user's review. If the user wants to add or change anything in the submission, he selects the "Make Changes" box (2820). Otherwise, the submission is sent to the innovation network for review (see the discussion of FIG. 7 above).

Figure 29:
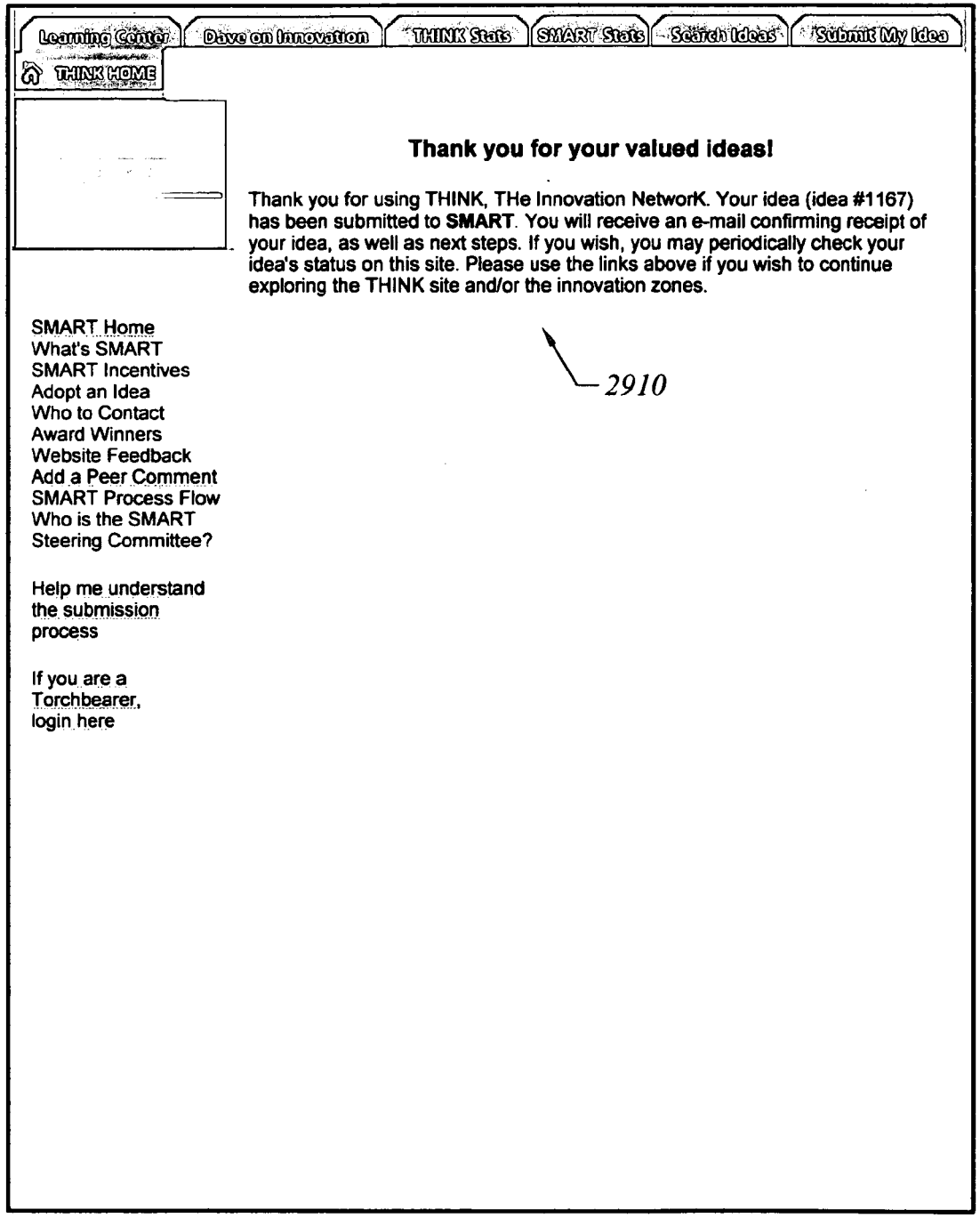
FIG. 29 is a screen display showing an acknowledgement page for an idea submission for a business unit specific portal home page according to the invention.

FIG. 29 is a screen display showing an acknowledgement page for an idea submission for a business unit specific portal home page according to the invention. In this example, the idea number is merged with the acknowledgement (2910). In other embodiments of the invention, different degrees of personalization may be provided, for example using well known text merge functions.

FIG. 30 is a email acknowledgement for an idea submission for a business unit specific portal home page according to the invention. In this example, the idea number is merged with the acknowledgement (3010). In other embodiments of the invention, different degrees of personalization may be provided, for example using well known text merge functions.

FIG. 31 is a screen display showing an idea routing dialog in a multi-portal home page according to the invention. In this example, the user has selected the "My idea improves upon out current business process regardless of what enterprise in impacted" (3110). As a result, the submission is forward to the IdeaCentral portal.

Figure 32:
FIG. 32 is a screen display showing an initial idea submission dialog for a central idea submission portal home page according to the invention.

FIG. 32 is a screen display showing an initial idea submission dialog for a central idea submission portal home page according to the invention.

Figure 33:
FIG. 33 is a screen display showing a related idea located during an idea submission dialog for a central idea submission portal home page according to the invention.

FIG. 33 is a screen display showing a related idea located during an idea submission dialog for a central idea submission portal home page according to the invention. In this example, a related idea is located (3310) and the user is asked to confirm if the idea is similar or not and, if not, to indicate why.

Figure 34:
FIG. 34 is a screen display showing an idea submission dialog for a central idea submission portal home page according to the invention.

FIG. 34 is a screen display showing an idea submission dialog for a central idea submission portal home page according to the invention.

Figure 35:
FIG. 35 is a screen display showing an idea submission review dialog for a central idea submission portal home page according to the invention.

FIG. 35 is a screen display showing an idea submission review dialog for a central idea submission portal home page according to the invention. In this example, all information relating to the submission is summarized (3510) for the user's review. If the user wants to add or change anything in the submission, he selects the "Make Changes" box (3520). Otherwise, the submission is sent to the innovation network for review (3530) (see the discussion of FIG. 7 above).

Figure 36:
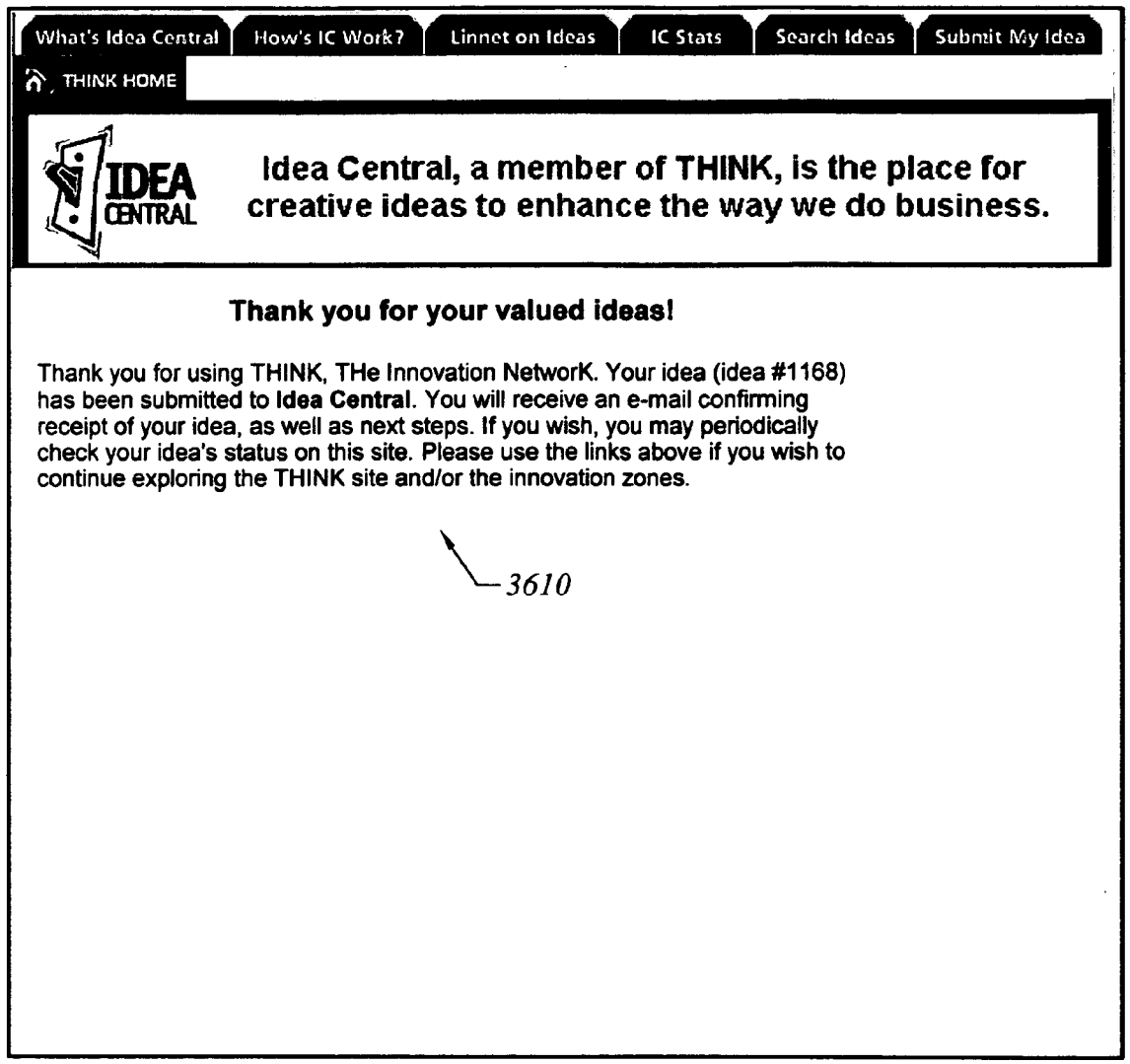
FIG. 36 is a screen display showing an acknowledgement page for an idea submission for a central idea submission portal home page according to the invention.

FIG. 36 is a screen display showing an acknowledgement page for an idea submission for a central idea submission portal home page according to the invention. In this example, the idea number is merged with the acknowledgement (3610). In other embodiments of the invention, different degrees of personalization may be provided, for example using well known text merge functions.

FIG. 37 is an email acknowledgment for an idea submission for a central idea submission portal home page according to the invention. In this example, the idea number is merged with the acknowledgement (3710). In other embodiments of the invention, different degrees of personalization may be provided, for example using well known text merge functions.

FIG. 38 is a screen display showing an idea routing dialog in a multi-portal home page according to the invention. In this example, the user has selected "My idea transforms the way we do business and I am passionate enough about it to take part in the official approval and implementation process. I understand this may require a significant amount of my time" (3810). As a result, the submission is routed to the VentureQuest portal.

FIG. 39 is a screen display showing an initial idea submission dialog for a business improvement idea submission portal home page according to the invention.

Figure 40:
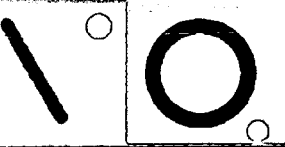
FIG. 40 is a screen display showing a related idea located during an idea submission dialog for a business improvement idea submission portal home page according to the invention.

FIG. 40 is a screen display showing a related idea located during an idea submission dialog for a business improvement idea submission portal home page according to the invention. on dialog for a central idea submission portal home page according to the invention. In this example, a related idea is located (4010) and the user is asked to confirm if the idea is similar or not and, if not, to indicate why.

FIG. 41 is a screen display showing an idea submission dialog for a business improvement idea submission portal home page according to the invention.

FIG. 42 is a screen display showing an idea submission review dialog for a business improvement idea submission portal home page according to the invention. In this example, all information relating to the submission is summarized (4210) for the user's review. If the user wants to add or change anything in the submission, he selects the "Make Changes" box (4220). Otherwise, the submission is sent to the innovation network for review (see the discussion of FIG. 7 above).

Figure 43:
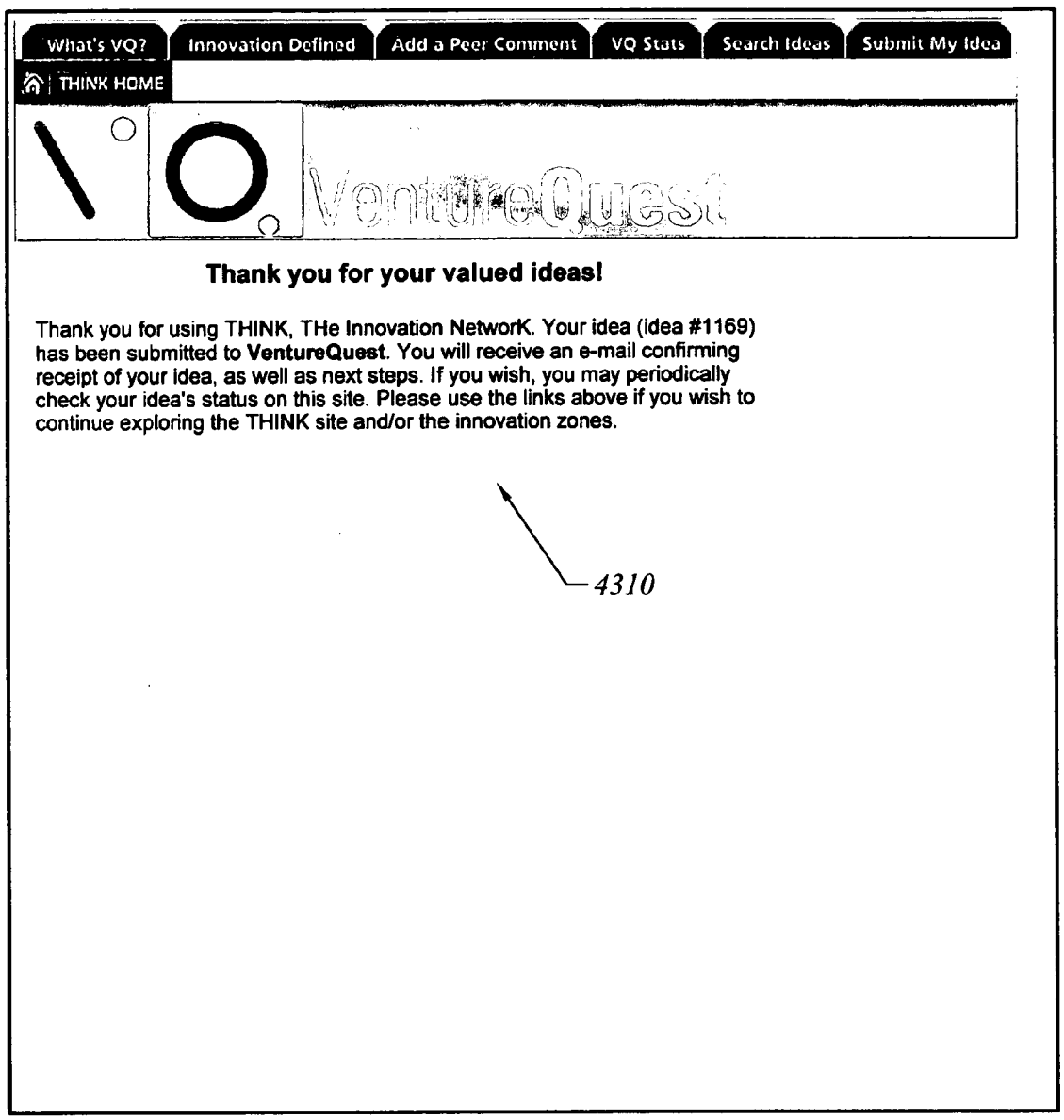
FIG. 43 is a screen display showing an acknowledgement page for an idea submission for a business improvement idea submission portal home page according to the invention.

FIG. 43 is a screen display showing an acknowledgement page for an idea submission for a business improvement idea submission portal home page according to the invention. In this example, the idea number is merged with the acknowledgement (4310). In other embodiments of the invention, different degrees of personalization may be provided, for example using well known text merge functions.

FIG. 44 is an email acknowledgment for an idea submission for a business improvement idea submission portal home page according to the invention. In this example, the idea number is merged with the acknowledgement (4410). In other embodiments of the invention, different degrees of personalization may be provided, for example using well known text merge functions.

Figure 45:
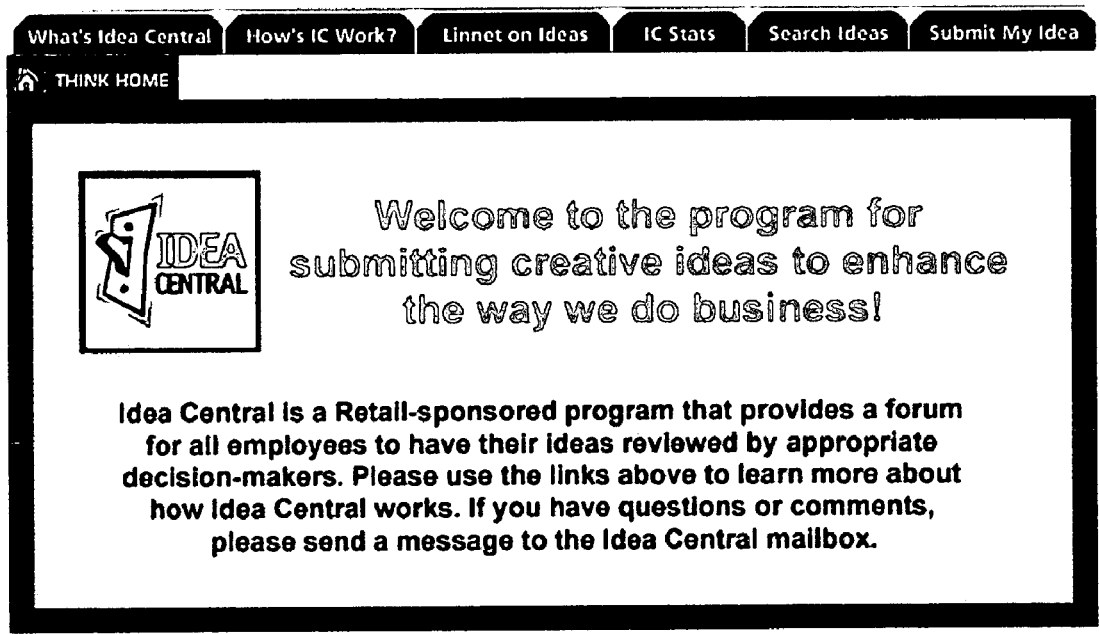
FIG. 45 is a screen display showing a home page for the IdeaCentral portal according to the invention.

FIG. 45 is a screen display showing a home page for the IdeaCentral portal according to the invention.

Figure 46:
FIG. 46 is a screen display showing an introduction and frequently asked questions for the IdeaCentral portal according to the invention.

FIG. 46 is a screen display showing an introduction and frequently asked questions for the IdeaCentral portal according to the invention.

Figure 47:
FIG. 47 is a screen display showing a process description page for the IdeaCentral portal according to the invention.

FIG. 47 is a screen display showing a process description page for the IdeaCentral portal according to the invention. In this example, the user is provided with instruction on the use of this portal and an explanation of the process (4710).

FIG. 48 is a screen display showing an introductory message page for the IdeaCentral portal according to the invention. In this example, a member of the executive staff has authored an explanation of the significance of innovation to the company (4810) which is available to employees who may want to submit an idea for consideration.

Figure 49:
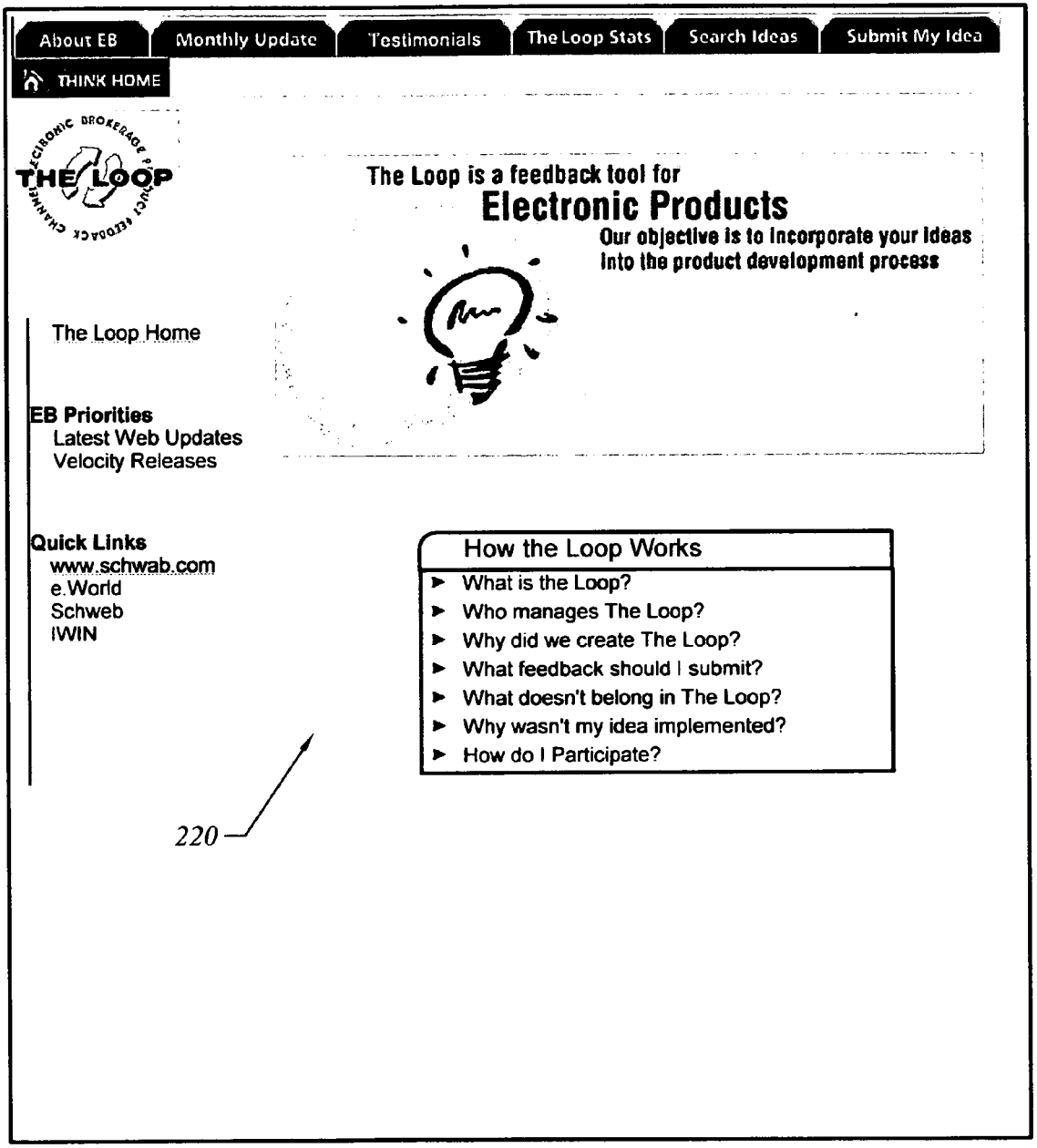
FIG. 49 is a screen display showing a home page for the LOOP portal according to the invention.

FIG. 49 is a screen display showing a home page for the LOOP portal according to the invention.

FIG. 50 is a screen display showing an introductory page for the LOOP portal according to the invention.

FIG. 51 is a screen display showing a monthly update page for the LOOP portal according to the invention. In this example, there is a monthly update regarding product development, especially in regard to employee ideas (5110).

FIG. 52 is a screen display showing a list of past newsletters for the LOOP portal according to the invention. In this example, there is a list of previous editions of the monthly newsletter, along with links directly to the newsletters (5210).

Figure 53:
FIG. 53 is a screen display showing a testimonial entry dialog for the LOOP portal according to the invention.

FIG. 53 is a screen display showing a testimonial entry dialog for the LOOP portal according to the invention. In this example, a dialog is provided by which customer testimonials may be captured with regard to various products (5310). This mechanism allows the introduction and evaluation of third party ideas.

Figure 54:
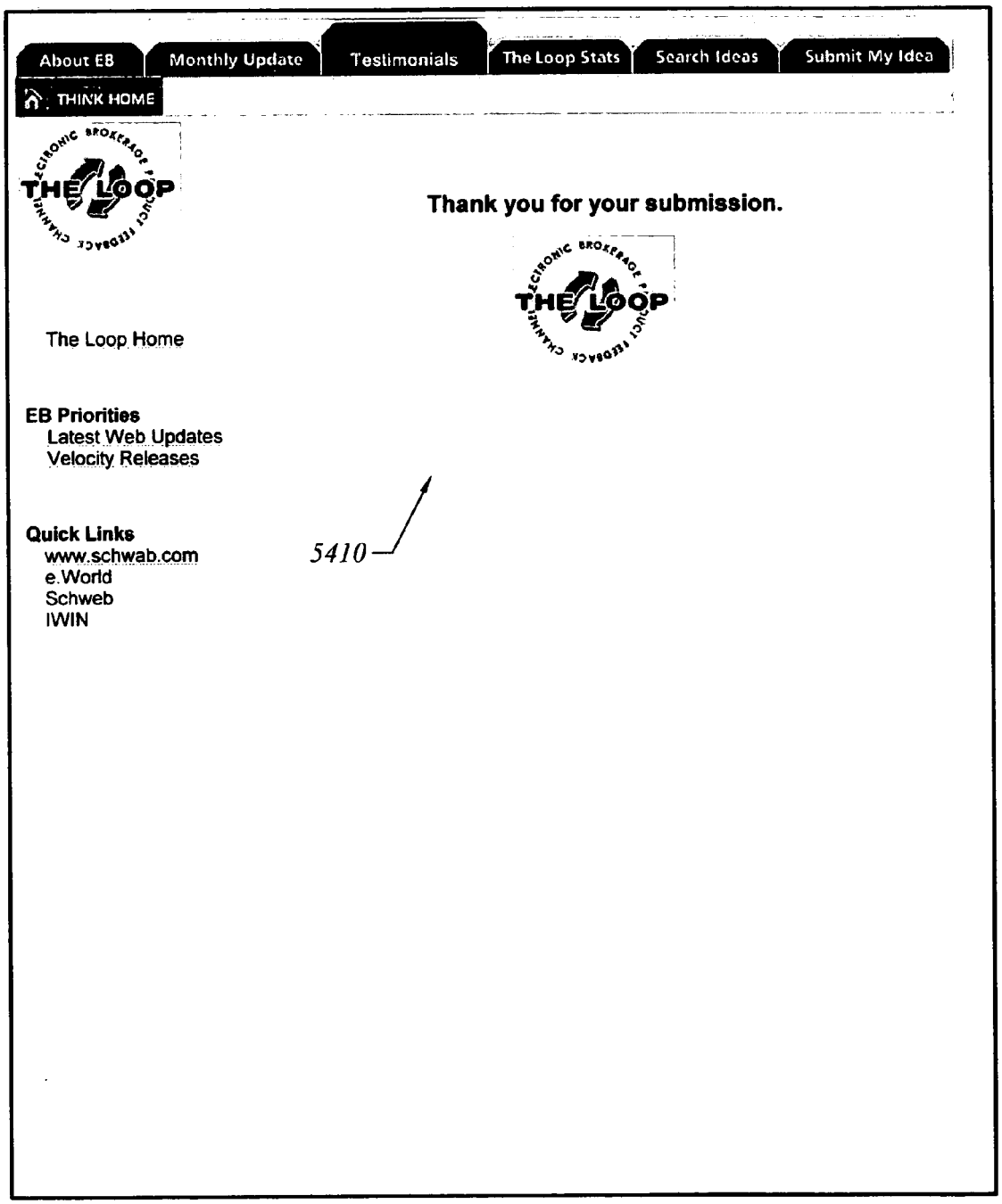
FIG. 54 is a screen display showing a testimonial entry acknowledgement for the LOOP portal according to the invention.

FIG. 54 is a screen display showing a testimonial entry acknowledgement for the LOOP portal according to the invention. In this example, the idea number is merged with the acknowledgement (5410). In other embodiments of the invention, different degrees of personalization may be provided, for example using well known text merge functions.

FIG. 55 is a screen display showing Web updates for the LOOP portal according to the invention. In this example, a list of company updates is provided in a left hand side of a display area (5510), while the contents of the updates are listed on the right hand side of the display area.

Figure 56:
FIG. 56 is a screen display showing a specific Web update for the LOOP portal according to the invention.

FIG. 56 is a screen display showing a specific Web update for the LOOP portal according to the invention. In this example, a detailed product report is shown (5610). In the product information, ideas are solicited (5620). Selecting this link "Submit Suggestions for changes" takes the user directly to the innovation network idea submission dialog (see FIGS. 57 and 58).

FIG. 57 is a screen display showing a home page for the SMART portal according to the invention.

FIG. 58 is a screen display showing an introductory page for the SMART portal according to the invention.

Figure 59:
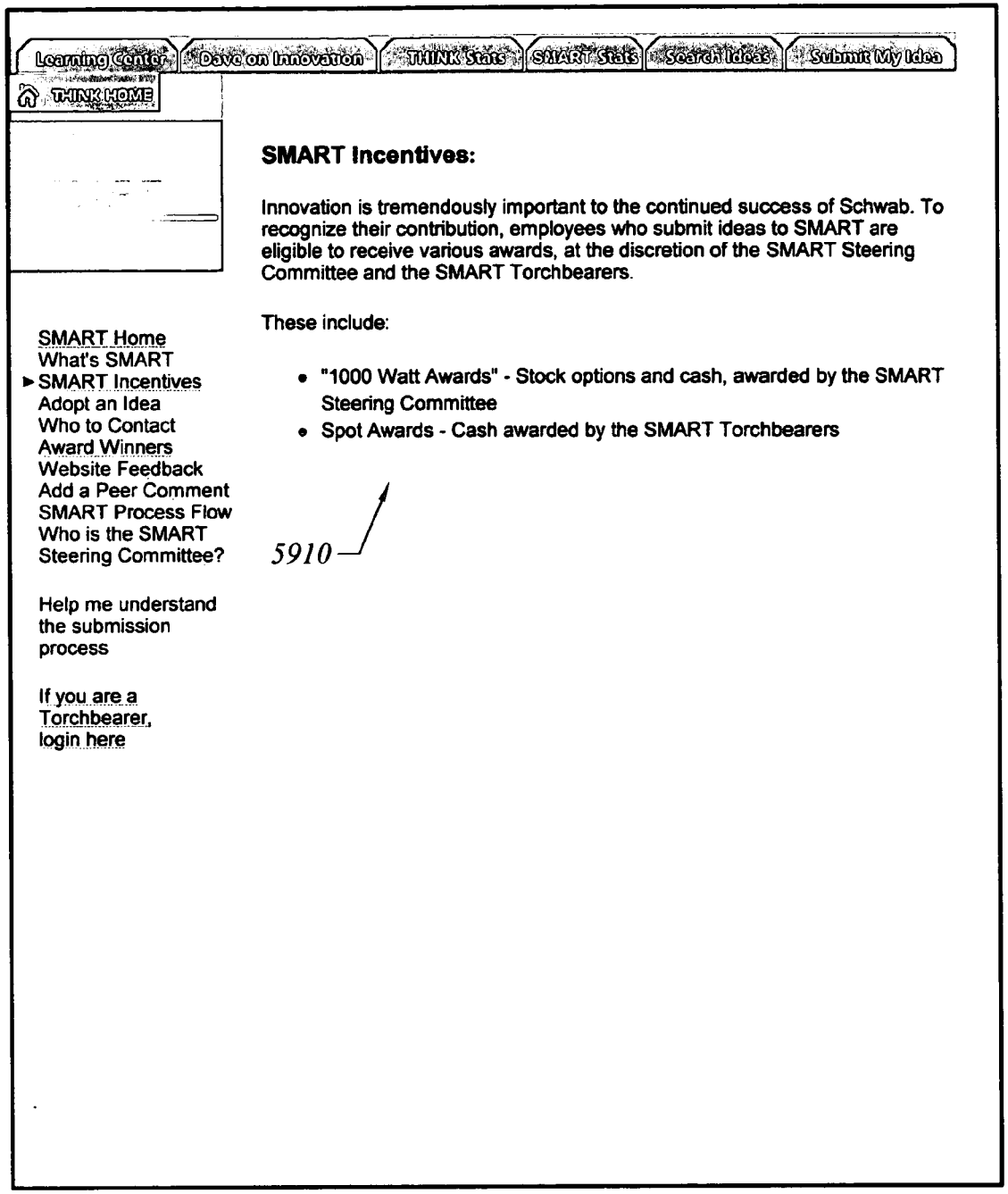
FIG. 59 is a screen display showing an incentive page for the SMART portal according to the invention.

FIG. 59 is a screen display showing an incentive page for the SMART portal according to the invention. In this example, the incentive program is described (5910).

FIG. 60 is a screen display showing an idea adoption page for the SMART portal according to the invention. In this example, ideas in need of adoption are listed (6010).

Figure 61:
FIG. 61 is a screen display showing sources of assistance for the SMART portal according to the invention.

FIG. 61 is a screen display showing sources of assistance for the SMART portal according to the invention. In this example, contact information is provided for help in locating a local torchbearer and getting an idea submitted (6110).

FIG. 62 is a screen display showing employee awards for the SMART portal according to the invention. In this example, award winners are listed (6210).

Figure 63:
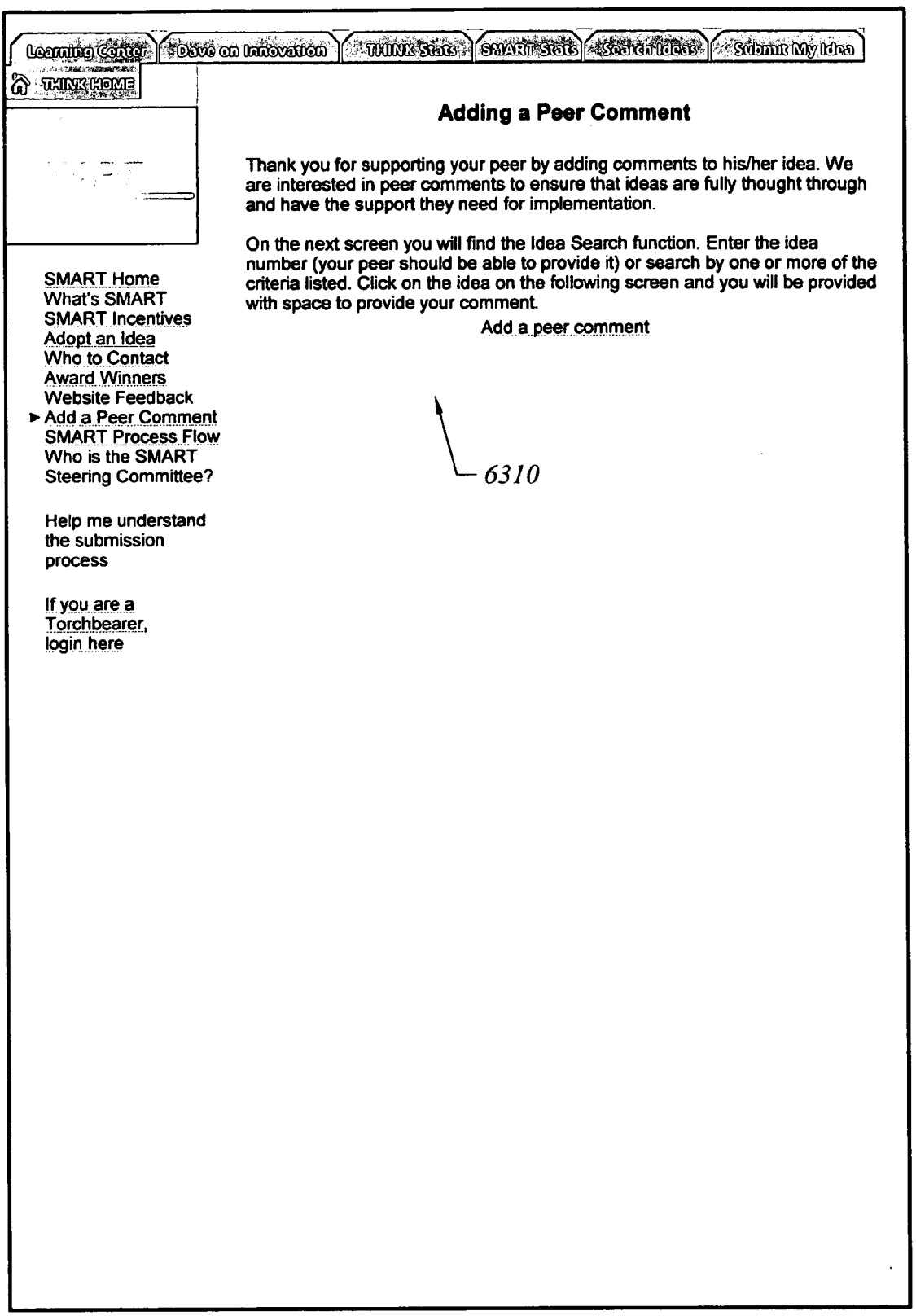
FIG. 63 is a screen display showing a peer comment description for the SMART portal according to the invention.

FIG. 63 is a screen display showing a peer comment description for the SMART portal according to the invention. In this example, a description of the peer comment feature is provided, as well as a link to allow a user to enter a peer comment (6310).

FIG. 64 is a screen display showing an idea search for the SMART portal according to the invention.

FIG. 65 is a screen display showing idea search results for the SMART portal according to the invention. In this example, a list of ideas located during a search is provided (6510).

FIG. 66 is a screen display showing a peer comment dialog for the SMART portal according to the invention.

Figure 67:
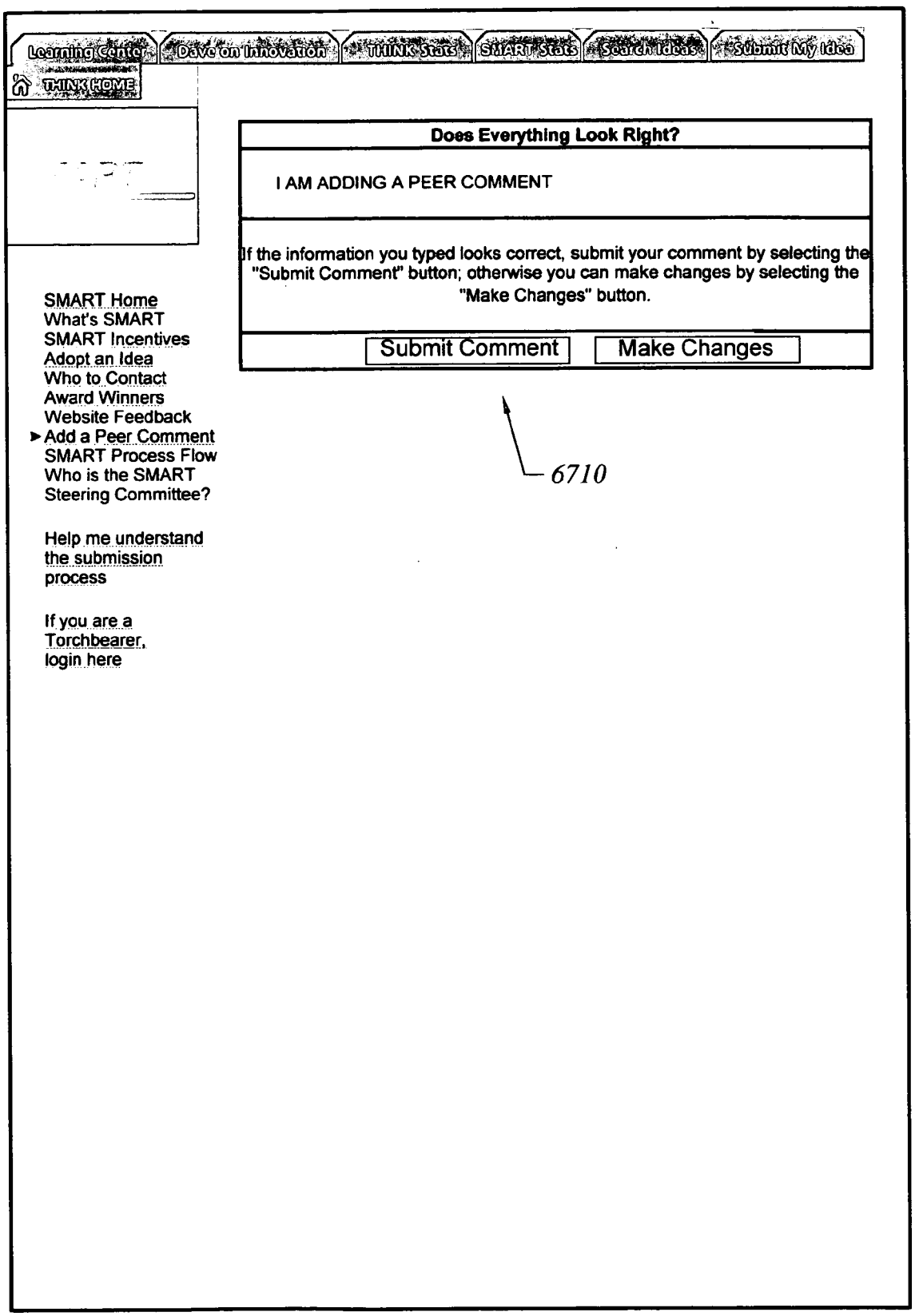
FIG. 67 is a screen display showing a peer comment review dialog for the SMART portal according to the invention.

FIG. 67 is a screen display showing a peer comment review dialog for the SMART portal according to the invention. In this example, a dialog is provided for adding a peer comment (6710).

Figure 68:
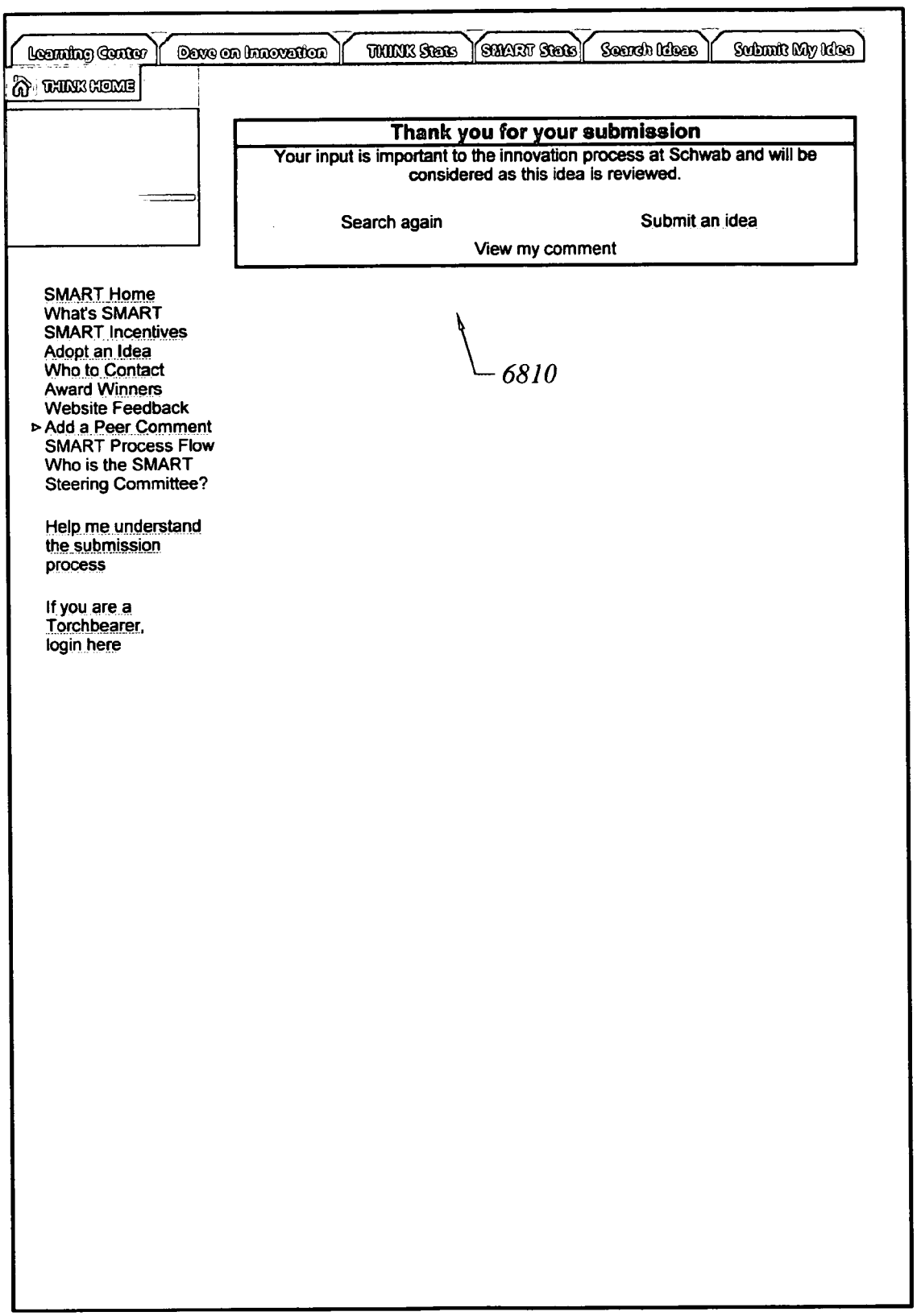
FIG. 68 is a screen display showing a peer comment submission acknowledgement for the SMART portal according to the invention.

FIG. 68 is a screen display showing a peer comment submission acknowledgement for the SMART portal according to the invention. In this example, a message is sent to the submitter (6810) thanking them for their comment. The message provides links that allow the user to search again, submit an idea or their own, or review their comments.

FIG. 69 is a screen display showing a home page for the VentureQuest portal according to the invention.

Figure 70:
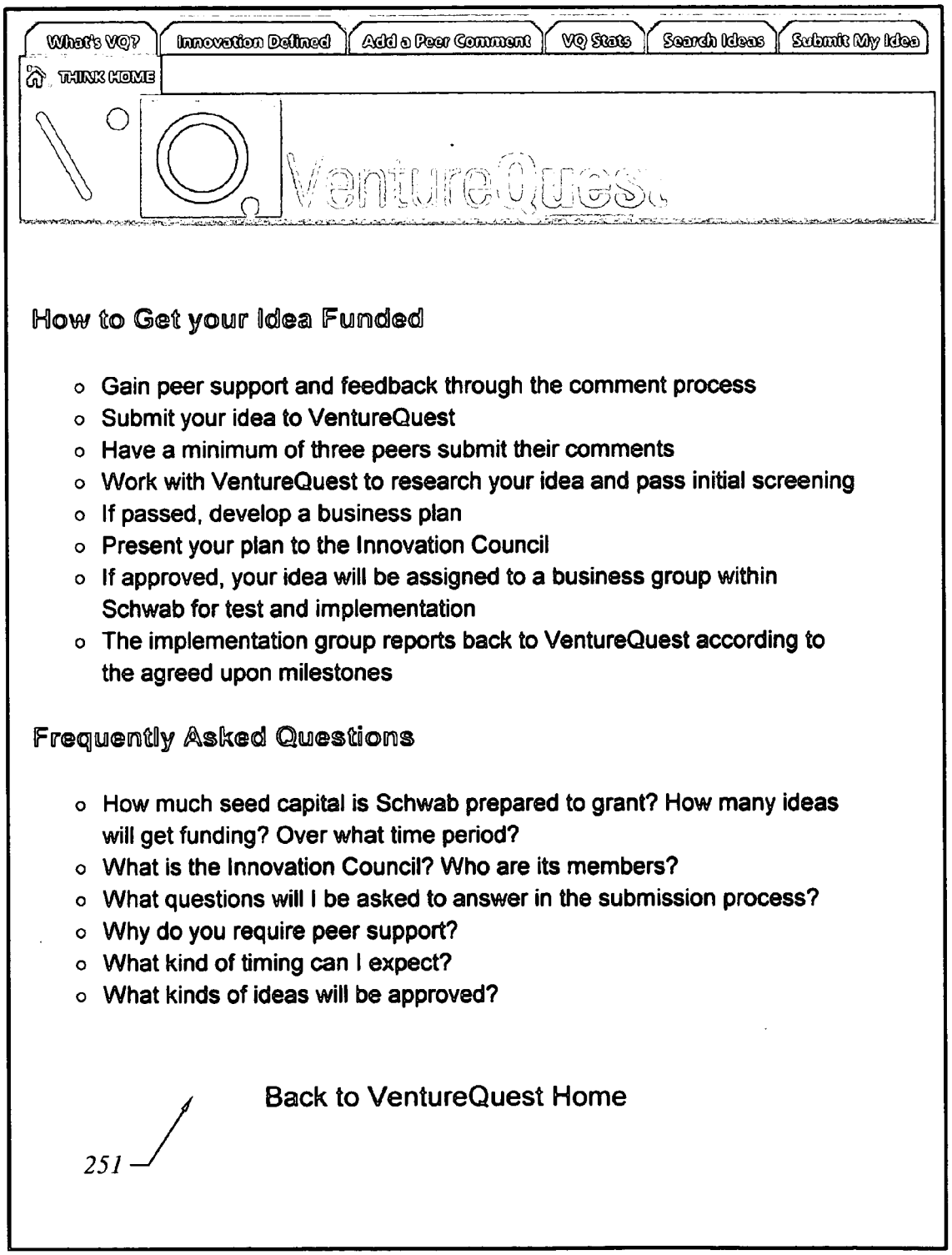
FIG. 70 is a screen display showing an introductory page for the VentureQuest portal according to the invention.

FIG. 70 is a screen display showing an introductory page for the VentureQuest portal according to the invention.

Figure 71:
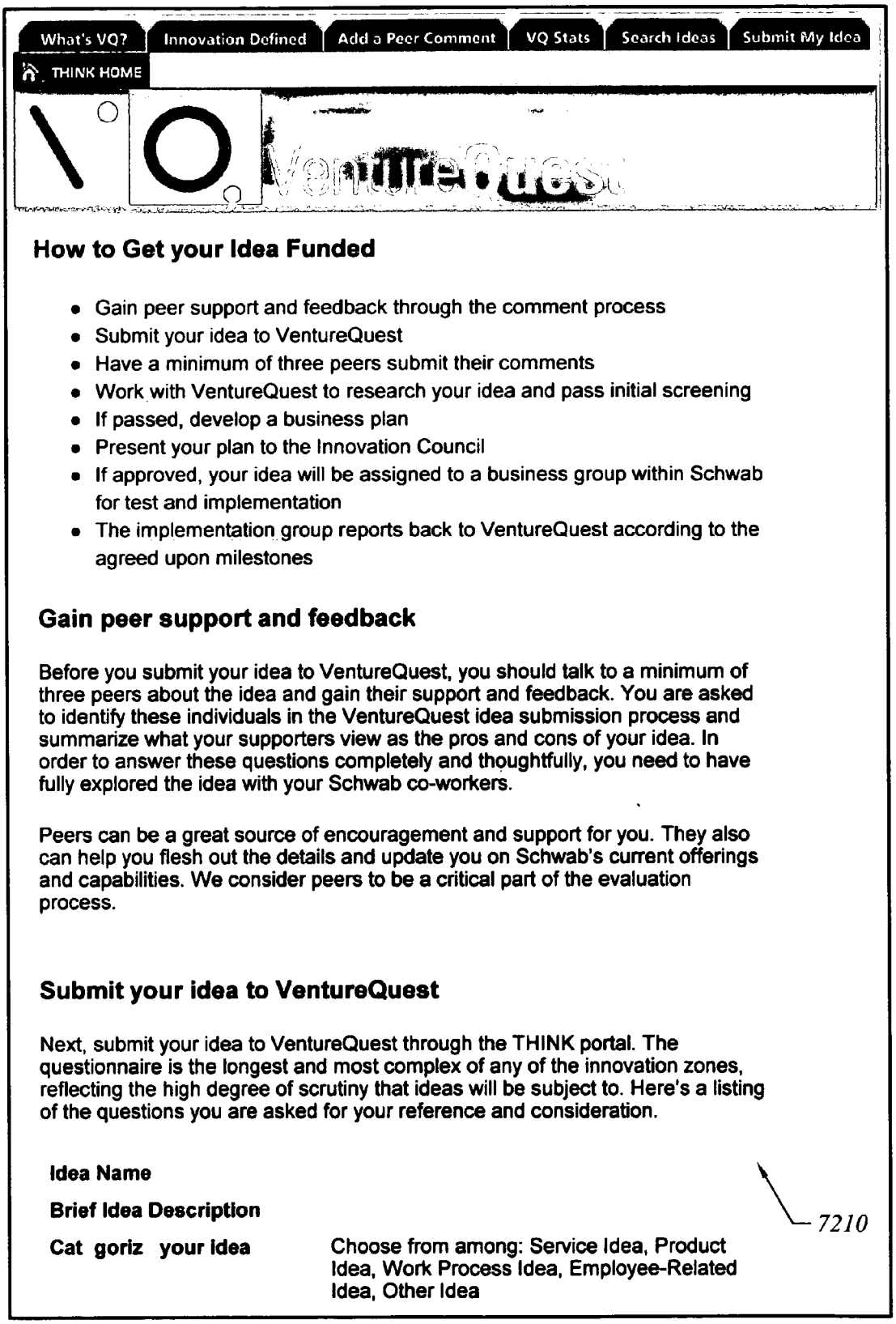
FIG. 71 is a screen display showing details for information identified by links on the introductory page for the VentureQuest portal according to the invention.

FIG. 71 is a screen display showing details for information identified by links on the introductory page for the VentureQuest portal according to the invention. In this example, a description is provided for the VentureQuest portal (7210).

Figure 72:
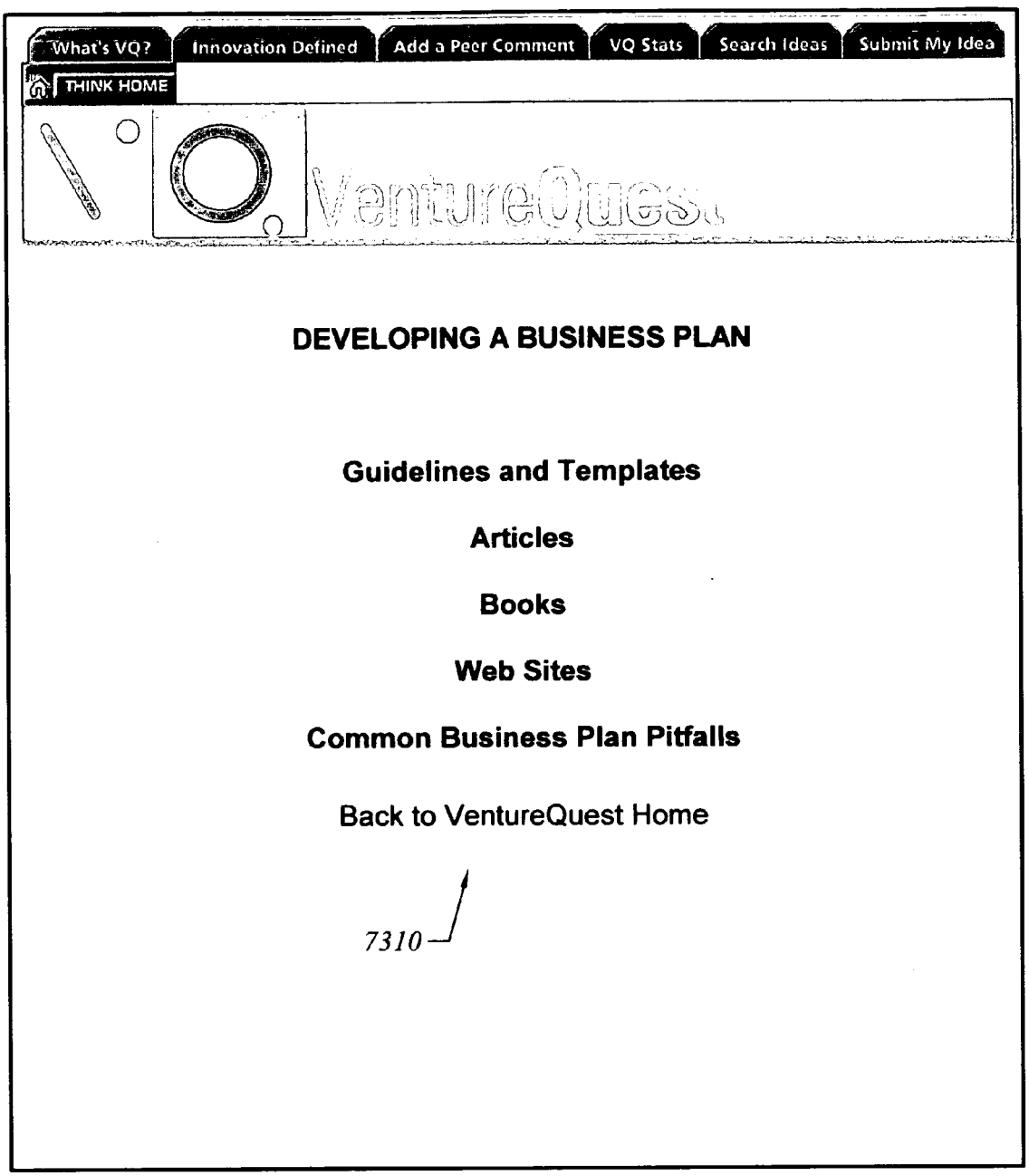
FIG. 72 is a screen display showing a business plan development module for the VentureQuest portal according to the invention.

FIG. 72 is a screen display showing a business plan development module for the VentureQuest portal according to the invention. In this example, the innovation network is used to link an employee to additional company information that is related to the innovation process within the company. Here, a company module for developing a business plan is provided (7310). Unique to the invention is the association of all aspects of innovation with the innovation network. Thus, the innovation network functions more broadly than a repository for suggestions and ideas, but also as a clearing house for both innovations and important information relating to innovation.

Figure 73:
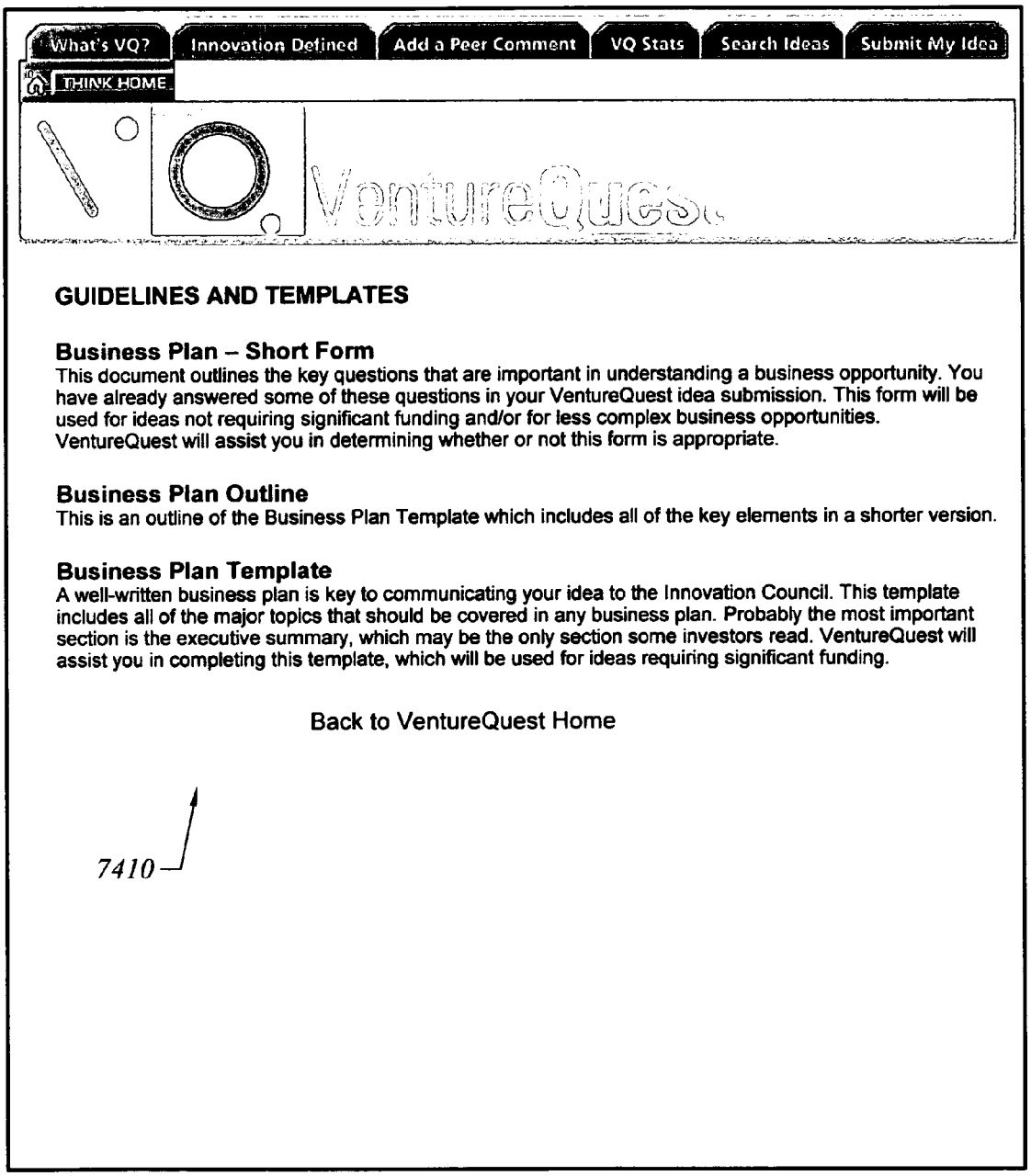
FIG. 73 is a screen display showing details of the business plan development module for the VentureQuest portal according to the invention.

FIG. 73 is a screen display showing details of the business plan development module for the VentureQuest portal according to the invention. In this example, business plan templates (7410) are provided for the business plan module of FIG. 72.

Figure 74:
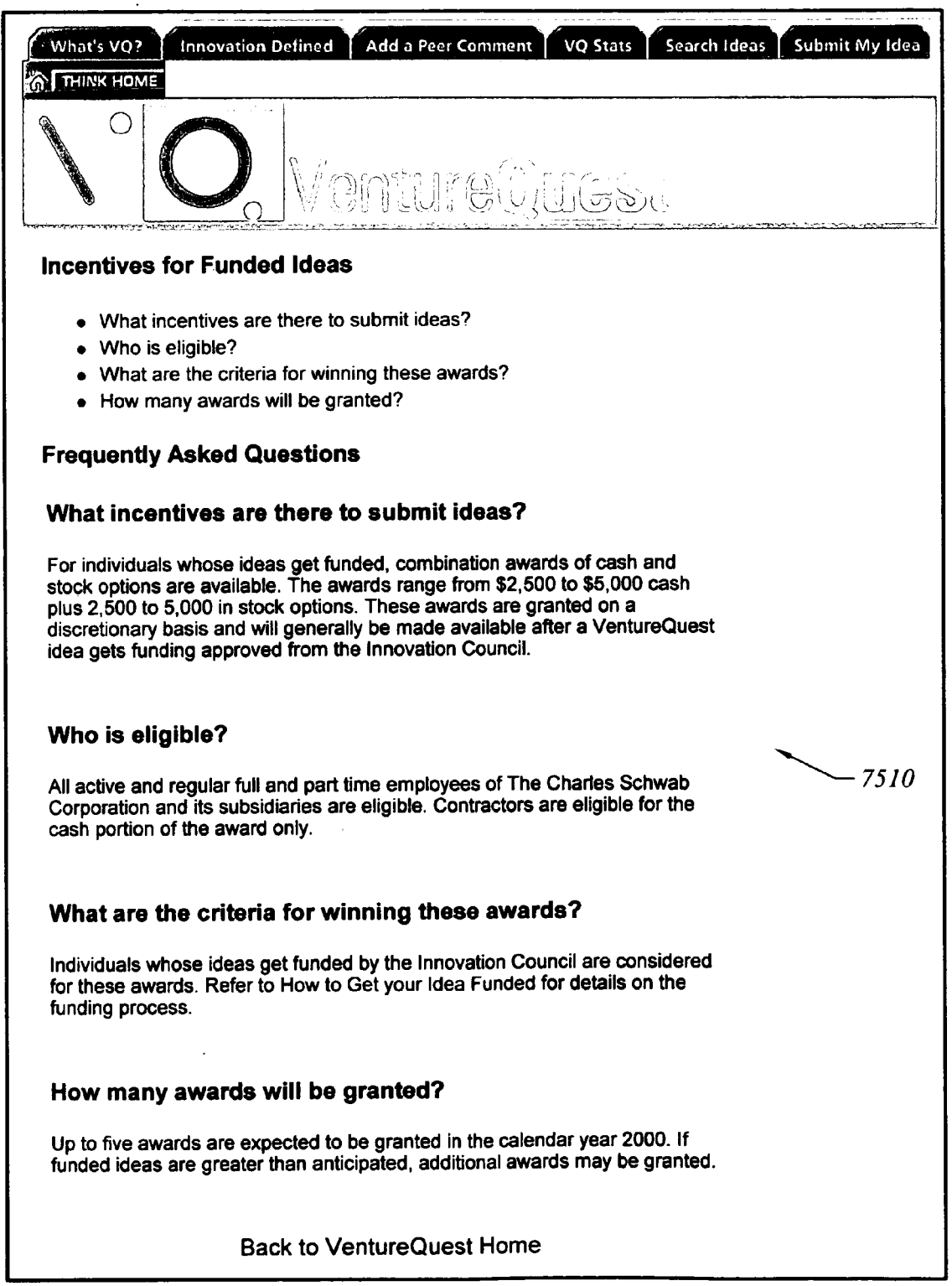
FIG. 74 is a screen display showing an incentive page for the VentureQuest portal according to the invention.

FIG. 74 is a screen display showing an incentive page for the VentureQuest portal according to the invention. In this example, a company incentive plan (7510) is explained.

Although the invention is described herein with reference to the preferred embodiment, one skilled in the art will readily appreciate that other applications may be substituted for those set forth herein without departing from the spirit and scope of the present invention.

For example, a submission may be attached from an outside source to the innovation network, such that a person not having access to the innovation network may nonetheless submit an idea. Thus, an idea may be emailed to an employee and the email message may be attached to, or merged in, the idea submission dialog.

The statistics feature may be implemented to provide data in any desired format. For example, the data from all innovation zones may be aggregated. Also, ideas may be summarized by category. Reports may be automatically generated and circulated to appropriate persons, e.g. torchbearers, including such information as number of visits to a particular innovation zone by employees and the number of submission sessions. Further, statistics may be kept tracking the impact of a particular idea on the company, e.g. costs savings or increase in revenue attributable to the idea.

A tickler system may be implemented, where a message is automatically sent to all "no go" submitters after a predetermined interval, e.g. three months, encouraging additional submissions; or automatic reminders may be sent for each stage of the idea submission process to maintain employee involvement.

The status of a submission may be variously reported. For example, one status option may include an "awaiting enterprise response" field. Further, a notation may be included at each step of the review process, automatically indicating who has reviewed the submission, e.g. it has been reviewed by the local torchbearer.

The user interface may also be enhanced, for example mandatory questions within a dialog may be highlighted, e.g. in red and/or with an exclamation mark and/or by advising a submitter that certain identified questions must be answered before the idea may be submitted. Further, a mechanism may be provided for checking that mandatory information is provided, and for advising a submitter if certain required fields are not completed.

The user interface may also include a "do not submit" and/or "save" button for employees who do not want to submit an idea, or who want to review and/or edit the idea offline for later submission. A help dialog may also be included, where a submitter is actively guided through the idea submission process in a manner similar to that of the MacOS Guide. The submitter may also be linked to example ideas for the particular innovation zone that the submitter is visiting to help the submitter determine if they are at the correct innovation zone.

The search function may include a global search function that searches across all innovation zones and that optionally identifies the zones in which each located submission resides; or the search function may be limited to a specific innovation zone or zones, e.g. by use of a dialog that includes a check box for each zone, where the submitter checks the zones in which the search is to be conducted. The search results may also include a brief summary of the status of the located submissions; and a "search again" feature may be included with the search results to expedite additional searching.

Another aspect of the invention allows a torchbearer or other individual to asign submissions to others, such as other torchbearers.

Another embodiment of the invention provides a means to manage communication/email around an idea. For example, email could be managed from within the edit an idea screen. A user clicks on a button "send response to user" and the system starts an e-mail screen, including generic response text that is customized. Another button, "forward this idea," populates an e-mail window with the idea detail. This enhances knowledge management around ideas, as well as adding to productivity and efficiency of program administrators.

One aspect of this feature gives an administrator the option to send an e-mail to the submitter, notifying them that a change/update has been made to their idea.

Another aspect of this feature create functionality for the administrator to send an email, including the text of an idea to enterprise reviewed; allows the administrator to customize the introduction to the email; allows the idea to be sent to multiple parties; and/or creates a record of date sent and to whom Yet another aspect of this feature creates an automated email to the submitter when the administrator changes the zone.

Another aspect of the invention provides Integration to email in the form of a template that populates an email screen with an idea, where the idea is forwarded to the idea submitter's managers for recognition.

Accordingly, the invention should only be limited by the claims included below.

What is claimed is:

1. An apparatus for receiving and processing suggestions for a company, comprising:
 a central portal for receiving a new suggestion from a submitting party on behalf of a receiving party;
 a plurality of innovation zones within said receiving party to which said new suggestion can be routed, wherein said innovation zones comprise any of:
  a point of entry for employees within a specific business unit in a larger entity for submission of suggestions related to said business unit;
  a point of entry for motivated submitters with an idea about how to change a business practice of said company;
  a central point of entry for ideas and suggestions;
  a point of entry for ideas on improving a specific aspect of said company; and
  a point of entry for third party submissions;
 a routing mechanism for routing said new suggestion to one or more of said innovation zones in response to an interaction with said submitting party;
 at least one central database into which said new suggestion is categorized based upon key words;
 a viewing mechanism allowing for peer viewing and comment before a final decision is made regarding the new suggestion;
 a response module that automatically sends an acknowledgement to said submitting party when the new suggestion is submitted by said submitting party, wherein said acknowledgement comprises any of a Web based response and an email message;
 a search mechanism that automatically searches for previously-submitted suggestions that are potentially related to the new suggestion and displays the results of the search to the submitting party;
 a selection mechanism allowing the submitting party to select any of the displayed previously-submitted suggestions that the submitting party determines to be similar to the new suggestion;
 a linking module that links said new suggestion to any of the displayed previously-submitted suggestions that are selected by the submitting party, whereby the selected previously-submitted suggestions will be cross-referenced with the new suggestion;
 an acknowledgement module for automatic emailing of specific types of suggestions to specific areas of responsibility within said company;
 a status module that tracks progression of a suggestion through a review, comment, and approval process; and
 a statistics module that reports cumulative submissions in a predetermined format;
 wherein said routing mechanism comprises a page based dialog; and
 wherein said central portal comprises a Web page.

2. An apparatus for receiving and processing suggestions, comprising:
 a central portal for receiving a new suggestion from a submitting party;
 a plurality of innovation zones to which said new suggestion can be routed;
 a routing mechanism that routes said new suggestion to one or more of said innovation zones in response to an interaction with said submitting party;
 a search mechanism that automatically searches for previously-submitted suggestions that are potentially related to the new suggestion and displays the results of the search to the submitting party; and a selection mechanism allowing the submitting party to comment on any of the displayed previously-submitted suggestions, and allowing the submitting party to select any of the displayed previously-submitted suggestions that the submitting party determines to be similar to the new suggestion whereby the new suggestion is linked to any previously-submitted suggestions that are selected by the submitting party, such that the selected previously-submitted suggestions will be cross-referenced with the new suggestion.

3. The apparatus of claim 2, further comprising:
at least one central database into which said suggestions are categorized based upon key words.

4. The apparatus of claim 2, wherein said routing mechanism comprises a page based dialog.

5. The apparatus of claim 2, wherein said central portal comprises a Web page.

6. The apparatus of claim 2, further comprising:
a response module that automatically sends an acknowledgement to said submitting party when a suggestion is submitted by said submitting party.

7. The apparatus of claim 6, wherein said acknowledgement comprises any of a Web based response and an email message.

8. The apparatus of claim 2, wherein said innovation zones comprise any of:
a point of entry for employees within a specific business unit in a larger entity for submission of suggestions related to said business unit;
a point of entry for motivated submitters with an idea about how to change a business practice;
a central point of entry for ideas and suggestions;
a point of entry for ideas on improving a specific aspect; and
a point of entry for third party submissions.

9. The apparatus of claim 2, further comprising:
an acknowledgement module for automatic emailing of specific types of suggestions to specific areas of responsibility within a company.

10. The apparatus of claim 2, further comprising:
a status module that tracks progression of a suggestion through a review, comment, and approval process.

11. The apparatus of claim 2, further comprising:
a statistics module that reports cumulative submissions in a predetermined format.

12. A network-based application embedded in a computer readable medium that allows employees to submit suggestions and ideas for improving how a company does business, comprising:
a central portal for receiving new suggestion from a submitting party on behalf of a receiving party;
multiple points of entry comprising innovation groups within said receiving party to which said new suggestion can be routed from said central portal and which can also receive said suggestions directly; and
a routing mechanism that routes said new suggestion to a most appropriate one or more of said multiple points of entry in response to an interaction with said submitting party;
a search mechanism that automatically searches for previously-submitted suggestions that are potentially related to the new suggestion and displays the results of the search to the submitting party;
a selection mechanism allowing the submitting party to select and comment on any of the displayed previously-submitted suggestions that the submitting party determines to be similar to the new suggestion, whereby the new suggestion is linked to any previously-submitted suggestions that are selected by the submitting party, such that the selected previously-submitted suggestions will be cross-referenced with the new suggestion.

13. The application of claim 12, wherein, for each suggestion any of the following types of information to be attached to said suggestion:
a review comment;
a peer review comment;
a link to a document or presentation; and
a related idea.

14. The application of claim 12, further comprising:
a torchbearer function performed by an executive participant and advocate in said application.

15. The application of claim 12, further comprising:
a view module that allows viewing of a list of latest submissions.

16. The application of claim 12, further comprising:
a view module that, for said central portal, returns a list of submissions to all points of entry; and that, for said points of entry, returns a list of submissions to an appropriate innovation group.

17. The application of claim 12, further comprising:
a search module that allows entry of search criteria to return a list of matching submissions.

18. The application of claim 17, said search module comprising any of:
a search for submissions a user has submitted;
a search for submissions said user has saved but not submitted; and
a search of an implementation zone for ideas that have been approved, but for which there are no current resources to implement.

19. The application of claim 12, further comprising:
a submission dialog comprising one or more qualification questions.

20. The application of claim 19, wherein said one or more qualification questions determine a submitting party's desired degree of ownership of an implementation process for said submitting party's suggestion.

21. The application of claim 12, further comprising:
an adoption module for soliciting sponsorship of an unowned suggestion.

22. The application of claim 12, further comprising:
a steering committee that receives, reviews, and disposes of suggestions.

23. The application of claim 12, further comprising:
a peer rating module that allows individuals to rate suggestions.

24. The application of claim 12, further comprising:
a statistics module by which statistics are provided based upon suggestions submitted over various time intervals and by point of entry.

25. The application of claim 12, further comprising:
a status table for displaying actions taken or to be taken, based upon any of point of entry and category.

26. The application of claim 12, further comprising:
a related suggestion link wherein a related suggestion is located and a user is asked to confirm if said suggestion is similar to a suggestion submitted or to be submitted by said user or not and, if not, optionally to indicate why.

27. The application of claim 12, further comprising:
a dialog by which customer testimonials are captured.

28. The application of claim 12, further comprising:
a link within a network page that takes a user directly to a suggestion submission dialog.

29. The application of claim 12, further comprising:
an incentive module that implements an incentive program.

30. The application of claim 12, further comprising:
a page that provides contact information.

31. The application of claim 12, further comprising:
an award module with which award winners are listed.

32. A storage medium comprising a computer implemented process stored therein, said process comprising a network-based application that allows employees to submit suggestions and ideas for improving how a company does business, said process comprising:
providing a portal through which a submitting party can submit an new suggestion;
directing the new suggestion to an innovation zone, such that the new suggestion is considered by most appropriate persons;
searching for previously-submitted suggestions that are potentially related to the new suggestion;
displaying any potentially-related previously-submitted suggestions to the submitting party;
allowing the submitting party to comment on the displayed previously submitted suggestions;
allowing the submitting party to select any of the displayed previously-submitted suggestions that are deemed by the submitting party to be similar to the new suggestion; and
linking said new suggestion to the selected previously-submitted suggestions whereby said selected previously-submitted suggestions will be cross-referenced with the new suggestion.

33. An apparatus for receiving and processing suggestions, comprising;
central portal means for receiving a new suggestion from a submitting party on behalf of a receiving party;
a plurality of innovation zone means within said receiving party to which said new suggestion can be routed; and
means for routing said new suggestion to one or more of said innovation zones in response to an interaction with said submitting party;
means for automatically displaying previously-submitted suggestions to the submitting party that are potentially related to the new suggestion;
means for allowing the submitting party to comment on the displayed previously-submitted suggestions; and
means for allowing the submitting party to select any of the displayed previously-submitted suggestions that are deemed by the submitting party to be similar to the new suggestion, whereby the new suggestion is linked to the selected previously-submitted suggestions, such that the selected previously-submitted suggestions are cross-referenced with the new suggestion.

34. A network-based process that allows employees to submit suggestions and ideas for improving how a company does business, comprising:
providing a central portal for receiving a new suggestion from an employee;
providing multiple points of entry comprising innovation groups to which said suggestions can be routed from said central portal and which can also receive said suggestions directly;
routing said new suggestion to a most appropriate one or more of said multiple points of entry in response to an interaction with said employee;
searching for previously-submitted suggestions that are potentially related to the new suggestion and displaying the results to the employee;
allowing the employee to select and comment on any of the displayed previously-submitted suggestions that the employee believes to be related to the new suggestion; and
linking the new suggestion to any of the displayed previously-submitted suggestions that are selected by the employee, such that a subsequent viewer of the new suggestion will also see the selected previously-submitted suggestions.

35. The process of claim 34, wherein for each suggestion any of the following types of information to be attached to said suggestion:
a review comment;
a peer review comment;
a link to a document or presentation; and a related idea.

36. The process of claim 34, further comprising:
providing a torchbearer function performed by an executive participant and advocate in said application.

37. The process of claim 34, further comprising:
providing a view module that allows viewing of a list of latest submissions.

38. The process of claim 34, further comprising:
providing a view module that, for said central portal, returns a list of submissions to all points of entry; and that, for said points of entry, returns a list of submissions to an appropriate innovation group.

39. The process of claim 34, further comprising:
providing a search module that allows entry of search criteria to return a list of matching submissions.

40. The process of claim 39, said search module comprising any of:
searching for submissions a user has submitted;
searching for submissions said user has saved but not submitted; and
searching an implementation zone for ideas that have been approved, but for which there are no current resources to implement.

41. The process of claim 34, further comprising:
providing a submission dialog comprising one or more qualification questions.

42. The process of claim 41, wherein said one or more qualification questions determine a submitting party's desired degree of ownership of an implementation process for said submitting party's suggestion.

43. The process of claim 34, further comprising:
providing an adoption module for soliciting sponsorship of an unowned suggestion.

44. The process of claim 34, further comprising:
providing a steering committee that receives, reviews, and disposes of suggestions.

45. The process of claim 34, further comprising:
providing a peer rating module that allows individuals to rate suggestions.

46. The process of claim 34, further comprising:
a statistics module by which statistics are provided based upon suggestions submitted over various time intervals and by point of entry.

47. The process of claim 34, further comprising:
providing a status table for displaying actions taken or to be taken, based upon any of point of entry and category.

48. The process of claim 34, further comprising:
providing a related suggestion link wherein a related suggestion is located and a user is asked to confirm if said suggestion is similar to a suggestion submitted or to be submitted by said user or not and, if not, optionally to indicate why.

49. The process of claim 34, further comprising:
providing a dialog by which customer testimonials are captured.

50. The process of claim 34, further comprising:
providing a link within a network page that takes a user directly to a suggestion submission dialog.

51. The process of claim 34, further comprising:
providing an incentive module that implements an incentive program.

52. The process of claim 34, further comprising:
providing a page that provides contact information.

53. The process of claim 34, further comprising:
providing an award module with which award winners are listed.

* * * * *